(12) United States Patent
Sato et al.

(10) Patent No.: US 9,811,404 B2
(45) Date of Patent: Nov. 7, 2017

(54) INFORMATION PROCESSING SYSTEM AND METHOD

(71) Applicant: FUJITSU LIMITED, Kawasaki-shi, Kanagawa (JP)

(72) Inventors: Hiroki Sato, Yokohama (JP); Eiju Shin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/805,952

(22) Filed: Jul. 22, 2015

(65) Prior Publication Data
US 2016/0034332 A1 Feb. 4, 2016

(30) Foreign Application Priority Data
Jul. 29, 2014 (JP) .................................. 2014-153940

(51) Int. Cl.
*G06F 11/00* (2006.01)
*G06F 11/07* (2006.01)
*G06F 11/16* (2006.01)

(52) U.S. Cl.
CPC ...... *G06F 11/0724* (2013.01); *G06F 11/1629* (2013.01)

(58) Field of Classification Search
CPC ............. G06F 11/0724; G06F 11/1629; G06F 11/1641; G06F 11/165
See application file for complete search history.

(56) References Cited

U.S. PATENT DOCUMENTS

| | | | | |
|---|---|---|---|---|
| 5,572,662 A * | 11/1996 | Ohta | ..................... | G06F 11/141 714/11 |
| 7,065,672 B2 * | 6/2006 | Long | ..................... | G06F 11/184 712/11 |
| 7,797,575 B2 * | 9/2010 | Clark | ........................ | G06F 1/04 714/11 |
| 8,635,492 B2 * | 1/2014 | Gara | ................... | G06F 11/1064 714/11 |
| 2002/0152419 A1 * | 10/2002 | McLoughlin | ....... | G06F 11/0727 714/11 |
| 2004/0153857 A1 | 8/2004 | Yamazaki et al. | | |

(Continued)

FOREIGN PATENT DOCUMENTS

JP 2004-046599 2/2004

*Primary Examiner* — Philip Guyton
(74) *Attorney, Agent, or Firm* — Oblon, McClelland, Maier & Neustadt, L.L.P.

(57) ABSTRACT

An information processing system includes: a first system that includes a group of arithmetic units, a controller, and an external device; and a second system configured to execute calculation which is the same as calculation executed in the first system and compare calculation results to each other, wherein the controller is configured to: stop a plurality of arithmetic units when it is detected that an output request to the external device is output from one or more arithmetic units among the plurality of arithmetic units that execute first calculation in the group of arithmetic units, the plurality of arithmetic units including one or more arithmetic units that does not output the output request, transmit first comparison target data including a value output in response to the output request to the second system, and instruct the stopped one or more arithmetic units to execute second calculation.

20 Claims, 52 Drawing Sheets

(56) References Cited

U.S. PATENT DOCUMENTS

| | | | |
|---|---|---|---|
| 2007/0282967 A1* | 12/2007 | Fineberg | G06F 11/1641 709/214 |
| 2010/0174448 A1* | 7/2010 | Mueller | G06F 11/165 701/33.4 |
| 2015/0007172 A1* | 1/2015 | Hudzia | G06F 9/45533 718/1 |

* cited by examiner

FIG. 3

EXECUTION SEQUENCE NUMBER: 1000

| CORE ID | CORE 1 | CORE 2 | CORE 3 | CORE 4 |
|---|---|---|---|---|
| AFFILIATED GROUP | OUTPUT 1 | OUTPUT 1 | CALCULATION | CALCULATION |

FIG. 6

| CORE ID | CORE 1 | CORE 2 | CORE 3 | CORE 4 |
|---|---|---|---|---|
| AFFILIATED GROUP | CALCULATION | CALCULATION | CALCULATION | CALCULATION |

FIG. 15

| CORE ID | CORE 1 | CORE 2 | CORE 3 | CORE 4 |
|---|---|---|---|---|
| AFFILIATED GROUP | OUTPUT 1 | OUTPUT 1 | OUTPUT 2 | CALCULATION |

FIG. 25

| GENERATION | EXECUTION SEQUENCE NUMBER AT TIME OF UPDATING |
|---|---|
| GENERATION 1 | 001000 |
| GENERATION 2 | 002000 |

FIG. 26

| BUFFER ADDRESS | VALUE | CORRESPONDING ADDRESS | GENERATION |
|---|---|---|---|
| A-1 | 1 | A | 1 |
| A-2 | 2 | A | 2 |
| B-2 | 3 | B | 2 |

FIG. 27

| EXECUTION SEQUENCE NUMBER AT TIME OF OUTPUT REQUEST | GROUP ID | AFFILIATED CORE ID | EXECUTION SEQUENCE NUMBER AT TIME OF OUTPUT |
|---|---|---|---|
| 001000 | 0001 | CORE 4 | 003000 |
| 004000 | 0002 | CORE 2 | – |

INFORMATION PROCESSING SYSTEM AND METHOD

CROSS-REFERENCE TO RELATED APPLICATION

This application is based upon and claims the benefit of priority of the prior Japanese Patent Application No. 2014-153940, filed on Jul. 29, 2014, the entire contents of which are incorporated herein by reference.

FIELD

The embodiments discussed herein are related to a synchronization technology for a fault-tolerant computer.

BACKGROUND

As a method of implementing synchronization in a fault tolerant computer, there is a synchronization scheme called a lock step. In the lock step, when the same "initial state and execution command of central processing units (CPUs)" are given to calculators, states are matched with each other between two systems by executing the same command from the same initial state using determinativeness of the calculators in which calculation results are the same. An instruction lock step which is a kind of lock step is a scheme of matching states of cores and memory of CPUs in execution command units of the CPUs between two systems.

In the case of symmetric multiprocessing (SMP), information regarding an access order to a shared memory is used as calculation information as well as "an initial state and an execution command of a CPU" for the purpose that the results of calculations executed asynchronously between two systems are the same. Therefore, as the instruction lock step corresponding to the SMP, a scheme is adopted in which when synchronization is executed, two calculators are configured to have roles of a precedence system and a delay system, an access order and access content are recorded on a shared memory in the precedence system, the access order and the access content are transferred to the delay system, and the calculation is reproduced. That is, after a calculation result of the precedence system is confirmed, the calculation is then reproduced in the delay system. Therefore, until the calculation result of the precedence system is transferred, a delay time occurs in the delay system.

When the flow of the process is described in brief, calculation is started by the precedence system. Then, the precedence system transfers data of access to the shared memory generated during the calculation, data of a generated output request, and register values of cores as the calculation result to the delay system. Here, the calculation of the precedence system stops.

When the delay system receives the calculation result from the precedence system, the delay system reproduces the calculation. Then, the delay system compares the reproduction result of the calculation to the calculation result received from the precedence system and notifies the precedence system of the comparison result. The precedence system receives the comparison result from the delay system. In this case, when the comparison result indicates that the calculation results match each other, the precedence system executes output to an external device in response to an output request. Then, the calculation of the precedence system resumes.

However, in the related art, when a process is executed by the above-described flow without consideration of a case in which many cores are included in the CPU, the cores of the precedence system which have not executed the output also stop calculation until the reception of the comparison result from the delay system. For this reason, calculation resources may not be utilized effectively.

As a related technical document, there is Japanese Laid-open Patent Publication No. 2004-46599.

SUMMARY

According to an aspect of the invention, an information processing system includes: a first system that includes a first group of arithmetic units, a first controller, and a first external device; and a second system that configured to execute calculation which is the same as calculation executed in the first system and compare calculation results to each other, wherein the first controller is configured to: control to stop a plurality of first arithmetic units when it is detected that a first output request to the first external device is output from one or more second arithmetic units among the plurality of first arithmetic units that execute processing with regard to first calculation in the first group of arithmetic units, the plurality of first arithmetic units including one or more third arithmetic units that does not output the first output request, transmit first comparison target data including a value to be output in response to the first output request to the second system, and instruct the one or more third arithmetic units stopped by the control to execute processing with regard to second calculation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a group correspondence table;

FIG. 6 is a diagram illustrating an example of a group correspondence table;

FIG. 15 is a diagram illustrating an example of a group correspondence table;

FIG. 25 is a diagram illustrating an example of a generation management table;

FIG. 26 is a diagram illustrating an example of data stored in an LL cache;

FIG. 27 is a diagram illustrating an example of a group correspondence table according to the third embodiment;

DESCRIPTION OF EMBODIMENTS

According to one aspect of an embodiment to be disclosed, calculation resources may be utilized effectively even when synchronization is executed in a fault tolerant computer. Hereinafter, the embodiment will be described with reference to the drawings.

First Embodiment

Figure 1:
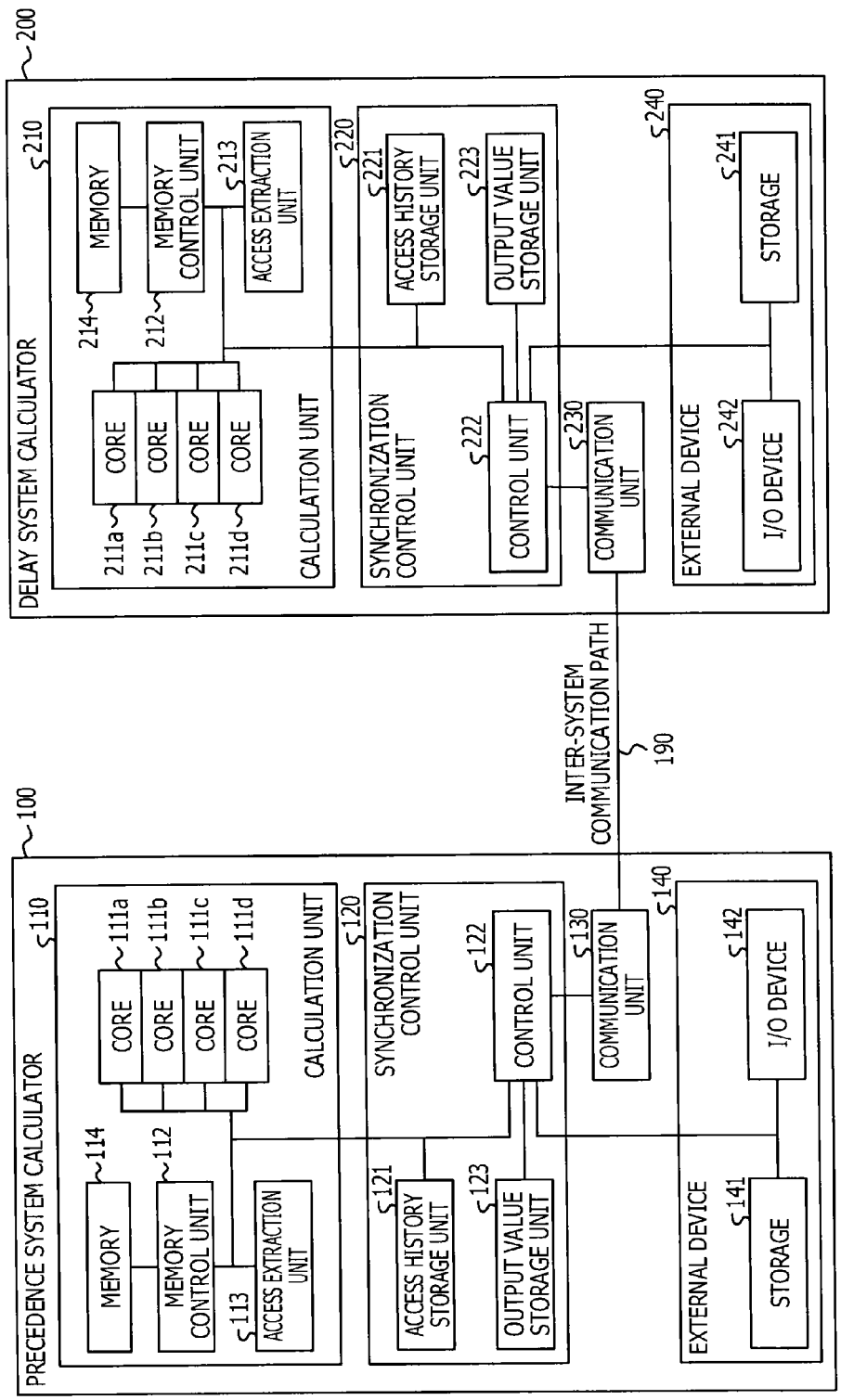
FIG. 1 is a diagram illustrating an overview of a system according to a first embodiment.

FIG. 1 is a diagram illustrating an overview of an information processing system according to the embodiment. In the information processing system, a precedence system calculator 100 and a delay system calculator 200 are connected via an inter-system communication path 190.

The precedence system calculator 100 includes a calculation unit 110, a synchronization control unit 120, a communication unit 130 executing communication via the inter-system communication path 190, and an external device 140. The calculation unit 110 includes a plurality of cores 111 (111a to 111d in FIG. 1), a memory 114 shared by the cores 111, a memory control unit 112, and an access extraction unit 113. In the following description, the terms, "an arithmetic unit," "a processing unit," and "a processor," are not limited to the meaning of a CPU and are assumed to also include calculation units (110 and 210) or cores (111 and 211).

The memory control unit 112 controls access to the memory 114. The access extraction unit 113 extracts the access to the memory 114 and notifies the synchronization control unit 120 of the extraction of the access.

The synchronization control unit 120 includes an access history storage unit 121, an output value storage unit 123, and a control unit 122. The access history storage unit 121 stores data from the access extraction unit 113. The output value storage unit 123 stores values output in response to output requests issued by the cores 111 of the calculation unit 110. The control unit 122 executes various processes to establish synchronization related to an instruction lock step via the communication unit 130 and the inter-system communication path 190, while cooperating with a synchronization control unit 220 of the delay system calculator 200.

The external device 140 includes devices such as a storage device 141 and an I/O device 142. The precedence system calculator is connected to another calculator via the external device 140 in some cases.

The delay system calculator 200 includes a calculation unit 210, the synchronization control unit 220, a communication unit 230 executing communication via the inter-system communication path 190, and an external device 240. The calculation unit 210 includes a plurality of cores 211 (211*a* to 211*d* in FIG. 1), a memory 214 shared by the cores 211, a memory control unit 212, and an access extraction unit 213.

The memory control unit 212 controls access to the memory 214. The access extraction unit 213 extracts the access to the memory 214 and notifies the synchronization control unit 220 of the extraction of the access.

The synchronization control unit 220 includes an access history storage unit 221, an output value storage unit 223, and a control unit 222. The access history storage unit 221 stores data from the access extraction unit 213. The output value storage unit 223 stores values output in response to output requests issued by the cores 211 of the calculation unit 210. The control unit 222 executes various processes to establish synchronization related to an instruction lock step via the communication unit 230 and the inter-system communication path 190, while cooperating with a synchronization control unit 120 of the precedence system calculator 100.

The external device 240 includes devices such as a storage device 241 and an I/O device 242. The delay system calculator is connected to another calculator via the external device 240 in some cases.

Figure 2:
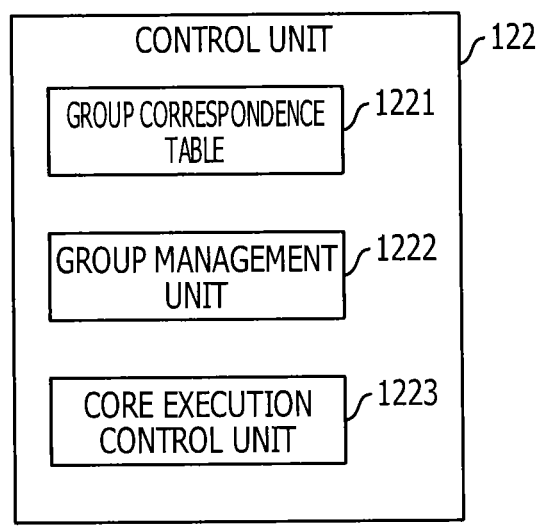
FIG. 2 is a diagram illustrating a functional block configuration example of a control unit of a precedence system calculator.

FIG. 2 is a diagram illustrating a functional block configuration example of the control unit 122 of the precedence system calculator 100. The control unit 122 includes a group correspondence table 1221, a group management unit 1222, and a core execution control unit 1223. The group correspondence table 1221 retains data for managing whether each of the cores 111 is a core outputting an output request and a core capable of executing calculation. The group correspondence table 1221 is retained along with the number (for example, an execution sequence number) of a synchronization confirmation point at the time of update in order to make reference in sequence later.

The group correspondence table 1221 has, for example, a format illustrated in FIG. 3. In the example of FIG. 3, core IDs of the cores 111 and affiliated groups of the cores are stored. Here, the affiliated group of each core refers to an output group to which the core issuing an output request is affiliated (that is, belongs) or a calculation group to which the core capable of executing calculation is affiliated.

The group management unit 1222 executes update, management, or the like of the group correspondence table 1221. The core execution control unit 1223 controls running and stopping of each core according to the group correspondence table 1221.

Figure 4:
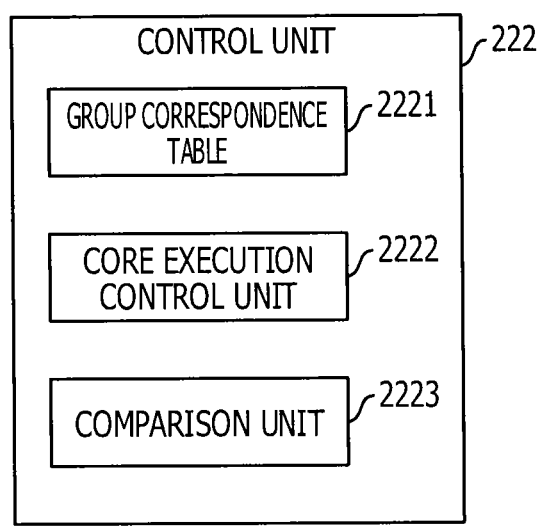
FIG. 4 is a diagram illustrating a functional block configuration example of a control unit of a delay system calculator.

FIG. 4 is a diagram illustrating a functional block configuration example of the control unit 222 of the delay system calculator 200. The control unit 222 includes a group correspondence table 2221, a core execution control unit 2222, and a comparison unit 2223.

The group correspondence table 2221 is sent from the control unit 122 in the precedence system calculator 100. The core execution control unit 2222 controls running and stopping of each core according to the group correspondence table 2221. The comparison unit 2223 executes a process of comparing a calculation result of the precedence system calculator 100 to a calculation result of the delay system calculator 200 and verifying the calculation results.

Next, the flow of a process of the system illustrated in FIG. 1 will be described with reference to FIGS. 5 to 9. First, the control unit 122 of the synchronization control unit 120 in the precedence system calculator 100 acquires a register value, data M of a memory, and data C of a cache from the calculation unit 110 of the precedence system calculator 100 and transfers the register value, the data M, and the data C to the synchronization control unit 220 of the delay system calculator 200 (process (1)). The control unit 222 of the synchronization control unit 220 in the delay system calculator 200 receives the register value, the data M of the memory, and the data C of the cache.

The control unit 122 of the synchronization control unit 120 in the precedence system calculator 100 issues an initialization request to the synchronization control unit 220 of the delay system calculator 200 (process (2)). When receiving the initialization request, the control unit 222 of the synchronization control unit 220 in the delay system calculator 200 issues an initialization command to initialize the cores 211 using the data M of the memory and the data C of the cache to the calculation unit 210 in the delay system calculator 200 (process (3)). Accordingly, the same initialization state as that of the calculation unit 110 of the precedence system calculator 100 is realized in the calculation unit 210 of the delay system calculator 200.

Thereafter, the control unit 122 (the core execution control unit 1223) of the synchronization control unit 120 in the precedence system calculator 100 issues a calculation execution command to the calculation unit 110 (process (4)). Thus, the cores 111 of the calculation unit 110 start calculation. Initially, all of the cores 111 are affiliated to a calculation group.

During the calculation, when one core 111 of the calculation unit 110 gains access to the memory 114, the access is detected by the access extraction unit 113. Then, the access extraction unit 113 notifies the control unit 122 of the synchronization control unit 120 of access S1 to the memory 114 (process (5)).

When the control unit 122 is notified of the access S1 to the memory 114, the control unit 122 of the synchronization control unit 120 transfers data of the access S1 to the control unit 222 of the synchronization control unit 220 in the delay system calculator 200 (process (6)). When the control unit 222 receives the data of the access S1 to the shared memory, the control unit 222 of the synchronization control unit 220 in the delay system calculator 200 stores the data of the access S1 in the access history storage unit 221. The data of the access S1 to the shared memory is also stored in the access history storage unit 121 of the synchronization control unit 120 in the precedence system calculator 100.

Thereafter, the cores 111 (at least one core) of the calculation unit 110 of the precedence system calculator 100 issue an output request (process (7)). Then, the control unit 122 of the synchronization control unit 120 in the precedence system calculator 100 receives the output request and stores an estimated output value O1 by the output request in the output value storage unit 123.

Accordingly, the control unit 122 (the core execution control unit 1223) issues a calculation stop command to the cores 111 of the calculation unit 110 of the precedence system calculator 100 (process (8)). Thus, the cores 111 of the calculation unit 110 of the precedence system calculator 100 stop the calculation. Further, the control unit 122 issues a command to acquire a register value to the cores 111 (for example, only the cores executing the calculation) of the calculation unit 110 (process (9)). The cores 111 of the calculation unit 110 outputs a register value R1 to the control unit 122 of the synchronization control unit 120 in response to the command to acquire the register value (process (10)).

Here, the control unit 122 (the group management unit 1222) of the synchronization control unit 120 in the precedence system calculator 100 registers data indicating that the cores issuing the output requests are affiliated to an output group along with an execution sequence number at this time in the group correspondence table 1221 of the precedence system calculator 100 (process (11)). The control unit 122 (the group management unit 1222) transfers the changed group correspondence table 1221 to the synchronization control unit 220 of the delay system calculator 200 as well as executing the registration (process (12)). The control unit 222 of the synchronization control unit 220 in the delay system calculator 200 executes registration in the group correspondence table 2221.

Initially, the group correspondence table 1221 illustrated in FIG. 6 is assumed to be set. When the output requests are assumed to be output by the cores 1 and 2 (the cores 111*a* and 111*b*), the group correspondence table 1221 illustrated in FIG. 3 is registered.

The control unit 122 of the synchronization control unit 120 in the precedence system calculator 100 transfers the estimated output value O1 to the synchronization control unit 220 of the delay system calculator 200 (process (13)) and also transfers the register value R1 to the synchronization control unit 220 of the delay system calculator 200 (process (14)).

Figure 7:
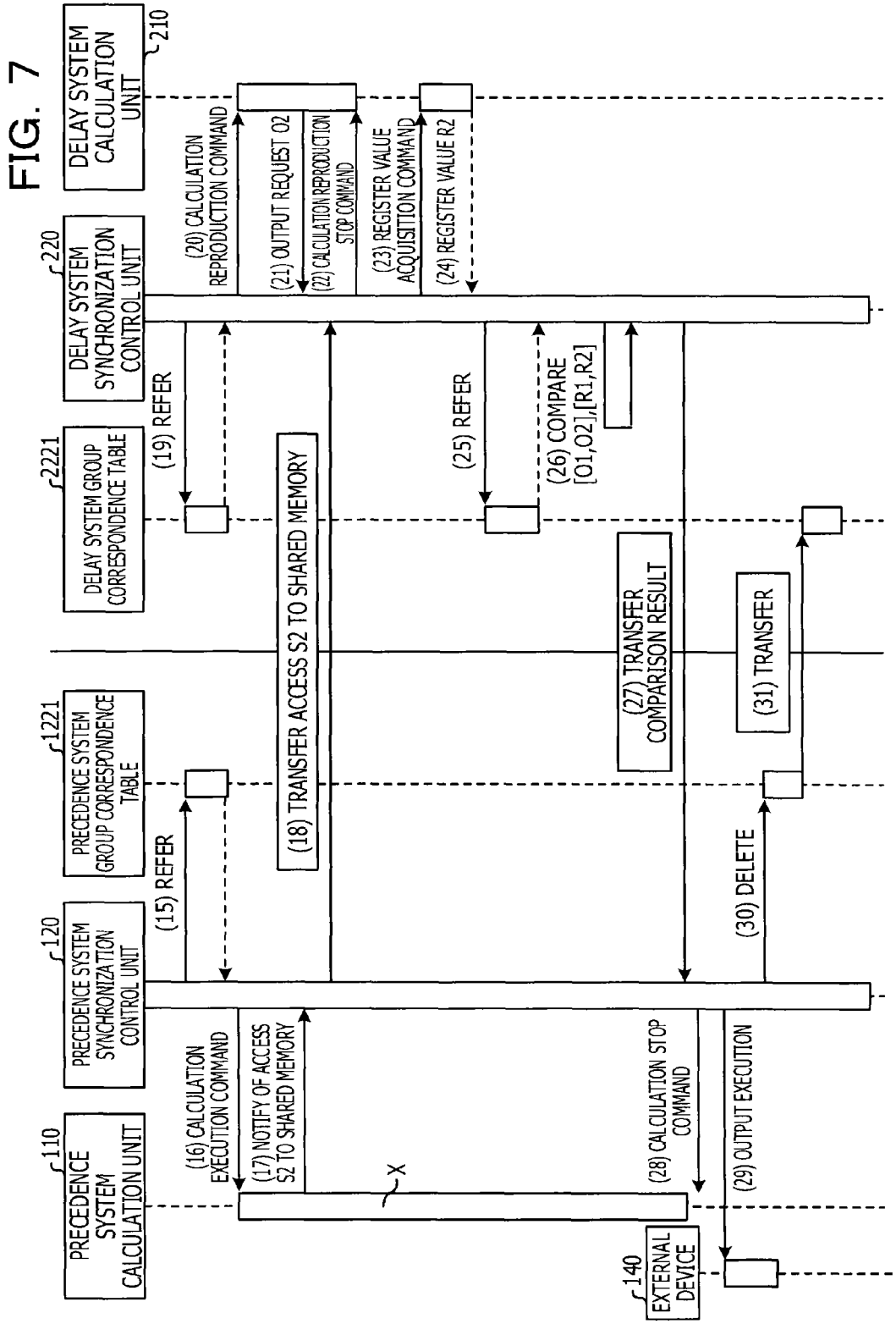
FIG. 7 is a sequence diagram illustrating an overview of a process according to the first embodiment.

The process proceeds to a process of FIG. 7. The control unit 122 of the synchronization control unit 120 in the precedence system calculator 100 specifies the cores affiliated to the calculation group from the latest group correspondence table 1221 with reference to the group correspondence table 1221 (process (15)).

Then, the control unit 122 (the core execution control unit 1223) of the synchronization control unit 120 in the precedence system calculator 100 issues a calculation execution command to the specified cores (process (16)). The calculation unit 110 of the precedence system calculator 100 executes calculation X in the cores receiving the instruction by the calculation execution command. In the embodiment, the cores issuing the output requests are in a standby state, but the other cores execute the following calculation without standby along with the cores affiliated to the calculation group and issuing the output commands. In this way, effective utilization of the calculation resources is achieved.

During the execution of the calculation X, the cores 111 of the calculation unit 110 in the precedence system calculator 100 gain access to the memory 114 in some cases. This access is detected by the access extraction unit 113. The access extraction unit 113 notifies the control unit 122 of the synchronization control unit 120 of access S2 to the memory 114 (process (17)).

When the control unit 122 is notified of the access S2 to the memory 114, the control unit 122 of the synchronization control unit 120 transfers data of the access S2 to the control unit 222 of the synchronization control unit 220 in the delay system calculator 200 (process (18)). When the control unit 222 receives the data of the access S2 to the shared memory, the control unit 222 of the synchronization control unit 220 in the delay system calculator 200 stores the data of the access S2 to the shared memory in the access history storage unit 221. The data of the access S2 to the shared memory is also stored in the access history storage unit 121 of the synchronization control unit 120 in the precedence system calculator 100.

On the other hand, when the control unit 222 receives the estimated output value O1 and the register value R1 from the precedence system calculator 100, the control unit 222 (the core execution control unit 2222) of the synchronization control unit 220 in the delay system calculator 200 specifies the cores affiliated to the calculation group from the oldest group correspondence table among the group correspondence tables which have not yet been referred to, with reference to the group correspondence table 2221 (process (19)). In this example, as illustrated in FIG. 6, four cores are affiliated to the calculation group.

Then, the control unit 222 of the synchronization control unit 220 issues a calculation reproduction command to the calculation unit 210 so that the cores affiliated to the calculation group execute calculation reproduction using the register value R and the access S1 received in the process (1) (process (20)). In response to the calculation reproduction command, the cores affiliated to the calculation group in the calculation unit 210 execute the calculation having executed in the precedence system calculator 100. Then, as in the precedence system calculator 100, the access to the shared memory is generated, but access to the data of the access S1 received from the precedence system calculator 100 is executed. During the calculation reproduction, the cores 211 (at least one core) of the calculation unit 210 of the delay system calculator 200 issue an output request (process (21)). Then, the control unit 222 of the synchronization control unit 220 in the delay system calculator 200 receives the output request and stores an estimated output value O2 by the output request in the output value storage unit 223.

Then, the control unit 222 (the core execution control unit 2222) issues a calculation reproduction stop command to the cores 211 of the calculation unit 210 of the delay system calculator 200 (process (22)). Thus, the cores 211 of the calculation unit 210 of the delay system calculator 200 stop the calculation reproduction. Further, the control unit 222 issues a command to acquire a register value to the cores 211 (for example, only the cores executing the calculation) of the calculation unit 210 (process (23)). The cores 211 of the calculation unit 210 outputs a register value R2 to the control unit 222 of the synchronization control unit 220 in response to the command to acquire the register value (process (24)).

Then, the control unit 222 (the comparison unit 2223) of the synchronization control unit 220 in the delay system calculator 200 reconfirms the cores affiliated to the calculation group from the group correspondence table for the executed calculation reproduction with reference to the group correspondence table 2221 (process (25)). The present process may be executed before the register value is acquired.

The control unit 222 (the comparison unit 2223) compares the estimated output values O1 and O2 and the register values R1 and R2 (process (26)). The compared register values are only the register values of the cores affiliated to the calculation group.

Thereafter, the control unit 222 of the synchronization control unit 220 in the delay system calculator 200 transfers a comparison result to the synchronization control unit 120 of the precedence system calculator 100 (process (27)). The control unit 122 of the synchronization control unit 120 in the precedence system calculator 100 receives the comparison result from the delay system calculator 200.

When the comparison result indicates O1=O2 and R1=R2, the synchronization control unit 220 of the delay system calculator 200 outputs the estimated output value O2 to the external device 240.

When the control unit 122 of the synchronization control unit 120 in the precedence system calculator 100 receives the comparison result from the delay system calculator 200, the control unit 122 issues a calculation stop command to the calculation unit 210 (process (28)). When the control unit 122 confirms the comparison result and the comparison result indicates O1=O2 and R1=R2, the control unit 122 outputs the estimated output value O1 stored in the output value storage unit 123 to the external device 140 (process (29)).

The control unit 122 (the group management unit 1222) of the synchronization control unit 120 in the precedence system calculator 100 specifies the cores having outputted the output request for the calculation in which the comparison result may be obtained and registers data (that is, deletion of the output group) indicating that the specified cores are affiliated along with the execution sequence number at this time to the group correspondence table 1221 of the precedence system calculator 100 (process (30)). The control unit 122 (the group management unit 1222) executes such registration and transfers the changed group correspondence table 1221 to the synchronization control unit 220 of the delay system calculator 200 (process (31)). The control unit 222 of the synchronization control unit 220 in the delay system calculator 200 registers in the group correspondence table 2221.

By executing such a process, it is possible to avoid all of the cores being in the standby state in section of the calculation X. Therefore, effective utilization of the calculation resources may be achieved, and thus calculation efficiency is improved.

Figure 8:
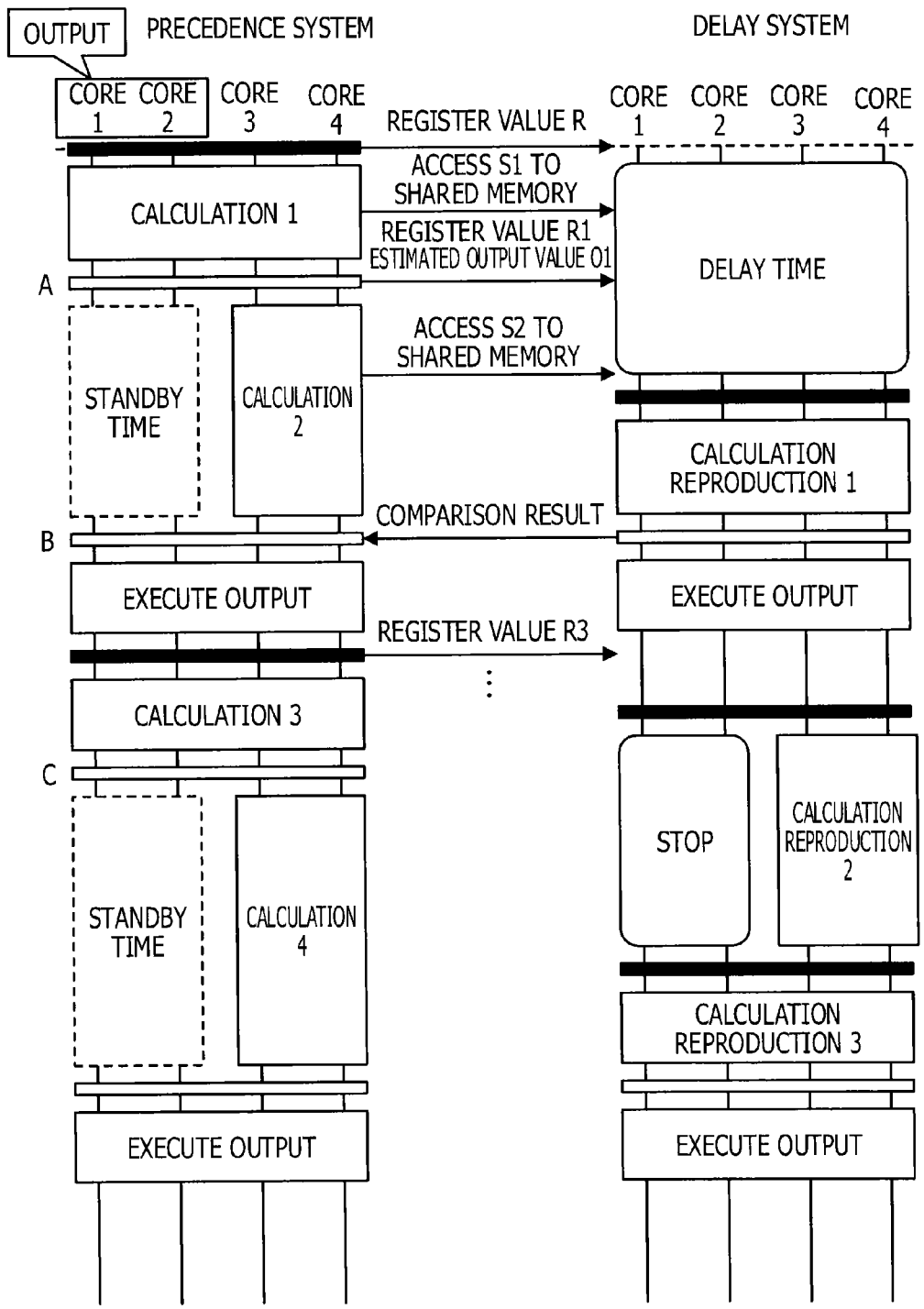
FIG. 8 is a diagram illustrating a temporal change of a use state of cores according to the first embodiment.

FIG. 8 is a diagram schematically illustrating a temporal change of a use state of the cores. An example in which four cores are present as in FIG. 1 is illustrated. The cores issuing the output request are assumed to cores 1 and 2 (the cores 111a and 111b). Time flows from the upper side to the lower side. When calculation 1 is first executed by the precedence system calculator 100 and the cores 1 and 2 issue the output request at a point A, calculation reproduction 1 is executed by the cores 1 to 4 in the delay system calculator 200. At the point A, the group correspondence table 1221 illustrated in FIG. 3 is registered.

On the other hand, in the precedence system calculator 100, the cores 3 and 4 other than the cores 1 and 2 issuing the output request execute calculation 2 immediately after the point A. Meanwhile, in the delay system calculator 200, calculation reproduction 1 ends and the comparison result is output to the precedence system calculator 100 at a point B. Here, when the comparison result indicates matching of the register value and the estimated output value, the precedence system calculator 100 and the delay system calculator 200 execute output. At the point B, the group correspondence table 1221 illustrated in FIG. 6 is registered.

When the output is executed, the cores 1 to 4 execute calculation 3 in the precedence system calculator 100. Further, in the delay system calculator 200, the cores 3 and 4 execute calculation reproduction 2 based on the group correspondence table 2221 at the point A.

Thereafter, in the precedence system calculator 100, the cores 1 and 2 are assumed to issue the output request at a point C, as in calculation 1. At the point C, the same correspondence table 1221 (see FIG. 3) as that of the point A is registered. Then, in the precedence system calculator 100, the cores 3 and 4 execute calculation 4 based on the group correspondence table 1221 illustrated in FIG. 3.

On the other hand, in the delay system calculator 200, when calculation reproduction 2 ends, the cores 1 to 4 execute calculation reproduction 3 corresponding to calculation 3 based on the group correspondence table 2221 at the point B. Then, when the comparison result in calculation reproduction 3 is transmitted from the delay system calculator 200 to the precedence system calculator 100 and the comparison result indicates matching of the register value and the estimated output value, the precedence system calculator 100 and the delay system calculator 200 execute output.

Figure 9:
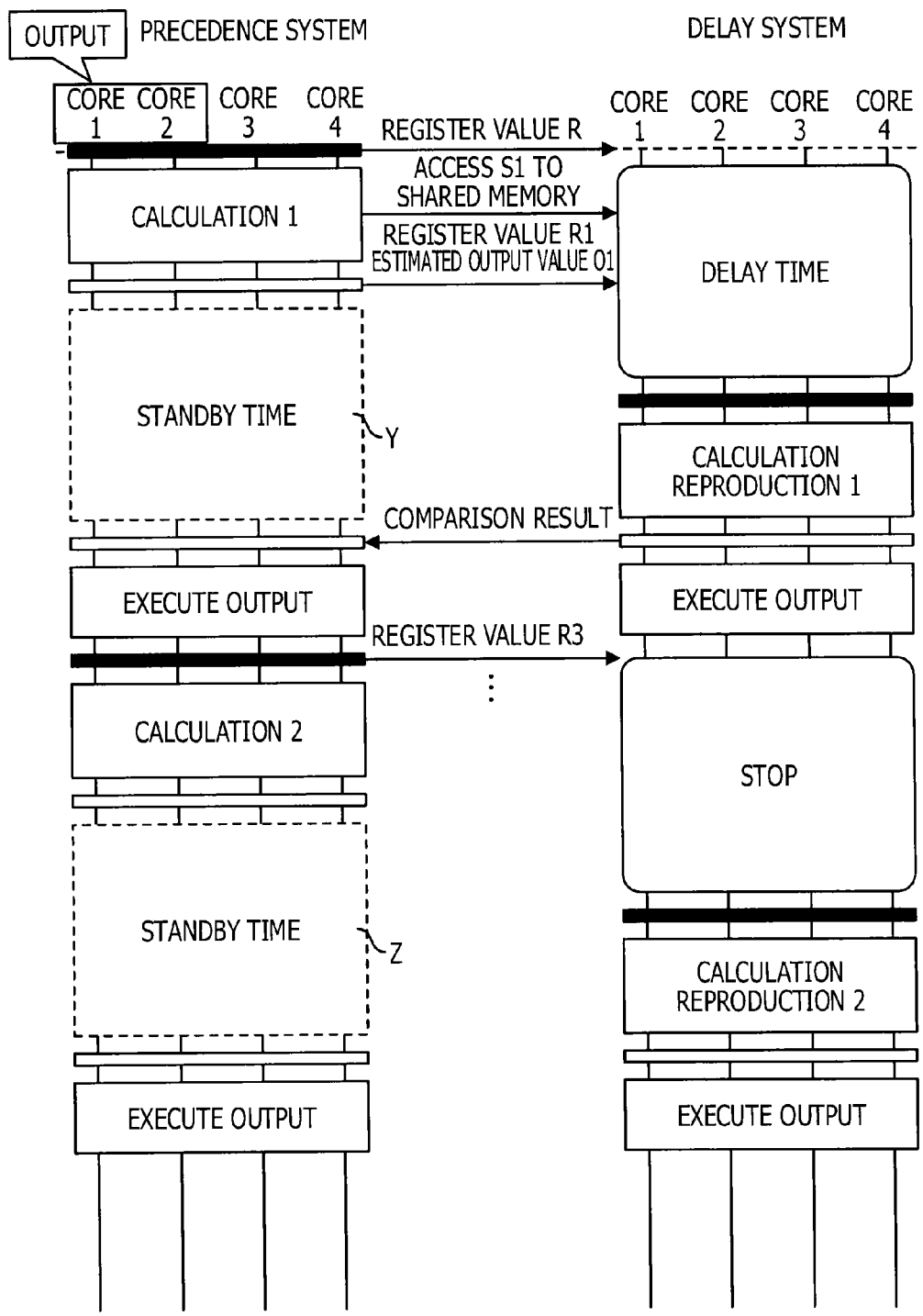
FIG. 9 is a diagram illustrating a temporal change of a use state of a core in a technology of the related art.

On the other hand, when all of the cores are configured to execute calculation as in the related art, as illustrated in FIG. 9, standby times Y and Z of the cores 1 to 4 may occur. Since the cores having not issued the output request stop, it may be understood that efficiency deteriorates.

In contrast, although some of the cores execute calculation 2 and calculation 4 in FIG. 8, the calculation may be executed without standby. Thus, it may be understood that efficiency is improved.

In FIG. 8, the example in which two cores issues the output request among four cores is illustrated. However, when the number of cores increases, a ratio of the number of cores issuing the output request is considered not to be the same or increase and a ratio of the cores issuing the output request to the total number of cores is considered to decrease. Then, when a CPU including more cores is adopted, the effect of the embodiment is further achieved.

Next, a specific process by the synchronization control unit 120 of the precedence system calculator 100 will be described with reference to FIGS. 10 to 21.

Figure 10:
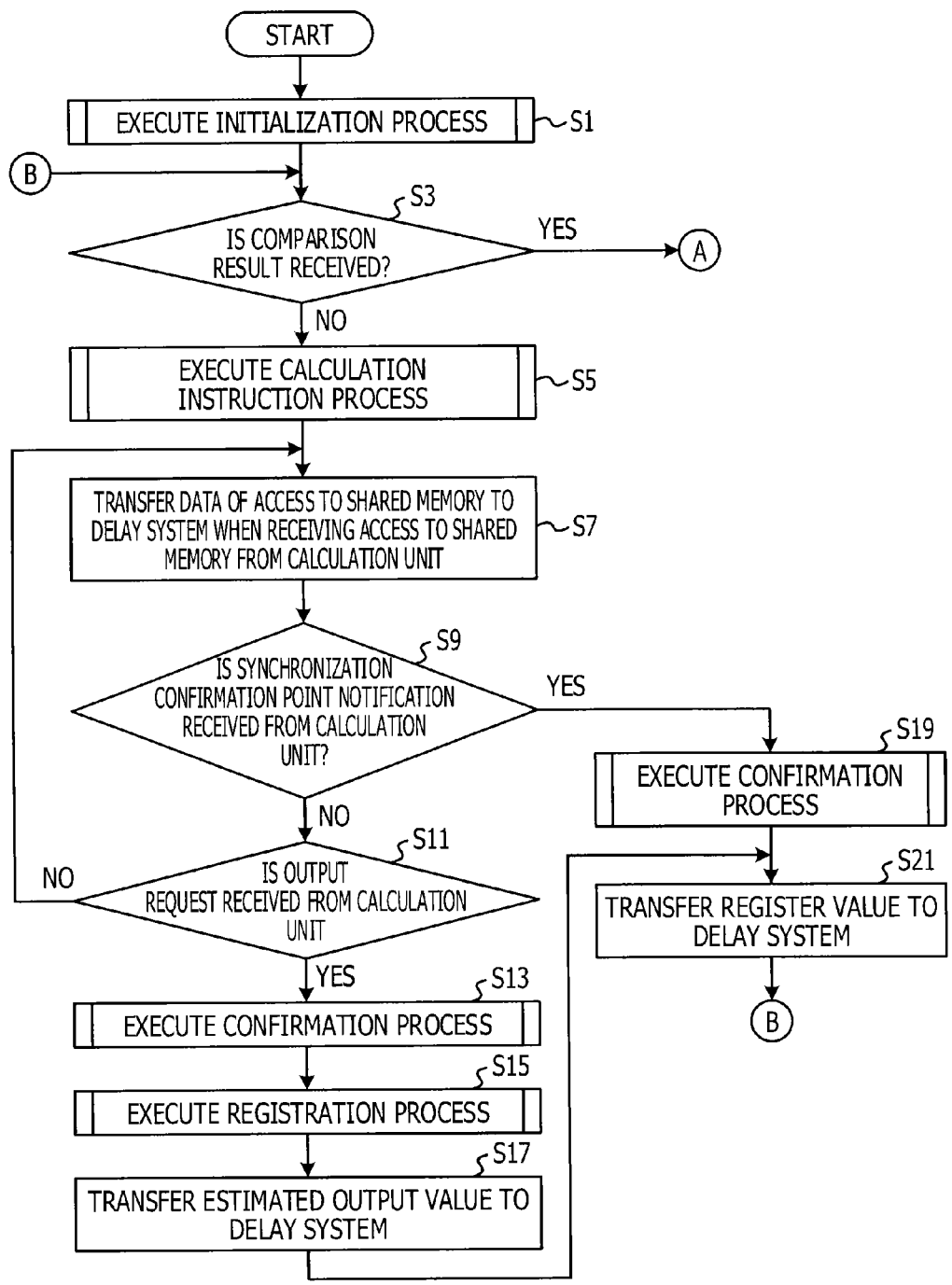
FIG. 10 is a flowchart illustrating a processing flow of a process executed in the precedence system calculator.

First, the synchronization control unit 120 executes an initialization process (S1 in FIG. 10). The initialization process will be described with reference to FIG. 11.

Figure 11:
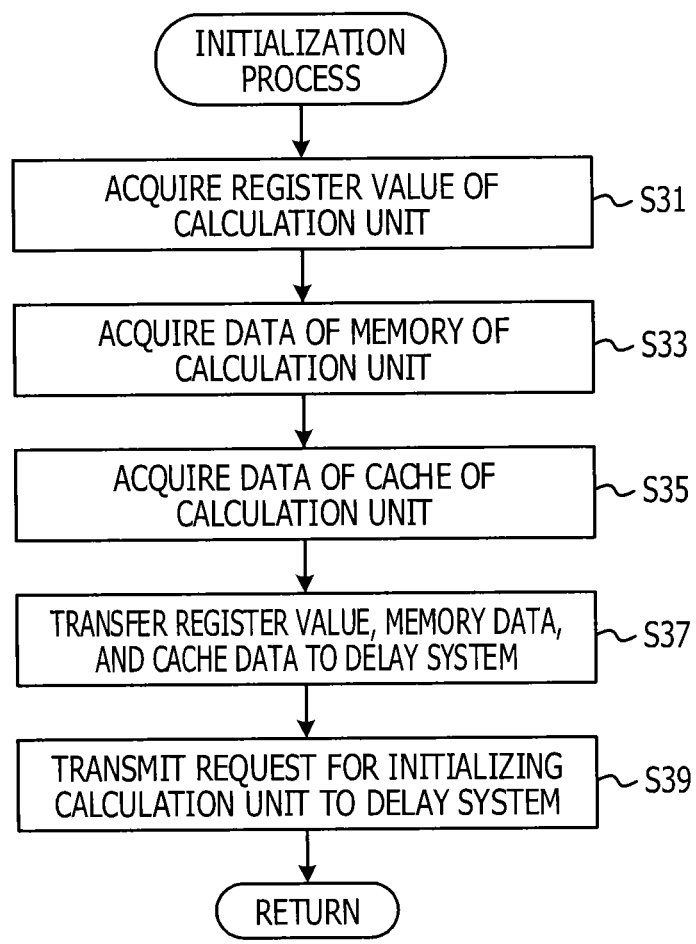
FIG. 11 is a flowchart illustrating a processing flow of an initialization process.

First, the control unit 122 of the synchronization control unit 120 reads the register value of the calculation unit 110 (S31 in FIG. 11). The control unit 122 reads the data of the memory 114 of the calculation unit 110 (S33). Further, the control unit 122 reads the data of the cache of the calculation unit 110 (S35).

Then, the control unit 122 transfers the register value, the memory data, and the cache data to the synchronization control unit 220 of the delay system calculator 200 (S37). Further, the control unit 122 transmits an initialization request of the calculation unit 210 of the delay system calculator 200 to the synchronization control unit 220 of the delay system calculator 200 (S39). Then, the process returns to the calling original process.

In this way, the state of the calculation unit 210 of the delay system calculator 200 is matched with the state of the calculation unit 110 of the precedence system calculator 100.

The description returns to the description of the process of FIG. 10. The control unit 122 determines whether the comparison result is received from the delay system calculator 200 (S3). When the comparison result is received from the delay system calculator 200, the process proceeds to a process of FIG. 20 via a terminal A.

Conversely, when the comparison result is not received from the delay system calculator 200, the control unit 122 executes a calculation instruction process (S5). The calculation instruction process will be described with reference to FIG. 12.

Figure 12:
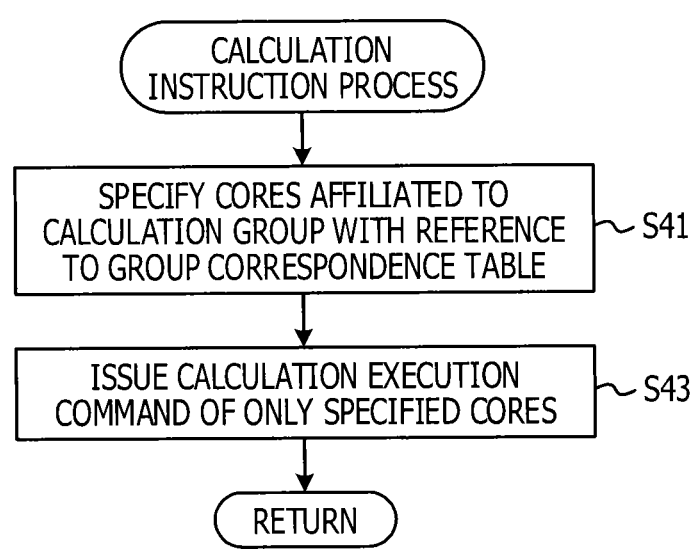
FIG. 12 is a flowchart illustrating a processing flow of a calculation instruction process.

The core execution control unit 1223 of the control unit 122 specifies the cores affiliated to the calculation group with reference to the latest group correspondence table 1221 (S41 in FIG. 12).

Then, the core execution control unit 1223 of the control unit 122 issues a calculation execution command to execute calculation by only the specified cores to the calculation unit 110 (S43).

In this way, the cores issuing the output request stand by until receiving the comparison result from the delay system calculator 200, but the other cores still execute the calculation.

The description returns to the description of the process of FIG. 10. When the control unit 122 receives the data of the access to the memory 114 from the access extraction unit 113 of the calculation unit 110, the control unit 122 transfers the data of the access to the memory 114 to the delay system calculator 200 (S7). The data of the access is stored in the access history storage unit 121.

The control unit 122 determines whether synchronization confirmation point notification is received from the calculation unit 110 (S9). For example, whenever the calculation unit 110 counts the number of executions of if branch and the number of executions reaches a predetermined number of times, the synchronization confirmation point notification is assumed to be issued.

When the synchronization confirmation point notification is received, the control unit 122 executes a confirmation process (S19). The confirmation process will be described with reference to FIG. 13.

Figure 13:
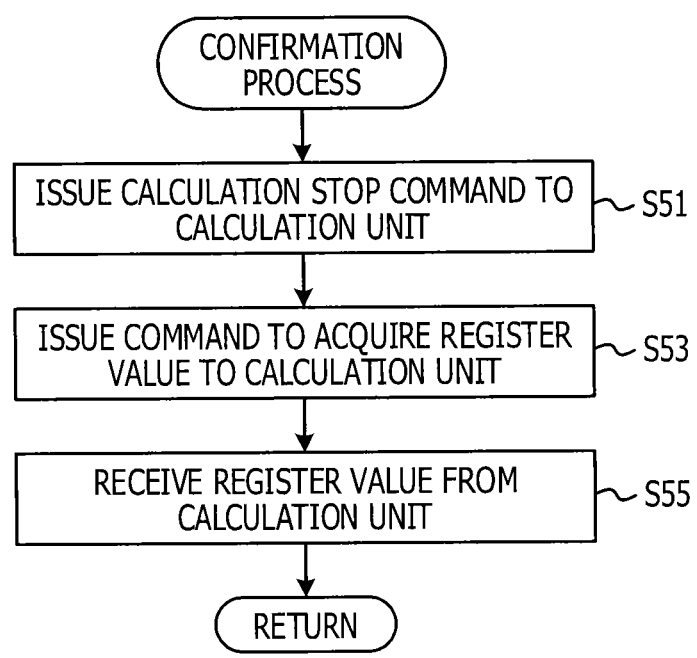
FIG. 13 is a flowchart illustrating a processing flow of a confirmation process.

First, the core execution control unit 1223 of the control unit 122 issues a calculation stop command to the calculation unit 110 (S51 in FIG. 13). Then, the cores 111 of the calculation unit 110 stop the calculation.

The control unit 122 issues a command to acquire the register value to the calculation unit 110 (S53). Then, the calculation unit 110 outputs the register value to the control unit 122.

Thereafter, the control unit 122 receives the register value from the calculation unit 110 (S55). The process returns to the calling original process.

The description returns to the description of the process of FIG. 10. The control unit 122 transfers the acquired register value to the synchronization control unit 220 of the delay system calculator 200 (S21). Thereafter, the process returns to the process of S3 via a terminal B.

Conversely, when the synchronization confirmation point notification is not received, the control unit 122 determines whether the output request is received from the calculation unit 110 (S11). When the output request is not received, the process returns to S7.

Conversely, when the output request is received, the control unit 122 executes the confirmation process (S13). The confirmation process is a process described in FIG. 13. The control unit 122 executes a registration process (S15). The registration process will be described with reference to FIG. 14.

Figure 14:
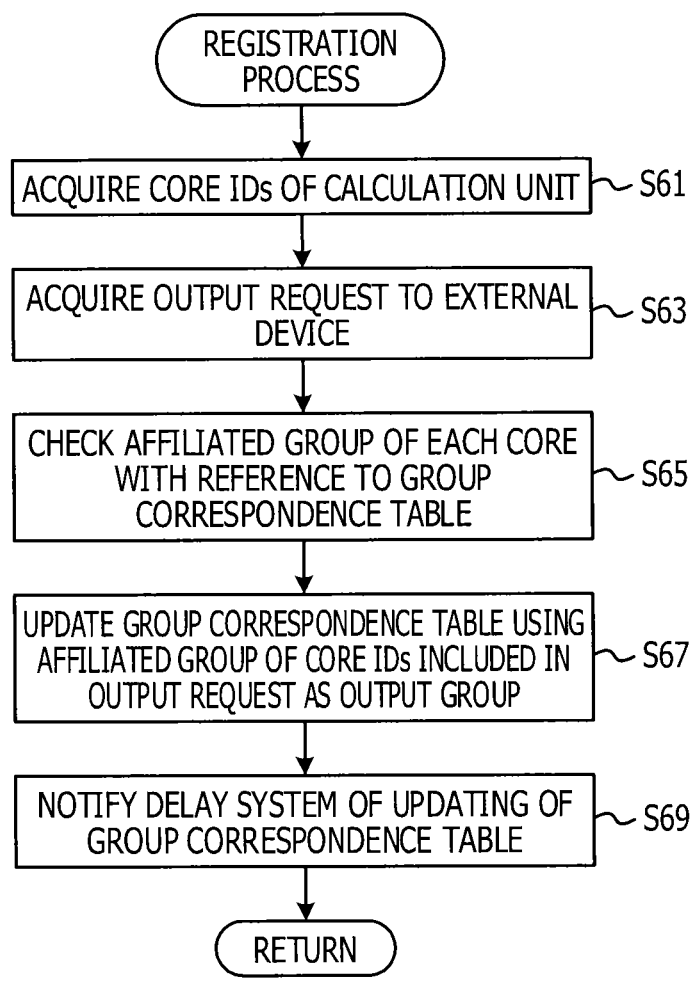
FIG. 14 is a flowchart illustrating a processing flow of a registration process.

First, the group management unit 1222 of the control unit 122 acquires the IDs of all the cores of the calculation unit 110 (S61 in FIG. 14). The group management unit 1222 acquires the output request to the external device 140 (S63). The control unit 122 stores the estimated output value output in response to the output request and the IDs of the cores having outputted the output request in the output value storage unit 123.

The group management unit 1222 checks the affiliated group of each core with reference to the group correspondence table 1221 (S65).

The group management unit 1222 updates the group correspondence table 1221 in association with the execution sequence number at the time of the issuing of the output request using the affiliated group of the core IDs included in the output request as the output group (S67).

For example, the group correspondence table 1221 illustrated in FIG. 6 is updated to the group correspondence table 1221 illustrated in FIG. 3. When the output group is already present, for example, the group correspondence table 1221 is updated to, for example, the group correspondence table 1221 illustrated in FIG. 15 in some cases. That is, a first output group (output 1) including the cores 1 and 2 and a second output group (output 2) including the core 3 are registered.

The group management unit 1222 notifies the synchronization control unit 220 of the delay system calculator 200 of the updating of the group correspondence table 1221 (S69). Accordingly, the group correspondence table 2221 is updated.

In this way, it is possible to specify the cores which may be used for the following calculation.

The description returns to the description of the process of FIG. 10. The control unit 122 transfers the estimated output value of the output request to the synchronization control unit 220 of the delay system calculator 200 (S17). For example, the synchronization control unit 220 of the delay system calculator 200 stores the received estimated output value in the output value storage unit 223. The subsequent process proceeds to S21.

Since the process after the terminal A is executed after completion of the calculation reproduction in the delay system calculator 200, a process of the synchronization control unit 220 in the delay system calculator 200 will be described first with reference to FIGS. 16 to 19.

Figure 16:
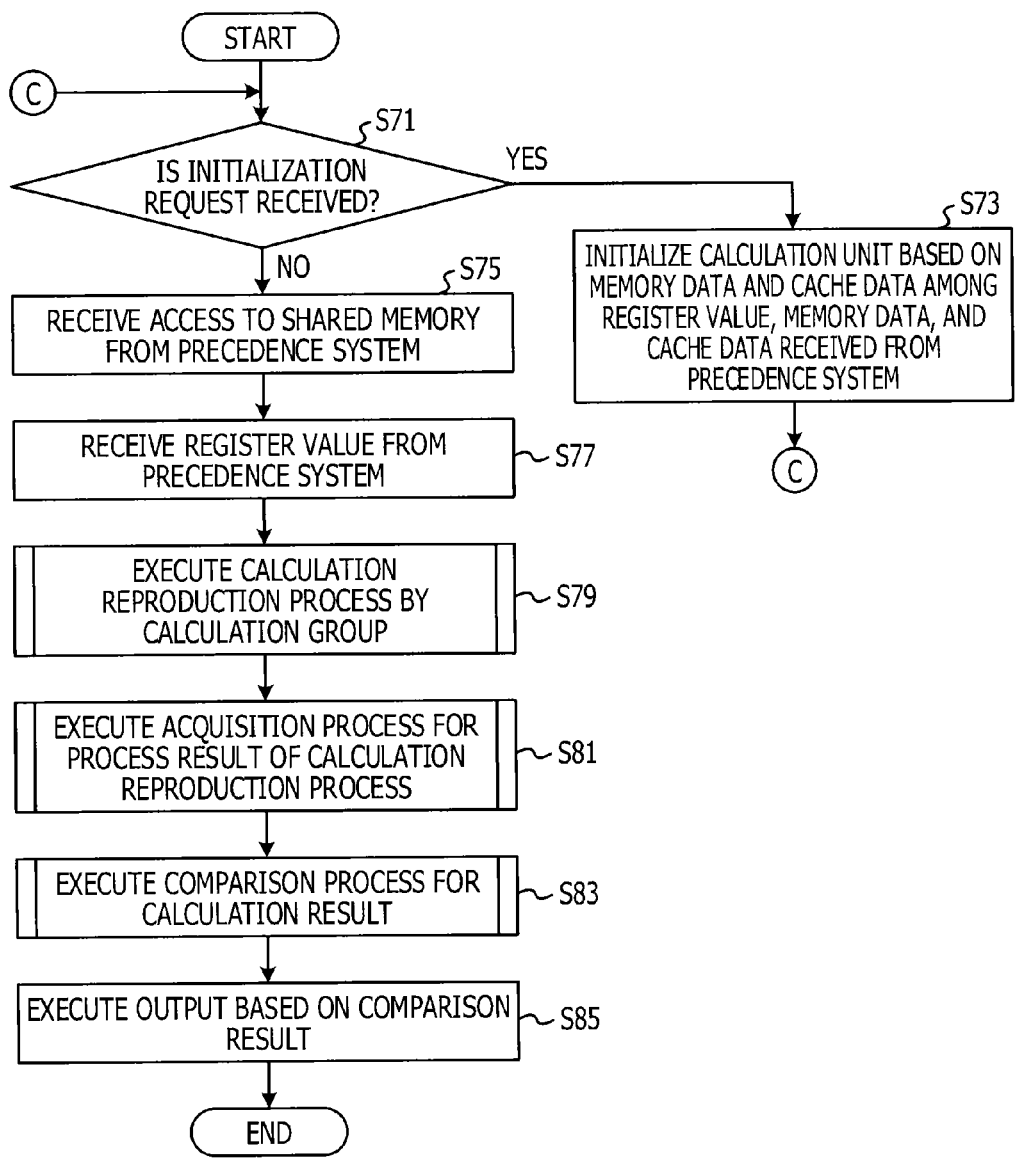
FIG. 16 is a flowchart illustrating a processing flow of a process executed by a delay system calculator.

First, the control unit 222 of the synchronization control unit 220 determines whether the initialization request is received from the precedence system calculator 100 (S71 in FIG. 16). When the initialization request is received, the initialization of the calculation unit 210 is executed based on the memory data and the cache data among the register value, the memory data, and the cache data received from the synchronization control unit 120 of the precedence system calculator 100 (S73). The process returns to S71 via a terminal C.

Conversely, when the initialization request is not received, the control unit 222 of the synchronization control unit 220 receives the data of the access to the shared memory from the synchronization control unit 120 of the precedence system calculator 100 (S75) and stores the data in the access history storage unit 221.

The control unit 222 of the synchronization control unit 220 receives the register value from the synchronization control unit 120 of the precedence system calculator 100 (S77). The register value received in S77 is a target compared to the register value included in a subsequent calculation result.

The control unit 222 executes the calculation reproduction process by the calculation group (S79). The calculation reproduction process will be described with reference to FIG. 17.

Figure 17:
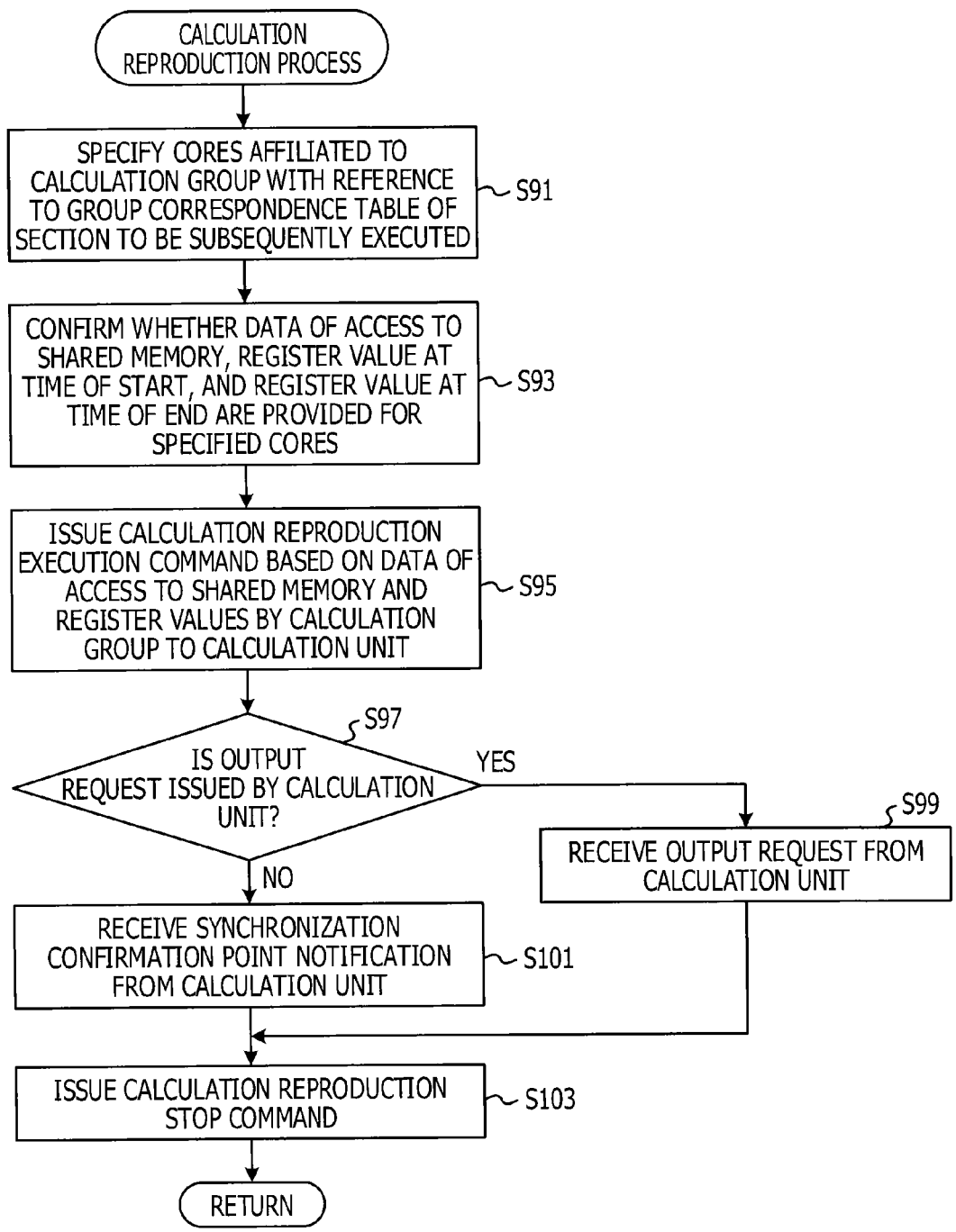
FIG. 17 is a flowchart illustrating a processing flow of a calculation reproduction process.

The core execution control unit 2222 of the control unit 222 specifies the cores affiliated to the calculation group with reference to the group correspondence table 2221 of a section to be subsequently executed (S91 in FIG. 17). The oldest group correspondence table (the execution sequence number is the smallest) is used among unused group correspondence tables.

Figure 5:
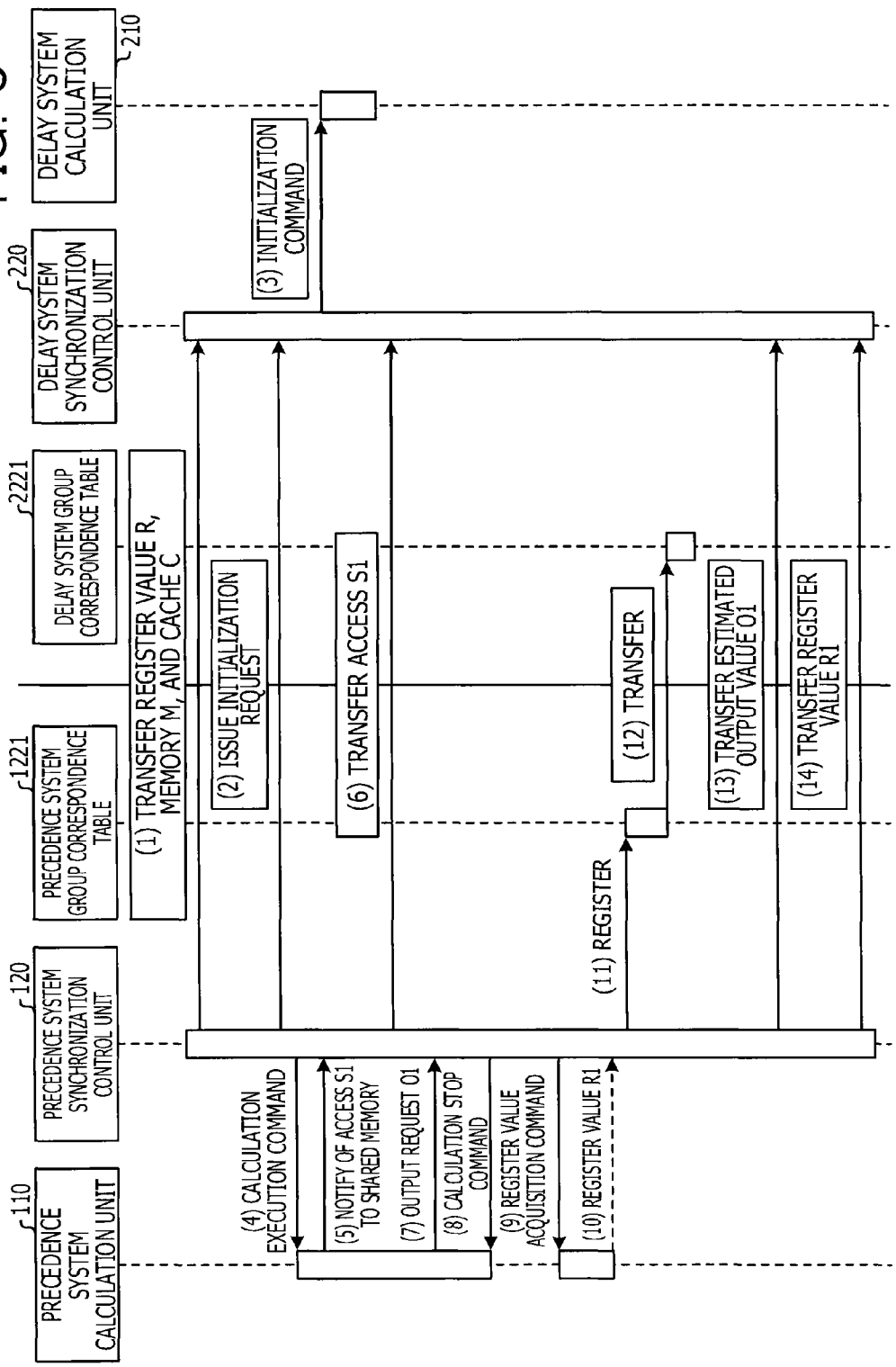
FIG. 5 is a sequence diagram illustrating an overview of a process according to the first embodiment.

The core execution control unit 2222 of the control unit 222 confirms whether data of the access to the shared memory, a register value at the time of start, and a register value at the time of end are provided for the specific cores (S93). In the example of FIG. 5, the core execution control unit 2222 determines whether register values R and R1 and data S1 of access to the shared memory are provided. When the data and the values are not provided, the core execution control unit 2222 stands by.

When the register values at the time of start and the time of end and the data of the access to the shared memory are provided, the core execution control unit 2222 of the control unit 222 issues a calculation reproduction execution command based on the data of the access to the shared memory and the register values by the cores affiliated to the calculation group to the calculation unit 210 (S95). When the access extraction unit 213 detects the access to the memory 214 from the cores 211 of the calculation unit 210, the data of the access to the shared memory received from the precedence system calculator 100 is output to the cores 211 of the access source.

When the output request is generated by the calculation unit 210 (Yes route in S97), the control unit 222 receives the output request from the calculation unit 210 (S99). The estimated output value output in response to the output request and the ID of the output source core are retained. The process proceeds to S103.

Conversely, when the output request is not generated by the calculation unit 210 (No route in S97), the control unit 222 receives the synchronization confirmation point notification from the calculation unit 210 (S101). For example, the control unit 222 is notified that if branch is executed a predetermined number of times.

Thereafter, the core execution control unit 2222 of the control unit 222 issues the calculation reproduction stop command to the calculation unit 210 (S103).

In this way, the calculation reproduction is executed in the delay system calculator 200.

The description returns to the description of the process of FIG. 16. The control unit 222 executes an acquisition process for the process result of the calculation reproduction process (S81). The acquisition process will be described with reference to FIG. 18.

Figure 18:
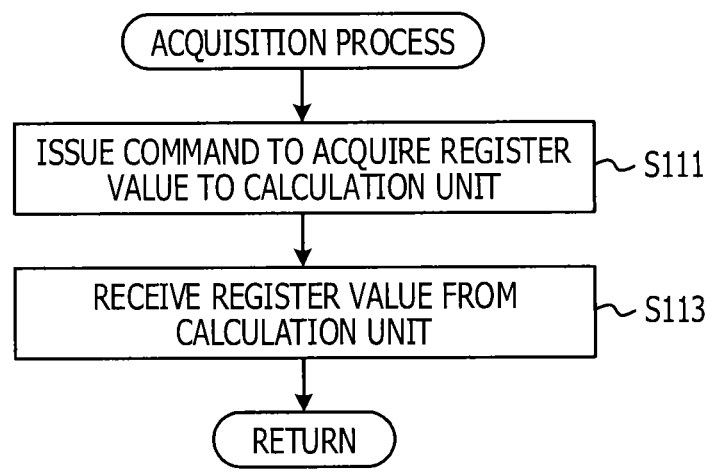
FIG. 18 is a flowchart illustrating a processing flow of an acquisition process.
Figure 19:
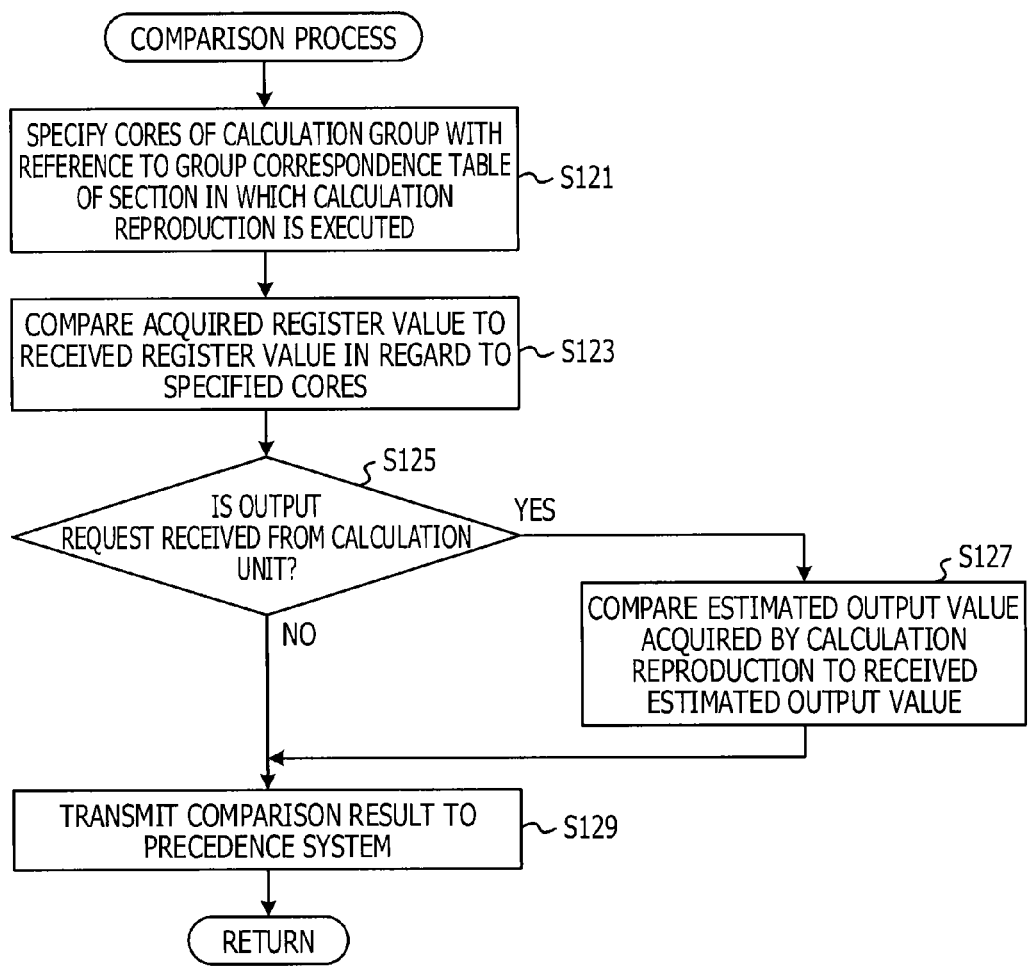
FIG. 19 is a flowchart illustrating a processing flow of a comparison process.

First, the control unit 222 issues a command to acquire the register value to the calculation unit 210 (S111 in FIG. 18). Thus, the calculation unit 210 reads the register values and outputs the register values to the control unit 222.

Accordingly, the control unit 222 acquires the register values from the calculation unit 210 (S113). The process returns to the process of FIG. 16.

The description returns to the description of the process of FIG. 16. The control unit 222 executes the comparison process for the calculation result (S83). The comparison process for the calculation result will be described with reference to FIG. 19.

First, the comparison unit 2223 of the control unit 222 specifies the cores of the calculation group with reference to the group correspondence table 2221 of a section in which the calculation reproduction is executed (S121).

The comparison unit 2223 of the control unit 222 compares the acquired register value to the register value received from the precedence system calculator 100 in regard to the specified cores (S123).

When the output request is received from the calculation unit 210 (Yes route in S125), the comparison unit 2223 of the control unit 222 compares the estimated output value obtained by the calculation reproduction to the estimated output value received from the precedence system calculator 100 (S127). The process proceeds to S129.

Conversely, when the output request is not received from the calculation unit 210 (No route in S125), the process proceeds to S129.

The comparison unit 2223 of the control unit 222 transmits the comparison result to the synchronization control unit 120 of the precedence system calculator 100 (S129). The comparison result of S123 and the comparison result of S127 at the time of the issuing of the output request are transmitted to the precedence system calculator 100. The process returns to the calling original process.

The description returns to the description of the process of FIG. 16. At the time of reception of the output request, the calculation unit 210 executes the output when the comparison result indicates the register value and the estimated output value match (S85).

When such a process is executed, the calculation reproduction may be executed properly by the delay system calculator 200.

Figure 20:
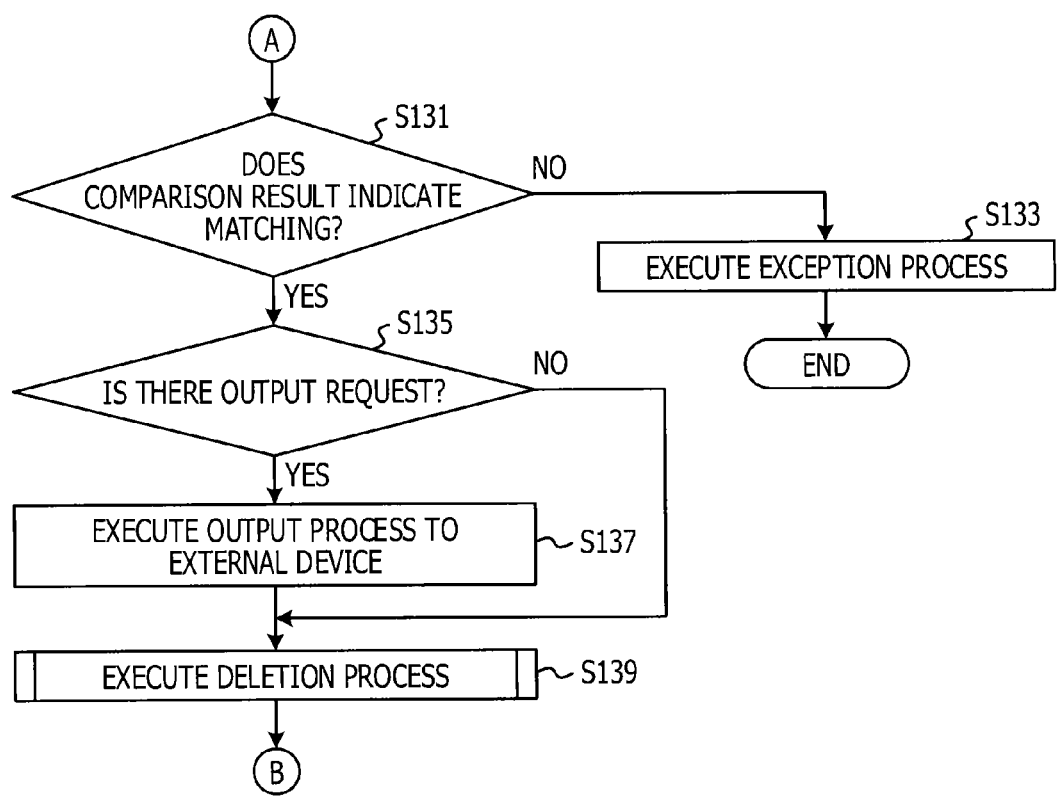
FIG. 20 is a flowchart illustrating a processing flow of a process executed by the precedence system calculator.
Figure 21:
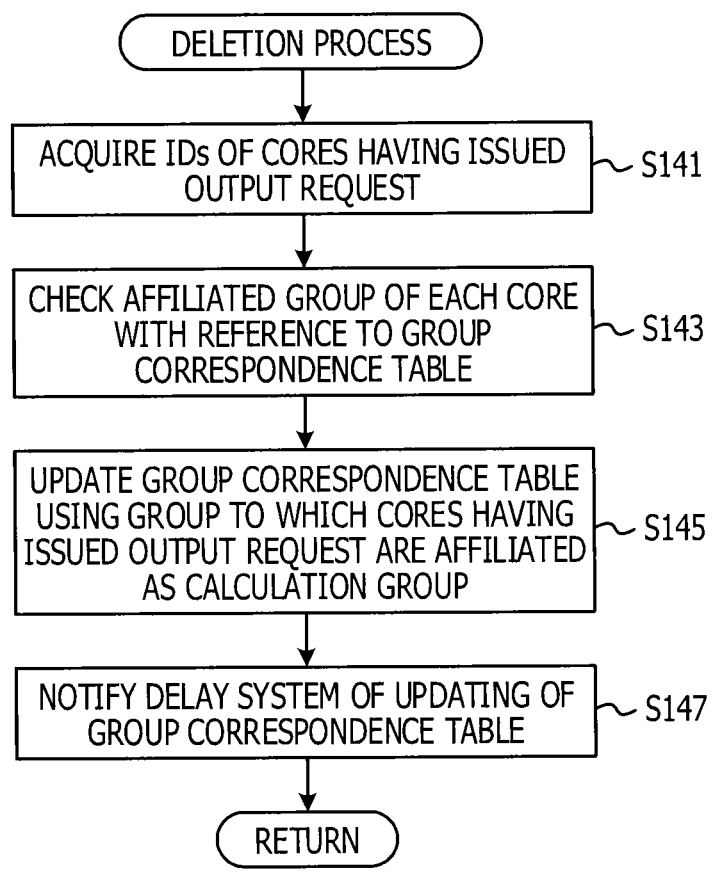
FIG. 21 is a flowchart illustrating a processing flow of a deletion process.

The description returns to the description of the process of the synchronization control unit 120 of the precedence system calculator 100 (FIGS. 20 and 21). The control unit 122 of the synchronization control unit 120 determines whether the comparison result indicates the matching when the comparison result is received from the synchronization control unit 220 of the delay system calculator 200 (S131). The matching of the register values and the matching of the estimated output values are each determined.

When the register values and the estimated output values are partially not matched, the control unit 222 executes a pre-decided exception process (S133). The exception process is the same as that of the related art and the detailed description will be omitted herein. Then, the process ends.

Conversely, when the comparison result indicates that the register values and the estimated output values are entirely matched, the control unit 122 determines whether there is an output request related to the comparison result (S135). When there is no output request related to the comparison result, the process proceeds to S139.

Conversely, when there is the output request related to the comparison result, the control unit 122 reads an output value stored in the output value storage unit 123 and outputs the output value to the external device 140 (S137).

The control unit 122 executes a deletion process (S139). When this process ends, the process returns to S3 of FIG. 10 via the terminal B. The deletion process will be described with reference to FIG. 21.

First, the group management unit 1222 of the control unit 122 acquires the IDs of the cores having issued the output request from, for example, the output value storage unit 123 (S141 in FIG. 21).

The group management unit 1222 of the control unit 122 checks the affiliated group of each core with reference to the group correspondence table of a section related to the output request (S143).

The group management unit 1222 of the control unit 122 updates the group correspondence table 1221 using the group affiliated to the cores having issued the output request as the calculation group in association with the execution sequence number at this time point (S145).

The control unit 122 notifies the synchronization control unit 220 of the delay system calculator 200 of the updating of the group correspondence table 1221 (S147). The control unit 222 of the synchronization control unit 220 in the delay system calculator 200 updates the group correspondence table 2221 when the synchronization control unit 220 is notified of the updating of the group correspondence table.

When the above-described processes are executed, as described above, use efficiency of the cores is improved, and thus the calculation efficiency is improved.

Second Embodiment

In an embodiment, an example in which functions executing the processes described in the first embodiment are mounted mainly by software will be described.

Specifically, in the embodiment, the technology described in the first embodiment is applied to a calculation virtual machine operated on a hypervisor.

Figure 22:
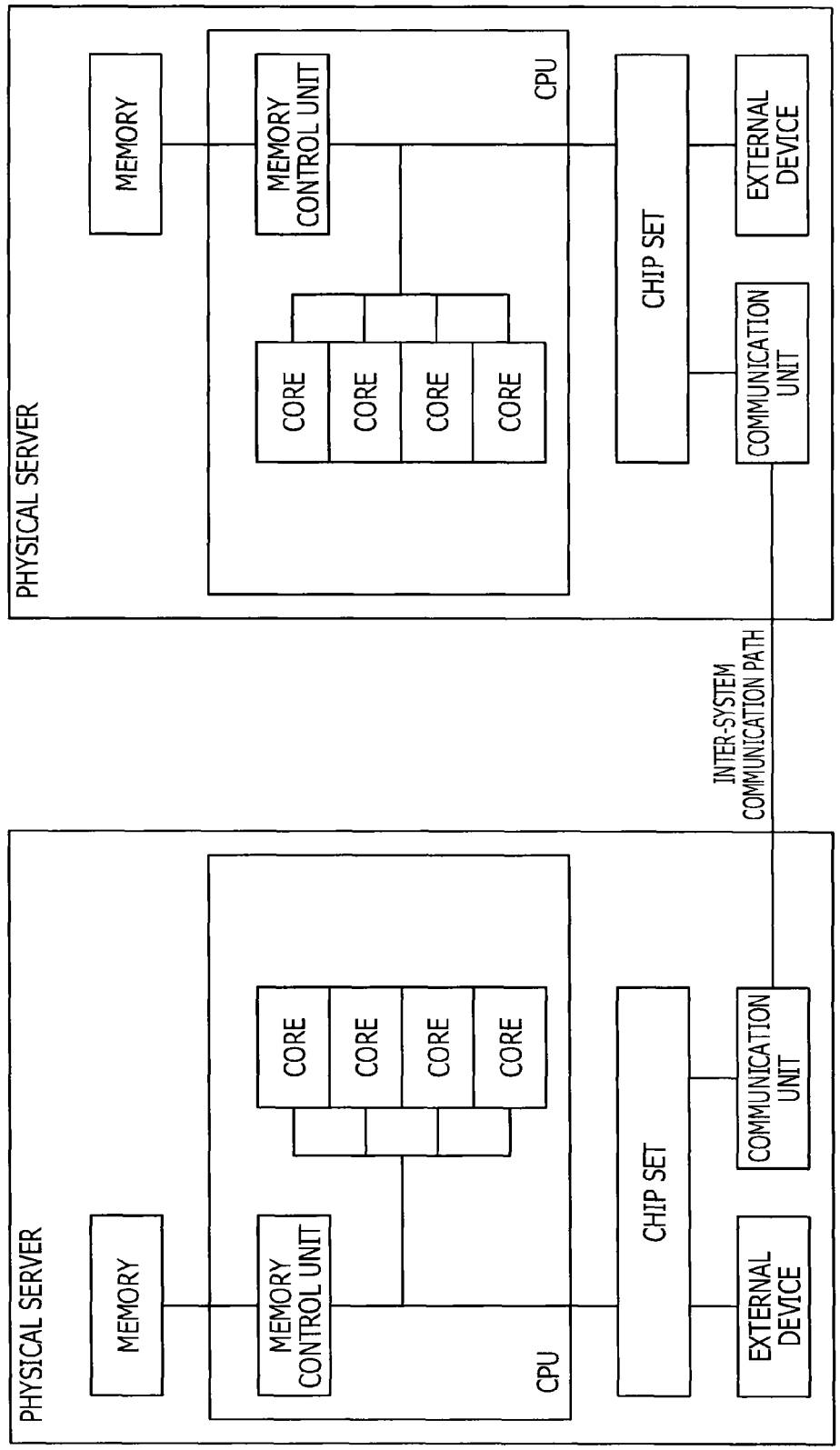
FIG. 22 is a diagram illustrating an overview of a system according to a second embodiment.

In the embodiment, as described in FIG. 22, two physical servers are connected to each other via an inter-system communication path. Each physical server includes a virtualization support mechanism, a memory control unit, a CPU including a plurality of cores (four cores in FIG. 22), a memory, a chip set, an external device, and a communication unit. In each physical server, a hypervisor is executed to activate and control a virtual machine.

The virtual machine is generated in each of the two physical servers and synchronization is established in a virtual machine level. A plurality of virtual cores may be allocated to the virtual machine to be synchronized and an SMP is executed. In the SMP, calculation is executed by cooperation of the plurality of cores using a shared memory which is a memory region which may be accessed by the plurality of cores.

Figure 23:
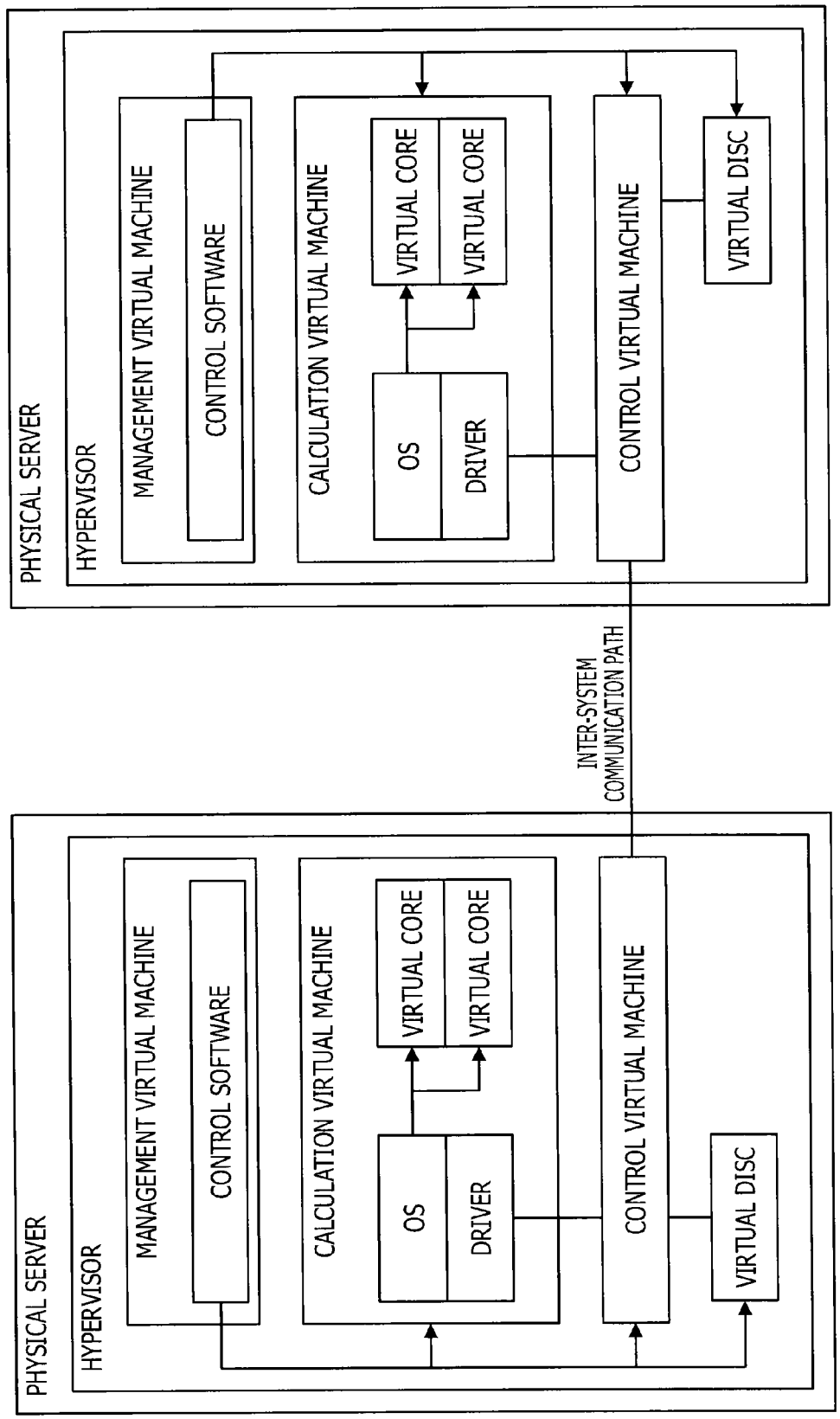
FIG. 23 is a diagram illustrating a configuration example of the system according to the second embodiment.

In the embodiment, for example, two physical servers having, for example, a configuration illustrated in FIG. 23 are constructed. The physical server is, for example, a calculator that has an Intel x86 CPU. In each physical server, for example, a hypervisor which is virtualization software called XenServer is executed and control software is executed on a management virtual machine dom0 generated on the hypervisor. The control software is software which is executed to activate, manage, and control a virtual machine for establishing synchronization.

The control software generates a calculation virtual machine and a control virtual machine in each physical server. The calculation virtual machine includes a plurality of virtual cores, and a driver executing a process according to the embodiment and a general operating system (OS) are executed.

In each physical server, a virtual disc is prepared for a kind of external device.

The calculation virtual machine and the control virtual machine are virtually wired with an internal communication path for executing mutual communication. The two physical servers realize synchronization by mutually executing communication using the inter-system communication path that directly wires the two physical servers. The calculation virtual machine corresponds to the calculation unit according to the first embodiment and the control virtual machine corresponds to the synchronization control unit according to the first embodiment.

In such a configuration, input and output of a memory, a cache, and a register are controlled and command execution is monitored by using a virtualization support mechanism (for example, Intel Virtualization Technology) which the CPU of the physical server has.

When the command execution is monitored, a counter that counts the number of executions of if branch which is a kind of counter of a performance counter in, for example, an Intel x86 CPU is used. That is, whenever if branch is executed a given number of times, calculation execution/stop is realized by pausing/resuming a virtual clock of the virtual machine using the function of the hypervisor. Further, a timing at which a process is generated is managed as an execution sequence number by using the counter.

The calculation reproduction is realized by executing pausing using the function of the hypervisor when access to the shared memory is detected using the virtualization support mechanism of the CPU, in addition to the above-described calculation execution/stop, rewriting a value of a memory of an access destination by the virtualization support mechanism, and then resuming the calculation virtual machine.

As the OS of the calculation virtual machine, for example, Windows (registered trademark) is used. To control the input and output of the calculation virtual machine and an operation of the calculation virtual machine, a driver according to the embodiment is installed. The driver notifies the control virtual machine of the input and output generated in the calculation virtual machine through virtual wiring as an output request to the external device.

As the OS of the control virtual machine, for example, Linux (registered trademark) is installed and controls the calculation virtual machine based on information obtained from the driver of the calculation virtual machine through virtual wiring. The group correspondence table is managed by the control virtual machine. When an output request is generated, the group correspondence table is generated and updated by the control virtual machine and virtual cores used for calculation of the calculation virtual machine are controlled. In the group correspondence table, the execution sequence number at the time of the generation of the output request, the ID of the virtual core executing the output request, and the execution sequence number at the time of execution of the output are treated as one set. An output process permitted by the control virtual machine which is the synchronization control unit is executed by the management virtual machine (dom0).

Third Embodiment

Figure 24:
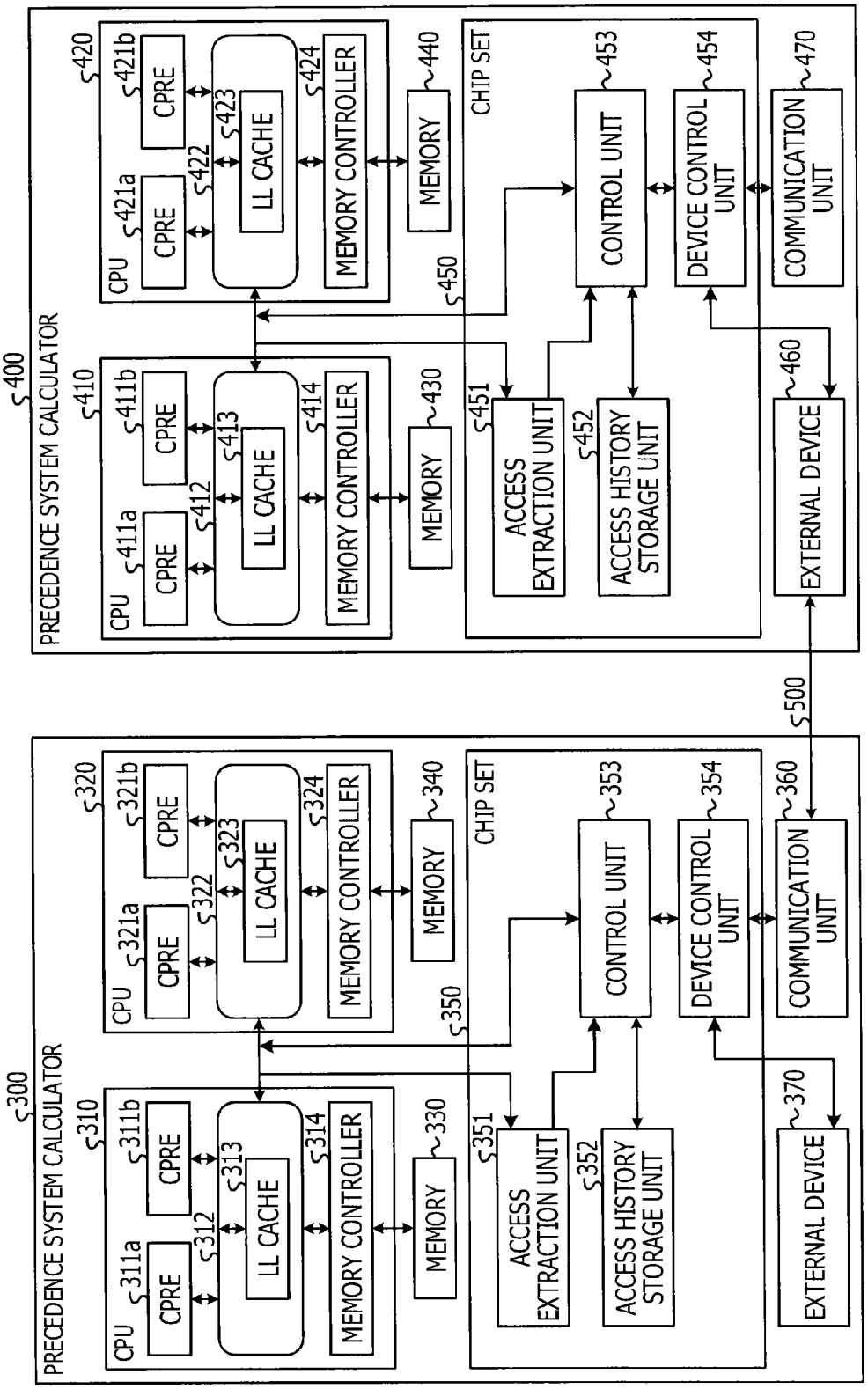
FIG. 24 is a diagram illustrating a configuration example of a system according to a third embodiment.

FIG. 24 is a diagram illustrating a configuration example of an information processing system according to an embodiment. In the embodiment, a precedence system calculator 300 and a delay system calculator 400 are connected to each other via, for example, a network such as Ethernet (registered trademark).

The precedence system calculator 300 includes CPUs 310 and 320, a chip set 350, memories 330 and 340, an external device 370, and a communication unit 360.

The CPU 310 includes cores 311a and 311b, a ring bus 312, a last level (LL) cache 313, and a memory controller 314. The cores 311a and 311b, the LL cache 313, and the memory controller 314 are connected to the ring bus 312. The memory 330 which is a shared memory is connected to the memory controller 314.

The CPU 320 also includes cores 321a and 321b, a ring bus 322, an LL cache 323, and a memory controller 324. The cores 321a and 321b, the LL cache 323, and the memory controller 324 are connected to the ring bus 322. The memory 340 which is a shared memory is connected to the memory controller 324.

The CPU 310 and the CPU 320 are connected to each other via a Quick Path Interconnect (QPI) bus 380, and the chip set 350 is also connected to the QPI bus 380.

The chip set 350 includes an access extraction unit 351 that extracts access to the memories 330 and 340 which are the shared memories, an access history storage unit 352, a control unit 353 that executes a main process in the embodiment, and a device control unit 354 that has the function of a chip set of the related art.

The access extraction unit 351 and the control unit 353 receives memory transactions by the cores 311a and 311b and the cores 321a and 321b via the QPI bus 380. The device control unit 354 is connected to the external device 370 and the communication unit 360 via, for example, a Peripheral Component Interconnect Express (PCIe). The control unit 353 executes output to the external device 370 and the communication unit 360 via the device control unit 354. The access extraction unit 351, the access history storage unit 352, and the control unit 353 are mounted with a field-programmable gate array (FPGA). In the embodiment, the output value storage unit 123 in the first embodiment is not provided.

In the embodiment, the LL caches 313 and 323 are used as buffers. Whenever each core executes an access request to the shared memory at the time of execution of an IF command, each core outputs a signal to the QPI bus 380. The CPUs 310 and 320, the QPI bus 380, and the access extraction unit 351 in the embodiment correspond to the calculation unit in the first embodiment. The units of the chip set 350 excluding the access extraction unit 351 and the communication unit 360 in the embodiment correspond to the synchronization control unit in the first embodiment.

The control unit 353 and the access extraction unit 351 monitor a generated command by monitoring the ring bus 312 via the QPI bus 380. Accordingly, access to the memories 330 and 340 is monitored to count the number of times the IF command is executed. By correcting an interrupt vector table so that the control unit 353 is notified of content output at the time of generation of output interrupt, the control unit 353 acquires generation of an output request (which is also referred to as an output command). In the embodiment, since no output value storage unit is provided in the chip set 350, writing on input output (IO) spaces by the CPUs 310 and 320 is executed on the memories 330 and 340 and is executed via the control unit 353 again after execution of calculation reproduction or the like.

The control unit 353 counts the number of times the IF command is executed by the cores 311a and 311b and the cores 321a and 321b. Whenever the IF command is executed a given number of times, a synchronization confirmation point is generated. Based on the counted number, the control unit 353 possesses an execution sequence number indicating a timing at which each core executes the IF command.

The delay system calculator 400 has the same configuration as the precedence system calculator 300. That is, the delay system calculator 400 includes CPUs 410 and 420, a chip set 450, memories 430 and 440, an external device 470, and a communication unit 460.

The CPU 410 includes cores 411a and 411b, a ring bus 412, a last level (LL) cache 413, and a memory controller 414. The cores 411a and 411b, the LL cache 413, and the memory controller 414 are connected to the ring bus 412. The memory 430 which is a shared memory is connected to the memory controller 414.

The CPU 420 also includes cores 421a and 421b, a ring bus 422, an LL cache 423, and a memory controller 424. The cores 421a and 421b, the LL cache 423, and the memory controller 424 are connected to the ring bus 422. The memory 440 which is a shared memory is connected to the memory controller 424.

The chip set 450 includes an access extraction unit 451 that extracts access to the memories 430 and 440 which are the shared memories, an access history storage unit 452, a control unit 453 that executes a main process in the embodiment, and a device control unit 454 that has the function of a chip set of the related art.

The access extraction unit 451 and the control unit 453 receives memory transactions by the cores 411a and 411b and the cores 421a and 421b via the QPI bus 480. The device control unit 454 is connected to the external device 470 and the communication unit 460 via, for example, a Peripheral Component Interconnect Express (PCIe). The control unit 453 executes output to the external device 470 and the communication unit 460 via the device control unit 454. The access extraction unit 451, the access history storage unit 452, and the control unit 453 are mounted with a field-programmable gate array (FPGA). In the embodiment, the output value storage unit 223 in the first embodiment is not provided.

Whenever each core executes an access request to the shared memory at the time of execution of an IF command, each core outputs a signal to the QPI bus 480. The CPUs 410 and 420, the QPI bus 480, and the access extraction unit 451 in the embodiment correspond to the calculation unit in the first embodiment. The units of the chip set 450 excluding the access extraction unit 451 and the communication unit 460 in the embodiment correspond to the synchronization control unit in the first embodiment. The control unit 453 and the access extraction unit 451 monitor a generated command by monitoring the ring bus 412 via the QPI bus 480.

As described above, in the embodiment, since values output in response to the output request are stored in the memories 330 and 340, a structure is adopted to avoid that estimated output values stored in the memories 330 and 340 are rewritten before the output process is actually executed.

For this reason, in the embodiment, an output mode is provided in which the cores of the calculation group execute provisional calculation until the output request is generated and then the output is actually completed.

A difference between the provisional calculation and calculation in a normal mode is access to the memories 330 and 340 which are the shared memories. To avoid that the estimated output values are rewritten, consistency of the memories 330 and 340 is maintained by indirectly referring to the LL cache 313 or 323, which is a buffer without executing writing directly, on the shared memories on the memories 330 and 340. Here, to store the estimated output values temporarily in regions other than the memories 330 and 340, the address of the memory 330 or 340 and the value are maintained in the LL cache 313 or 323.

In the provisional calculation, the following memory related processes are performed:

(a) when access to the memories 330 and 340 is generated, values of corresponding addresses in the LL cache 313 or 323 are referred to rather than the values of the memories 330 and 340;

(b) when reading is generated in a state in which the values of the corresponding addresses are not present in the LL caches 313 and 323, a value in the memory 330 or 340 is directly referred to;

(c) when writing is generated in the state in which the values of the corresponding addresses are not present in the LL caches 313 and 323, the writing on the memory 330 or 340 is not executed, and the corresponding address is newly generated instead in the LL cache 313 or 323 and the writing is executed thereon;

(d) generations are present in the LL caches 313 and 323, and thus a memory state different for each generation may be maintained. While the generation is not updated, the access to the memory 330 or 340 is access to the same address of the LL cache 313 or 323; and (e) by designating the generations and executing commitment in regard to information on the LL caches 313 and 323, information regarding the designated generations in the LL caches 313 and 323 is reflected to the memory 330 or 340.

In the delay system calculator 400, provisional calculation reproduction is executed to correspond to the provisional calculation. Further, in the delay system calculator 400, calculation reproduction is executed to correspond to the calculation in the normal mode.

For this reason, for example, the LL caches 313 and 323 in the CPUs 310 and 320 stores a generation management table, as illustrated in FIG. 25. In the example of FIG. 25, the generation management table includes identification information of the generation and the execution sequence number at the time of generation updating. As will be described below, the generation is updated when the synchronization confirmation point and the output request are detected and the output is actually executed.

The LL cache 313 or 323 maintains data, for example, as illustrated in FIG. 26. In the example of FIG. 26, a value, a corresponding address in the memory 330 or 340, and a generation are stored for each buffer address.

When commitment of the provisional calculation designated by the execution sequence number is instructed from the control unit 353, data of the corresponding generation is written on the memory 330 or 340 from the LL cache 313 or 323. In the examples of FIGS. 25 and 26, when commitment of execution sequence numbers 001500 to 003000 is instructed, the commitment is made with generation "2." Therefore, "2" of address A and "3" of address B are written on the memory 330 or 340.

In the embodiment, the control units 353 and 453 manage a group correspondence table illustrated in FIG. 27. In the embodiment, the execution sequence number at the time of the output request, the ID (group ID) of a group of the cores executing the output request, the ID (core ID) of the core affiliated to the group, and the execution sequence number at the time of output are registered. In the example of FIG. 27, it is indicated that on the assumption that the output have already been executed actually in the first line, but the output request is detected in the second line, the execution sequence number at the time of the output request, the group ID, and the core ID are registered.

Figure 28:
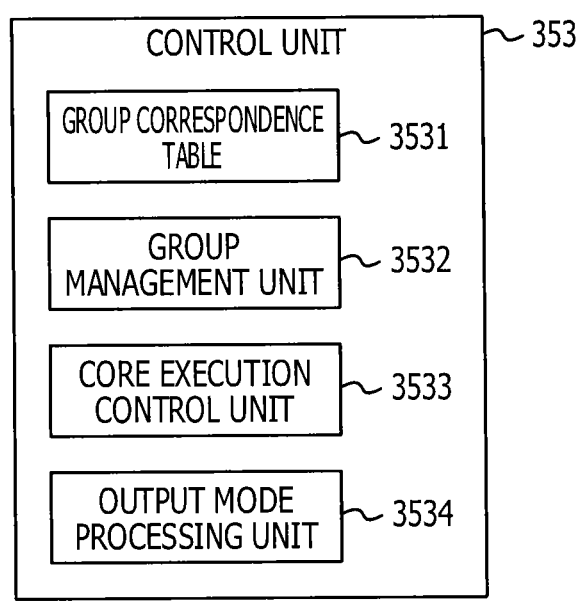
FIG. 28 is a functional block diagram illustrating a control unit of a precedence system calculator according to the third embodiment.

The control unit 353 in the precedence system calculator 300 includes a group correspondence table 3531, a group management unit 3532, a core execution control unit 3533, and an output mode processing unit 3534, as illustrated in FIG. 28. The group management unit 3532 and the core execution control unit 3533 have the same functions as the group management unit and the core execution control unit in the first embodiment. The output mode processing unit 3534 executes processes related to the output mode and the provisional calculation.

Figure 29:
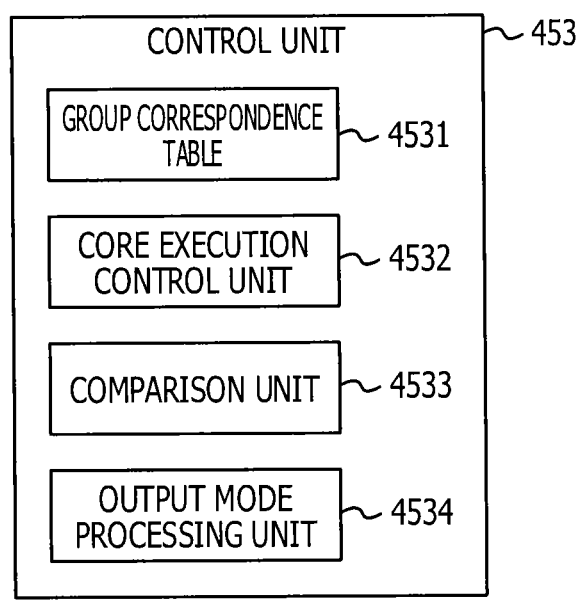
FIG. 29 is a functional block diagram illustrating a control unit of a delay system calculator according to the third embodiment.

The control unit 453 in the delay system calculator 400 includes a group correspondence table 4531, a core execution control unit 4532, a comparison unit 4533, and an output mode processing unit 4534, as illustrated in FIG. 29. The core execution control unit 4532 and the comparison unit 4533 have the same functions as the core execution control unit and the comparison unit in the first embodiment. The output mode processing unit 4534 executes processes related to the output mode and the provisional calculation reproduction.

Next, process content according to the embodiment will be described with reference to FIGS. 30 to 50.

Figure 30:
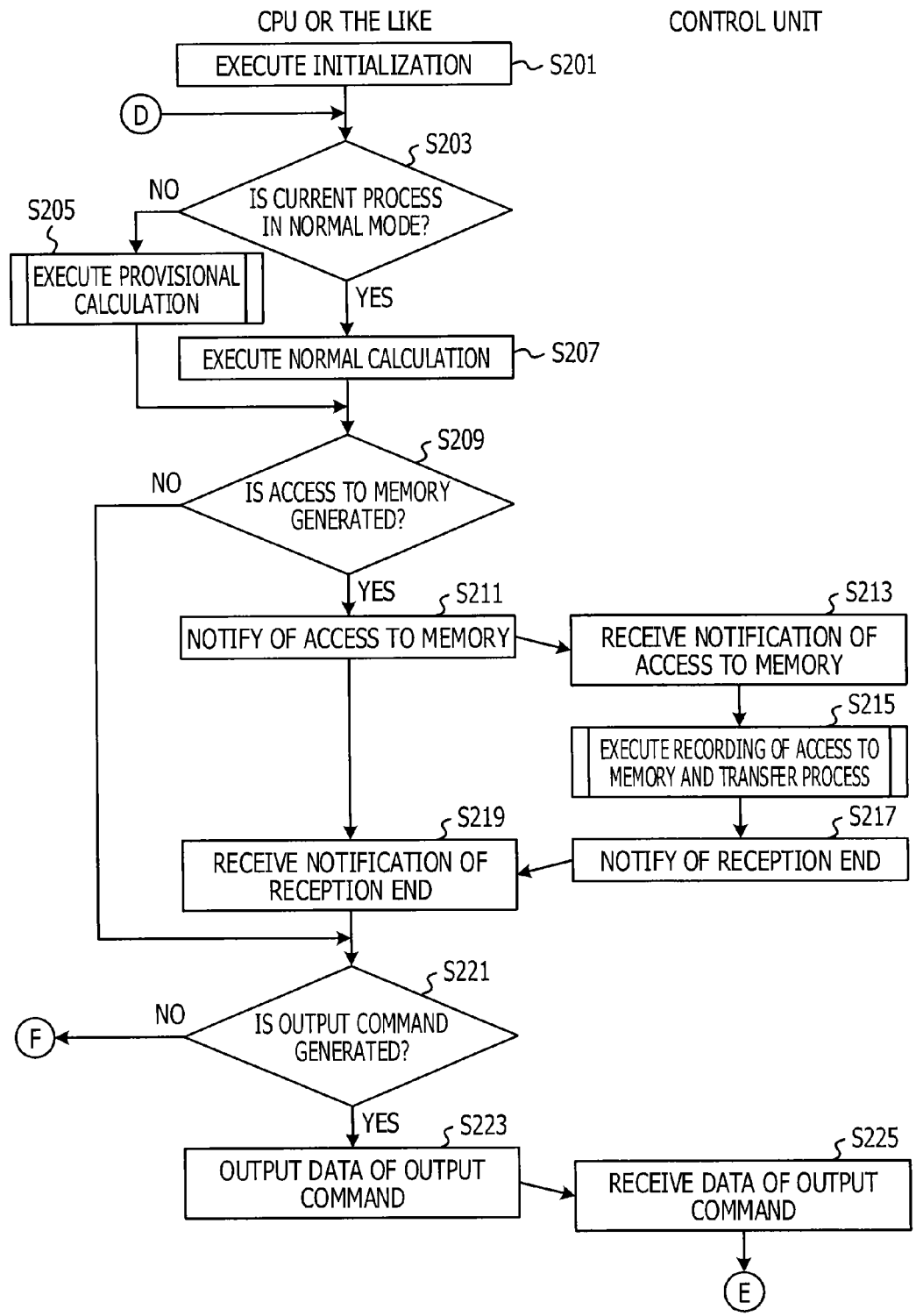
FIG. 30 is a flowchart illustrating a processing flow of a process executed by the precedence system calculator according to the third embodiment.

First, the CPUs 310 and 320 and the control unit 353 in the precedence system calculator 300 execute a process for initialization (S201 in FIG. 30). This process is the same as the initialization process in the first embodiment. Data of the memory, data of the cache, and a register value are copied from the precedence system calculator 300 to the delay system calculator 400, and the group correspondence table 3531 of the precedence system calculator 300 is copied to the delay system calculator 400. Initially, no output group is present in the group correspondence table 3531. Therefore, an empty group correspondence table is copied to the delay system calculator 400.

When a current process is in the normal mode (Yes route in S203), the CPUs 310 and 320 in the precedence system calculator 300 execute normal calculation (S207). Since the normal calculation is the same as that of the related art, the normal calculation will not be described. Initially, the normal calculation is executed.

Conversely, when the current process is in the output mode (No route in S203), the CPUs 310 and 320 in the precedence system calculator 300 execute the provisional calculation (S205). The provisional calculation is calculation which is executed by only the cores affiliated to the calculation group and on which direct writing on the memory 330 or 340 is not executed. The provisional calculation will be described with reference to FIG. 31.

Figure 31:
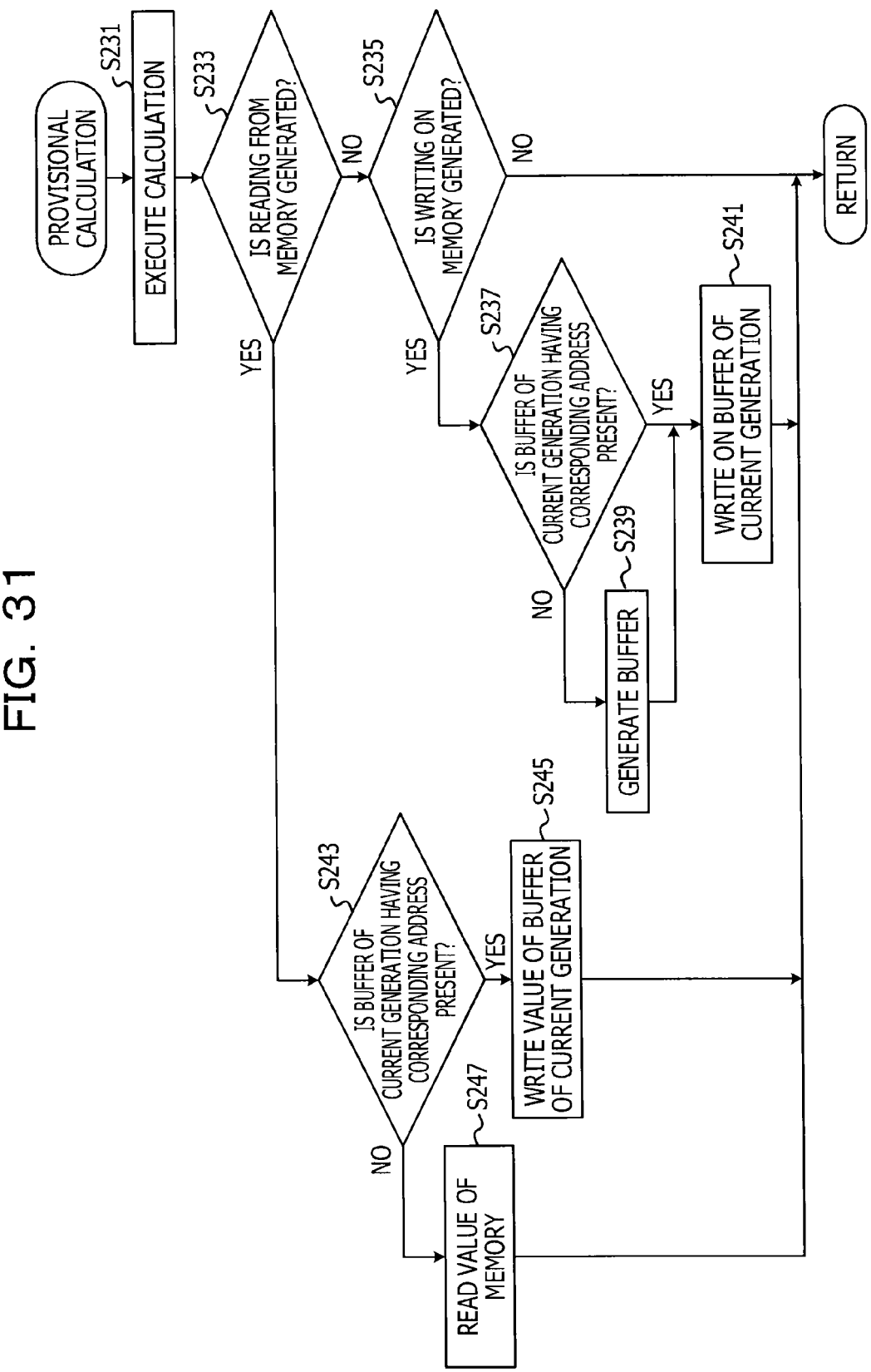
FIG. 31 is a flowchart illustrating a processing flow of provisional calculation.

The cores (at least one of the cores 311*a* and 311*b* and the cores 321*a* and 321*b*) of the CPUs 310 and 320 execute predetermined calculation (S231 in FIG. 31).

When reading from the memory 330 or 340 is generated during the calculation (Yes route in S233), the cores of the CPUs 310 and 320 determine whether the buffer of a current generation having the corresponding address is present in the LL cache 313 or 323 (S243). When the buffer of the current generation having the corresponding address in the LL cache 313 or 323 is not present, the cores of the CPUs 310 and 320 read the value from the memory 330 or 340 (S247). Conversely, when the buffer of the current generation having the corresponding address in the LL cache 313 or 323 is present, the cores of the CPUs 310 and 320 read the value of the buffer of the current generation from the LL cache 313 or 323 (S245).

Conversely, when the reading from the memory 330 or 340 is not generated during the calculation (No route in S233) and writing on the memory 330 or 340 is generated (Yes route in S235), the cores of the CPUs 310 and 320 determine whether the buffer of the current generation having the corresponding address is present in the LL cache 313 or 323 (S237). When the writing on the memory 330 or 340 is not generated (No route in S235), the process returns to the calling original process.

When the buffer of the current generation having the corresponding address is not present in the LL cache 313 or 323, the cores of the CPUs 310 and 320 generate a buffer region for the writing of this time in the LL cache 313 or 323 (S239). Then, the process proceeds to S241.

When the buffer of the current generation having the corresponding address is present in the LL cache 313 or 323, the cores of the CPUs 310 and 320 execute writing on the buffer of the current generation in the LL cache 313 or 323 (S241).

These processes are repeated so as to avoid that the result of the writing on the memory 330 or 340 corresponding to the output to the IO spaces by the cores of the CPUs 310 and 320 is updated carelessly.

The description returns to the description of the process of FIG. 30. When the access extraction unit 351 detects the access to the memory 330 or 340 via the QPI bus 380 (Yes route in S209), the access extraction unit 351 notifies the control unit 353 of the access to the memory 330 or 340

(S211). The control unit 353 is notified of the IDs of the cores executing the access and access content.

The control unit 353 receives the access notification to the memory 330 or 340 from the access extraction unit 351 (S213). Accordingly, the control unit 353 records the access to the memory and executes the transfer process (S215). This process will be described with reference to FIG. 32.

Figure 32:
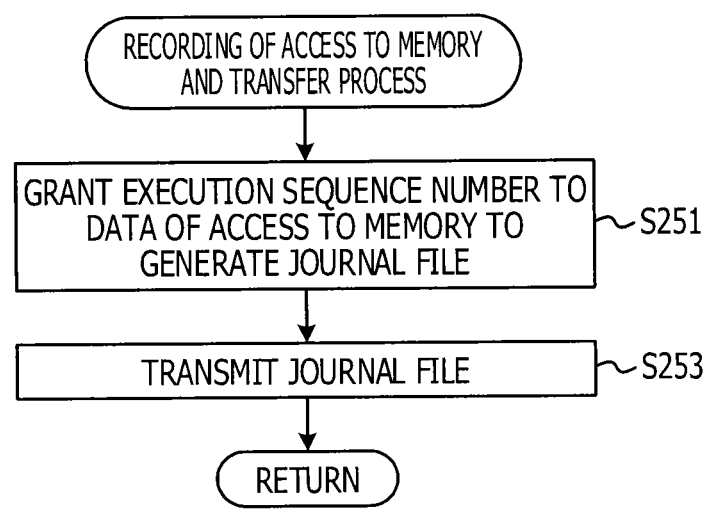
FIG. 32 is a flowchart illustrating a processing flow of recording of access and a transfer process to a memory.

The control unit 353 grants an execution sequence number to the data of the access to the memory to generate a journal file and stores the journal file in the access history storage unit 352 (S251 in FIG. 32).

The control unit 353 transmits the generated journal file to the delay system calculator 400 (S253). Then, the process returns to the calling original process.

The description returns to the description of the process of FIG. 30. The control unit 353 notifies the access extraction unit 351 of the reception completion after receiving the notification of the access to the memory (S217). On the other hand, the access extraction unit 351 receives the notification of the reception completion from the control unit 353 (S219).

Figure 39:
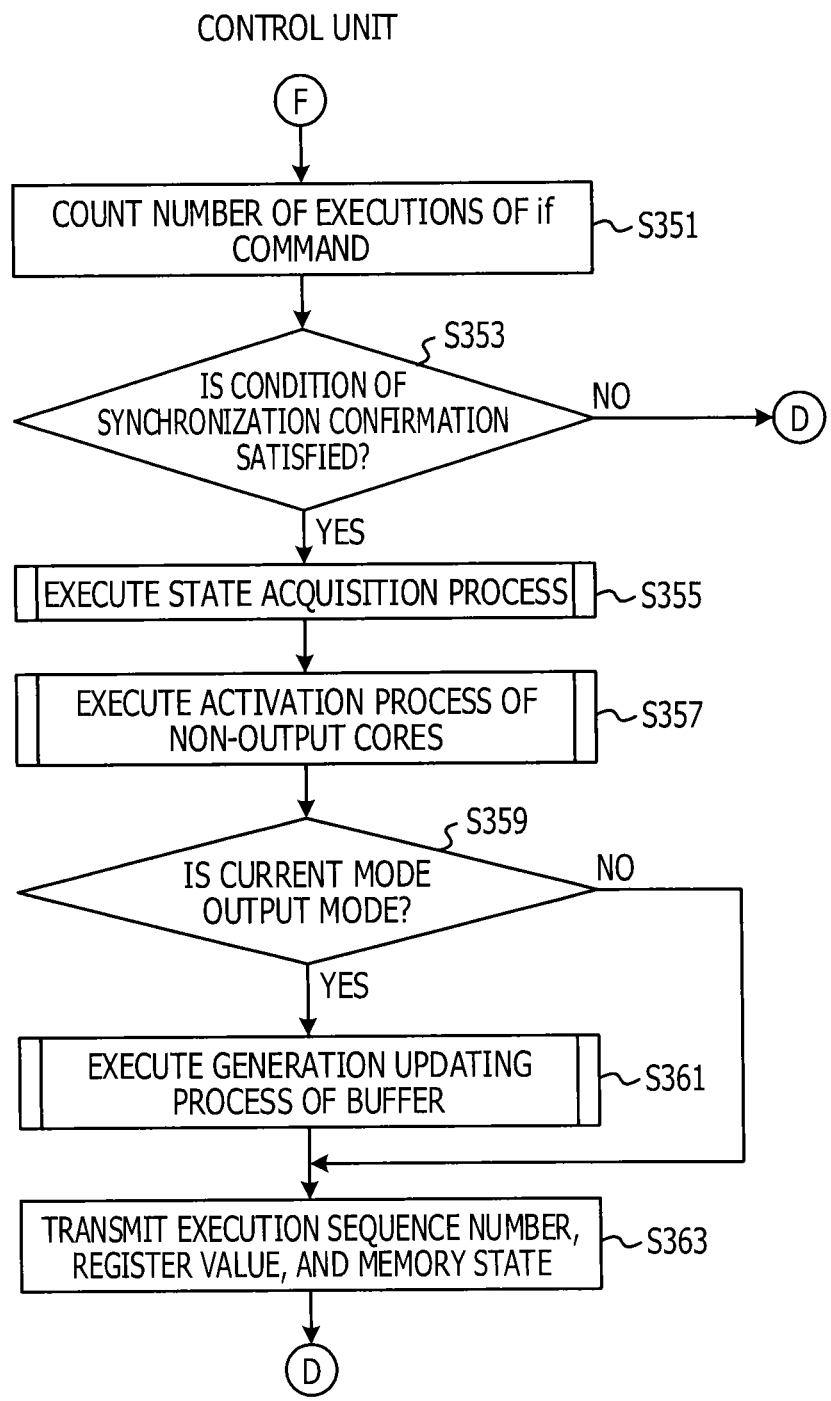
FIG. 39 is a flowchart illustrating a processing flow of a process executed by the precedence system calculator according to the third embodiment.

After S219 or when the access to the memory 330 or 340 is not detected (No route in S209) and when no output command is generated (No route in S221), the process proceeds to the process of FIG. 39 via a terminal F.

Conversely, when the output command is generated (Yes route in S221), writing on the LL cache 313 or 323 or the memory 330 or 340 is executed. Therefore, the data (output content and the IDs of the cores generating the output command) of the output command is output to the control unit 353 via the QPI bus 380 (S223). The control unit 353 receives the data of the output command by the CPUs 310 and 320 via the QPI bus 380 (S225). Then, the process proceeds to the process of FIG. 33 via a terminal E.

Figure 33:
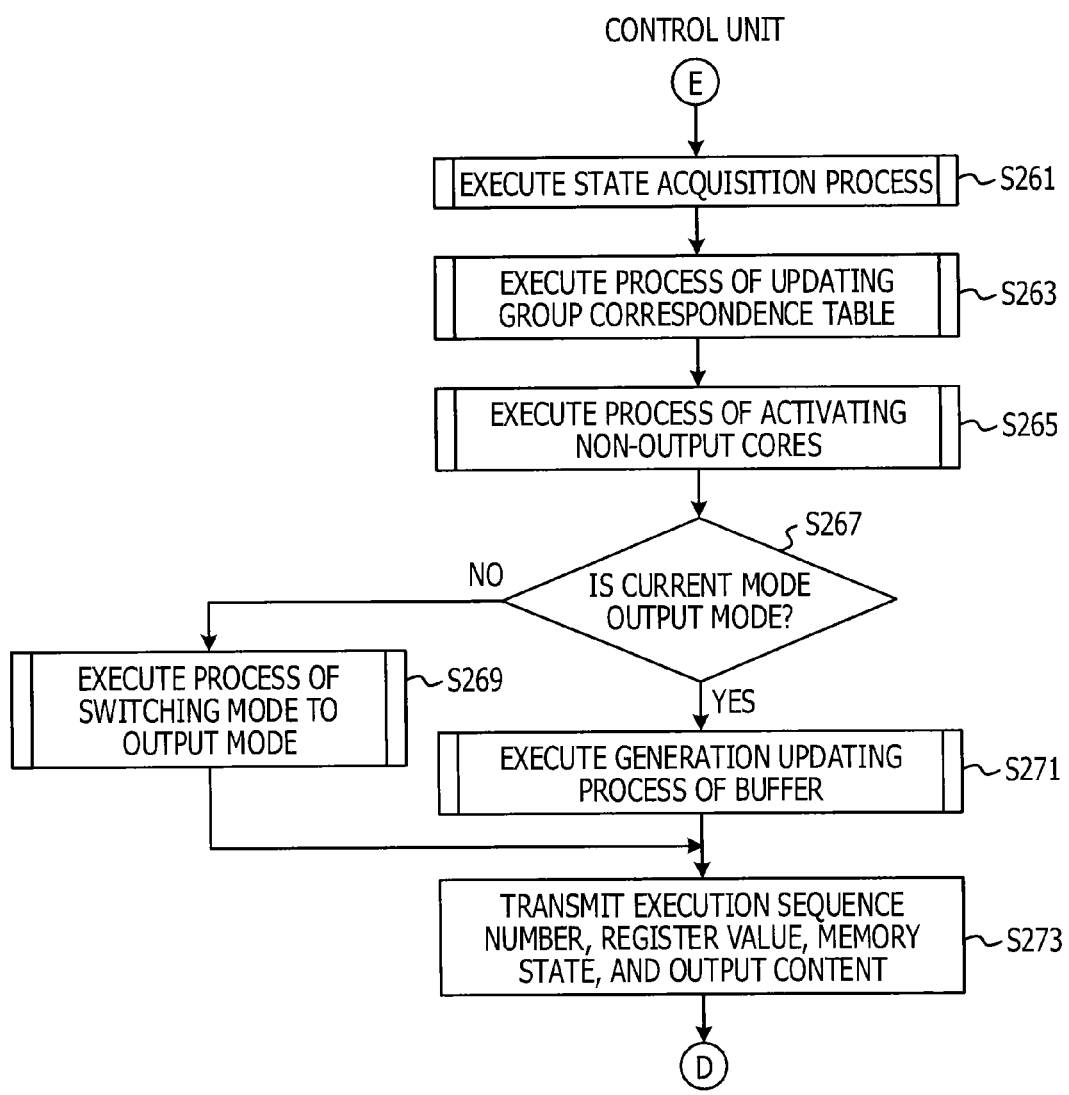
FIG. 33 is a flowchart illustrating a processing flow of a process executed by the precedence system calculator according to the third embodiment.

The description of the process of FIG. 33 will proceed, the control unit 353 executes a state acquisition process after the terminal E (S261). The state acquisition process will be described with reference to FIG. 34.

Figure 34:
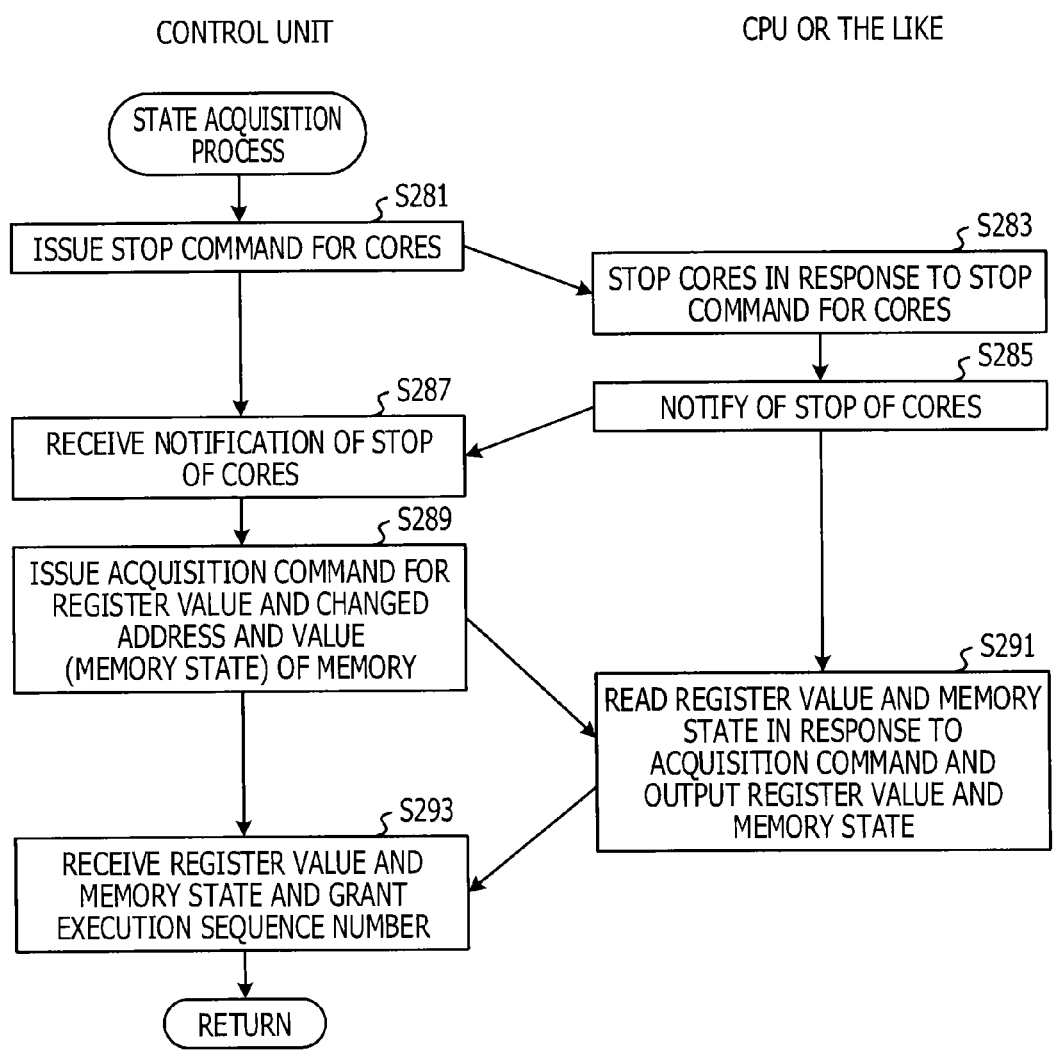
FIG. 34 is a flowchart illustrating a processing flow of a state acquisition process.
Figure 35:
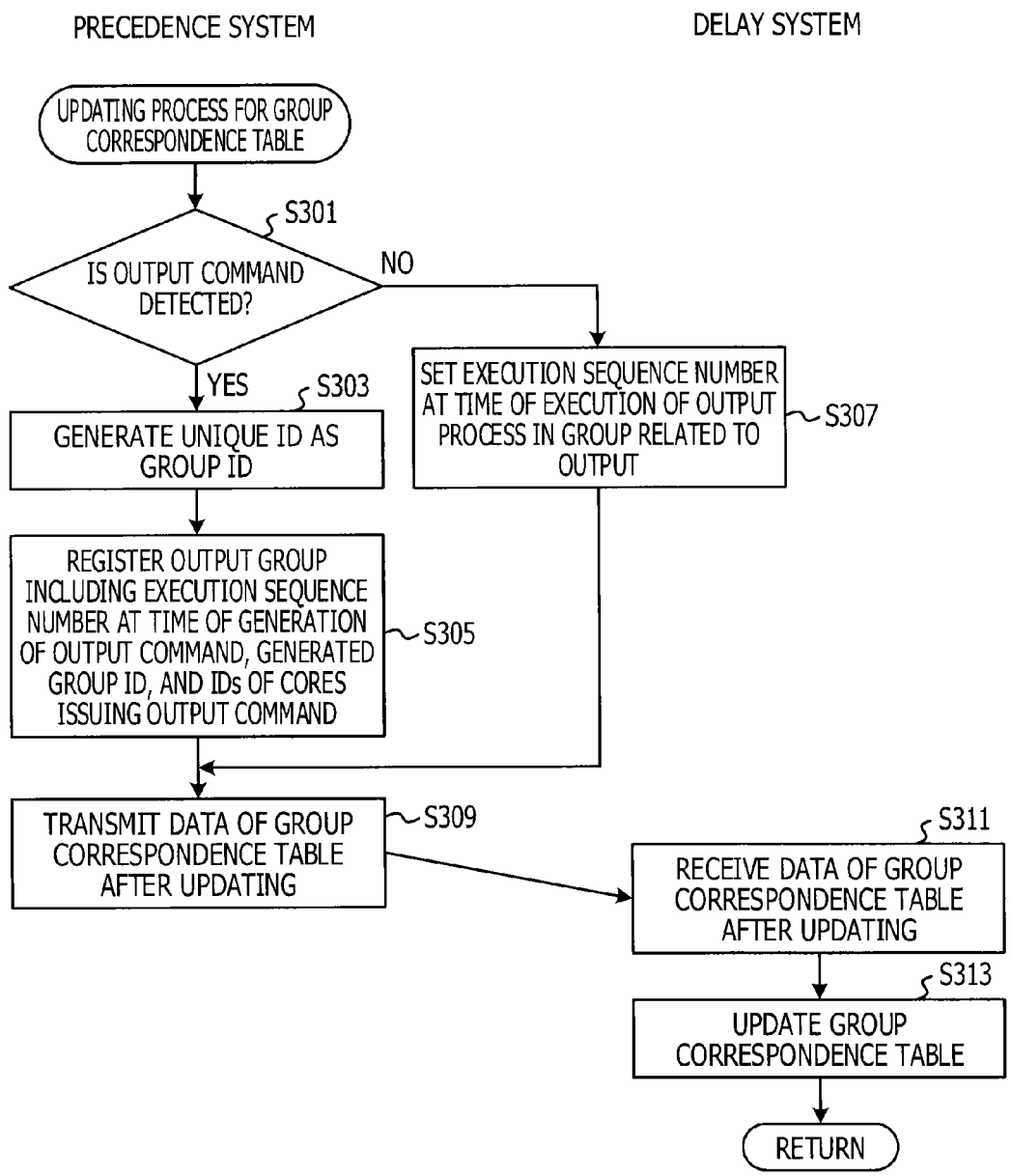
FIG. 35 is a flowchart illustrating a processing flow of an updating process for the group correspondence table.

First, the core execution control unit 3533 of the control unit 353 issues a stop command for the cores to the CPUs 310 and 320 (S281 in FIG. 34). The cores of the CPUs 310 and 320 stop the cores in response to the stop command for the cores from the control unit 353 (S283) and notify the control unit 353 of the stop of the cores (S285).

The core execution control unit 3533 of the control unit 353 receives the notification of the stop of the cores from the CPUs 310 and 320 (S287). Then, the control unit 353 issues an acquisition command for the register value and the changed address and value (referred to as a memory state) of the memory to the cores of the CPUs 310 and 320 (S289). The cores of the CPUs 310 and 320 read the register value and the memory state in response to the acquisition command and output the register value and the memory state to the control unit 353 (S291).

The control unit 353 receives data of the register value and the memory state from the CPUs 310 and 320 and grants the execution sequence number at the current time point (S293). The process returns to the process of FIG. 33.

The description returns to the description of the process of FIG. 33. The group management unit 3532 of the control unit 353 executes an updating process for the group correspondence table (S263). The updating process for the group correspondence table will be described with reference to FIG. 35.

First, when the output command is detected (Yes route in S301), the group management unit 3532 of the control unit 353 generates a unique ID as a group ID (S303). For example, a number may be issued in serial. The group management unit 3532 executes updating so that data of the output group including the execution sequence number at the time of the generation of the output command, the generated group ID, and the IDs of the cores issuing the output command are registered in the group correspondence table 3531 (S305).

The group management unit 3532 transmits the data of the group correspondence table after the updating to the delay system calculator 400 (S309).

On the other hand, the control unit 453 of the delay system calculator 400 receives the data of the group correspondence table after the updating (S311) and updates the group correspondence table 4531 in the delay system calculator 400 based on the received data of the group correspondence table (S313).

Conversely, when the output command is not detected (No route in S301), the output process is executed by the output command. Therefore, the group management unit 3532 executes updating so that the execution sequence number at the time of the execution of the output process is set in the group related to the output (S307). Then, the process proceeds to S309.

In this way, the group correspondence table of the delay system calculator 400 is synchronized with the group correspondence table of the precedence system calculator 300.

To return to the description of the process of FIG. 33, the control unit 353 executes an activation process for the non-output cores (S265). The activation process for the non-output cores will be described with reference to FIG. 36.

Figure 36:
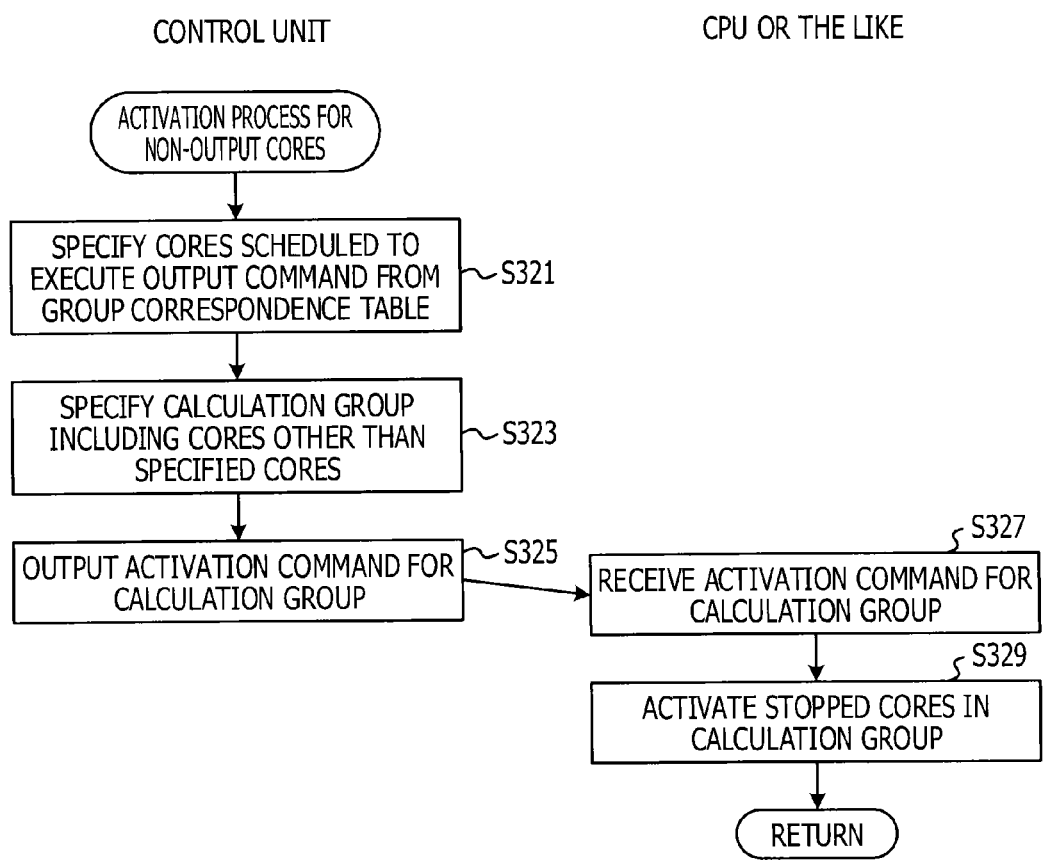
FIG. 36 is a flowchart illustrating a processing flow of a running process of non-output cores.
Figure 37:
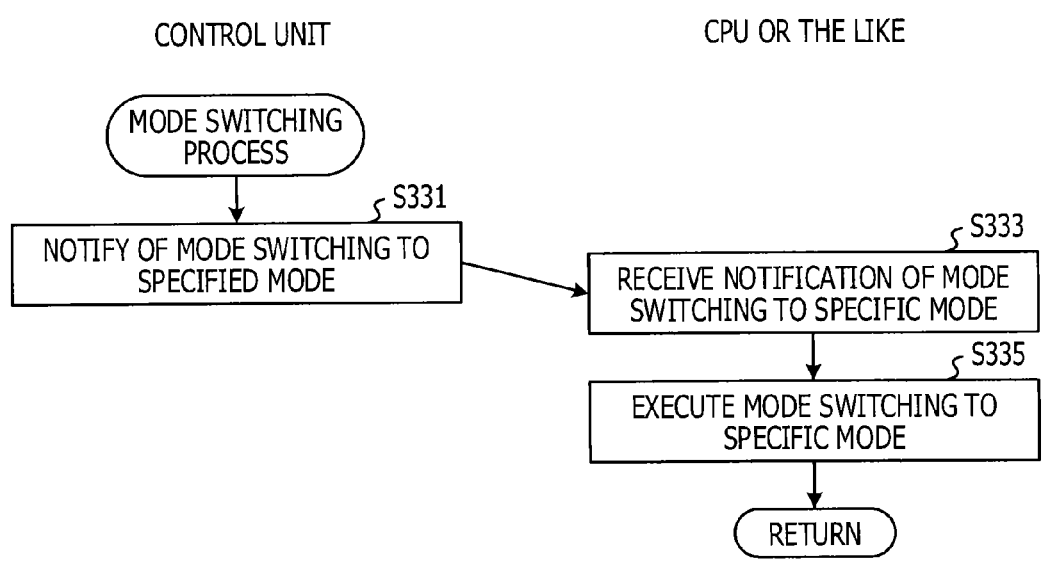
FIG. 37 is a flowchart illustrating a processing flow of a mode switching process.
Figure 38:
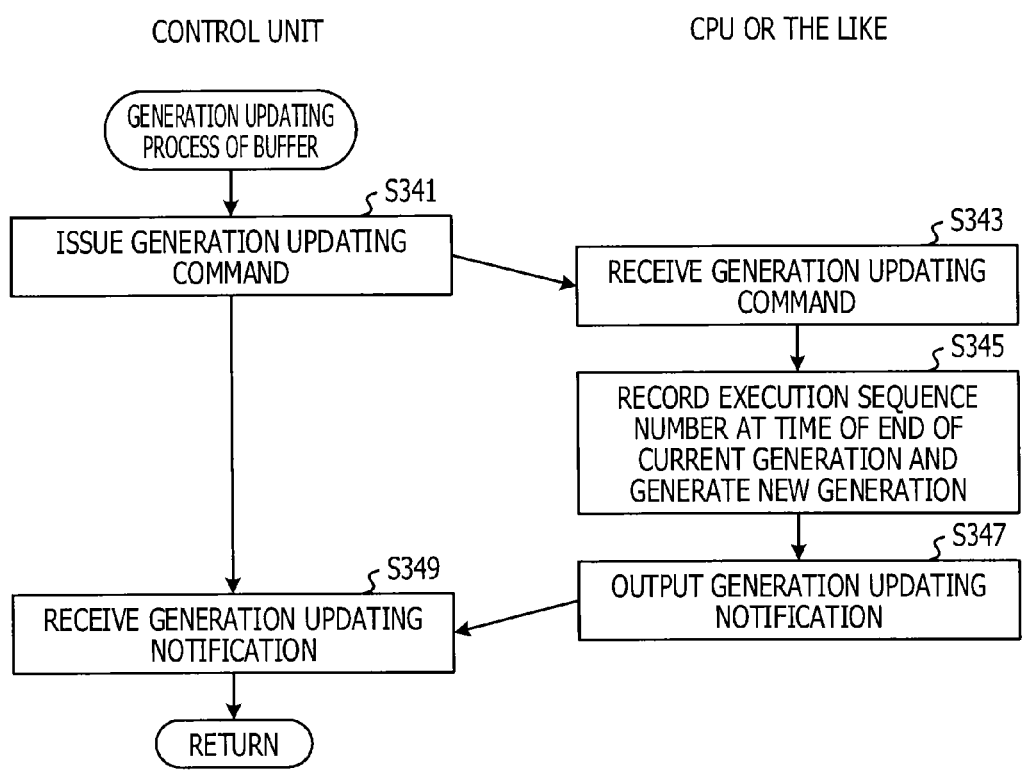
FIG. 38 is a flowchart illustrating a processing flow of a generation updating process of a buffer.

The core execution control unit 3533 of the control unit 353 specifies the cores scheduled to execute the output command from the group correspondence table 3531 (S321 in FIG. 36). As illustrated in FIG. 27, since only the IDs of the cores issuing the output command are registered in the group correspondence table 3531 according to the embodiment, the IDs of the cores affiliated to the group in which the output is not completed are specified.

The core execution control unit 3533 of the control unit 353 specifies the cores of the calculation group including the cores other than the specified cores (S323). Thereafter, the core execution control unit 3533 of the control unit 353 outputs an activation command for the calculation group (including the core IDs) to the CPUs 310 and 320 (S325).

On the other hand, the CPUs 310 and 320 receive the activation command for the calculation group (S327). Then, the CPUs 310 and 320 activate the cores stopped in the calculation group (S329). In this way, the cores executing the following provisional calculation enter an activation state. Then, the process returns to the calling original process.

The description returns to the description of the process of FIG. 33. The control unit 353 determines whether the current mode is the output mode (S267). Initially, the mode is a standard mode. When the current mode is the standard mode, the control unit 353 executes a mode switching process of switching the mode to the output mode (S269). The mode switching process will be described with reference to FIG. 37.

The control unit 353 notifies the CPUs 310 and 320 of mode switching to a specific mode (for example, the output mode) (S331). On the other hand, the CPUs 310 and 320 receives the notification of the mode switching to the specific mode (S333).

Then, the CPUs 310 and 320 execute the mode switching to the specific mode (S335). Thereafter, the CPUs 310 and 320 execute a process according to the specific mode. Then, the process returns to the calling original process.

The description returns to the description of the process of FIG. 33. When the current mode is output mode, the control unit 353 executes the generation updating process of the buffer (S271). The generation updating process of the buffer will be described with reference to FIG. 38.

First, the control unit 353 issues a generation updating command including the current execution sequence number to the CPUs 310 and 320 (S341). On the other hand, the CPUs 310 and 320 receive the generation updating command including the current execution sequence number (S343).

Then, the CPUs 310 and 320 record the generation management table (see FIG. 25) as the execution sequence number (the execution sequence number at the time of the end of the current generation) at the time of the updating the received execution sequence number and generates a new generation (S345). The CPUs 310 and 320 output generation updating notification to the control unit 353 (S347).

The control unit 353 receives the generation updating notification from the CPUs 310 and 320 (S349). Then, the process returns to the calling original process.

In this way, the data management in the LL caches 313 and 323 of the CPUs 310 and 320 is changed.

The description returns to the description of the process of FIG. 33. The control unit 353 transmits the execution sequence number, the register value of each core, the memory state, and the output content to the delay system calculator 400 (S273).

The process at the time of the detection of the output command temporarily ends and the process returns to the process of S203 of FIG. 30 via the terminal D.

Conversely, when the output command is not generated in S221 of FIG. 30, the process of FIG. 39 is executed via the terminal F. That is, the control unit 353 counts the number of executions of an IF command (S351).

The control unit 353 determines whether a condition of the synchronization confirmation in which the number of executions of the IF command reaches a predetermined number of times is satisfied (S353). When the condition of the synchronization confirmation is not satisfied, the process returns to S203 of FIG. 30 via the terminal D.

Conversely, when the condition of the synchronization confirmation is satisfied, the control unit 353 executes a state acquisition process (S355). This process is the same as the process described in FIG. 34.

Thereafter, the control unit 353 executes the activation process of the non-output cores (S357). This process is the same as the process described in FIG. 36.

When the current mode is the output mode, the control unit 353 executes the generation updating process of the buffer (S361). This process is the process described in FIG. 38. Conversely, when the current mode is not the output mode, the process proceeds to S363.

The control unit 353 transmits the execution sequence number, the register value of each core, and the memory state to the delay system calculator 400 (S363). Then, the process returns to S203 of FIG. 30 via the terminal D.

In this way, even when the output command is not issued, data regarding the synchronization confirmation point is transmitted to the delay system calculator 400.

Next, a process executed after the comparison result of the calculation results for the calculation reproduction or the provisional calculation reproduction is received from the delay system calculator 400 will be described with reference to FIGS. 40 and 41.

The control unit 353 of the precedence system calculator 300 receives the comparison result including the execution sequence number at the time of the issuing of the output command or the synchronization confirmation point from the delay system calculator 400 (S401). When the comparison result indicates that non-matching of the register values or the output values is detected, the process abnormally ends. Therefore, in the embodiment, the description will be omitted. That is, in the following process, a case in which the comparison result indicates that the register values and the output values match will be described.

Then, based on the group correspondence table 3531 and the execution sequence number in the comparison result, the control unit 353 determines whether a section is a section in which the output command is generated (S403). The execution sequence number at the time point at which the output command is generated is registered in the group correspondence table 3531. Therefore, to determine the section, it is determined whether the execution sequence number matching the execution sequence number in the comparison result is registered in the group correspondence table 3531. When the section is a section in which the output command is not generated, the process returns to S203 of FIG. 30 via the terminal D.

Conversely, when the section is the section in which the output command is generated, the control unit 353 executes an output process to the external device 370 based on the data such as the estimated output value stored in the memory 330 or 340 (S405).

The control unit 353 executes the updating process for the group correspondence table (S407). The updating process is the same as the process of FIG. 35.

The control unit 353 executes a state acquisition process (S408). The state acquisition process is the same as the process of FIG. 34.

The control unit 353 executes an activation process of the non-output cores (S409). The activation process of the non-output cores is the same as the process of FIG. 36.

The control unit 353 executes commitment of the provisional calculation (S411). The commitment of the provisional calculation will be described with reference to FIG. 41.

First, the output mode processing unit 3534 of the control unit 353 specifies a commitment section from the group correspondence table 3531 (S421). The output mode processing unit 3534 specifies a section (the execution sequence numbers at the time of start and end) from the time of the issuing of the output command for the output process to the external device 370 executed immediately before S421 to the time of the issuing of a subsequent output command. Then, the output mode processing unit 3534 of the control unit 353 notifies the CPUs 310 and 320 of the commitment section (S423).

On the other hand, the CPUs 310 and 320 receive the notification of the commitment section from the control unit 353 (S425). Then, the CPUs 310 and 320 specify the generation in the notified section from the generation management table (S427).

Then, the CPUs 310 and 320 specify the unexecuted generation among the generations in the notified section (S429). The CPUs 310 and 320 determine whether conflict occurs in the specified generations (S431). For example, when access including writing on the same memory address in a plurality of transactions occurs and there is a possibility of deadlock, it is determined that the conflict occurs.

When there is the conflict, the CPUs 310 and 320 abort the provisional calculation in this section (S433). Therefore, the process proceeds to S439.

Conversely, when there is no conflict, the CPUs 310 and 320 reflect the changed data stored in the buffer (LL cache 313 or 323) for the specified generation to the memory 330 or 340 (S435).

The CPUs 310 and 320 determine whether there is an unexecuted generation among the generations in the notified section (S437). When there is the unexecuted generation, the process returns to S429.

Conversely, when there is no unexecuted generation, the CPUs 310 and 320 notify the control unit 353 of the process result (S439). The output mode processing unit 3534 of the control unit 353 receives the notification of the process result (S441). Then, the process returns to the calling original process.

This process is executed in the delay system calculator 400. However, when abortion occurs, the process abnormally ends (ABEND). When the abortion occurs, the provisional calculation executed in the commitment section is executed again. Therefore, the process of initializing the precedence system calculator 300 and the delay system calculator 400 is resumed with the memory state and the register value at the time of start of the provisional calculation. Hereinafter, a commitment succession case will be described.

Figure 40:
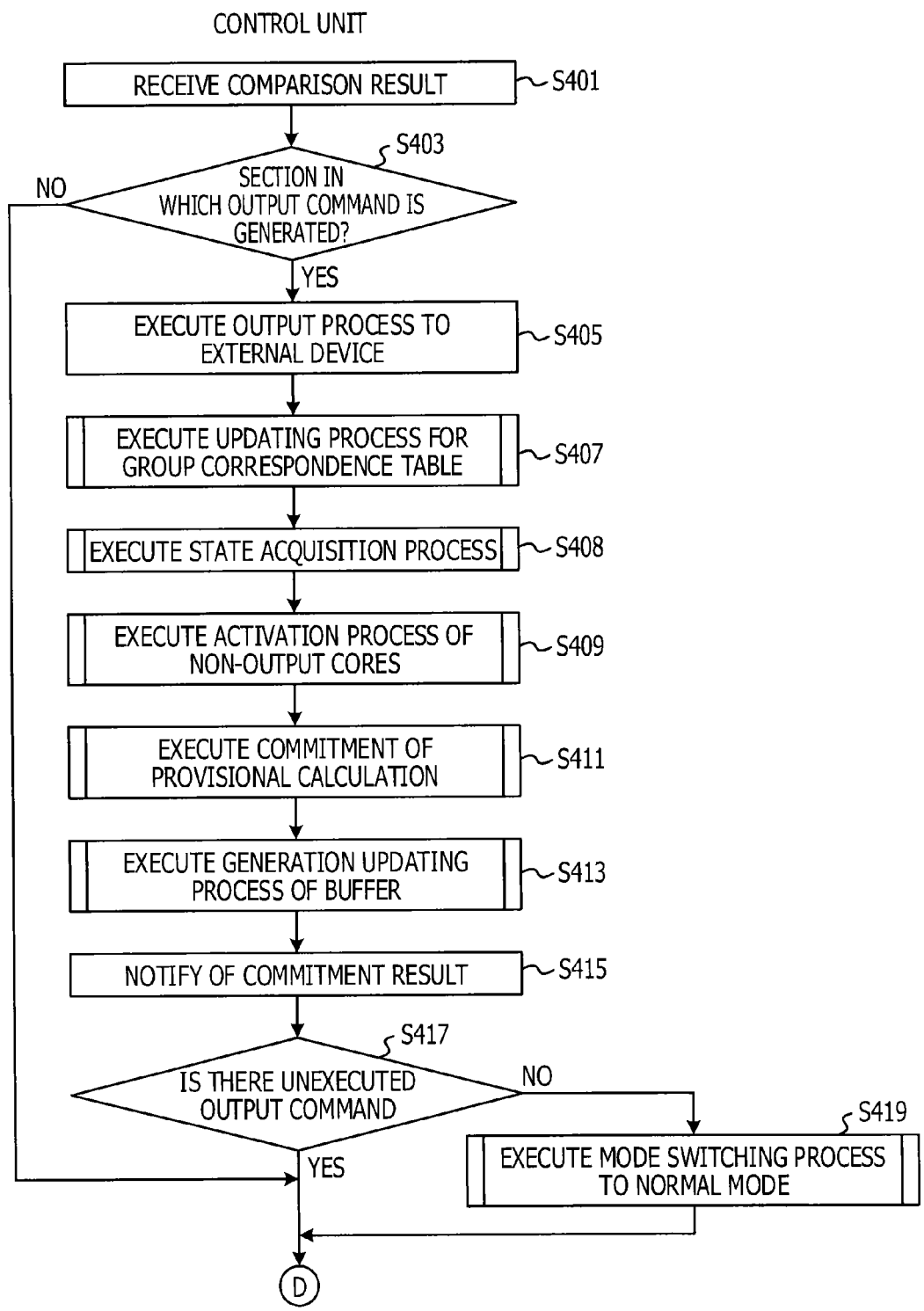
FIG. 40 is a flowchart illustrating a processing flow of a process executed by the precedence system calculator according to the third embodiment.
Figure 41:
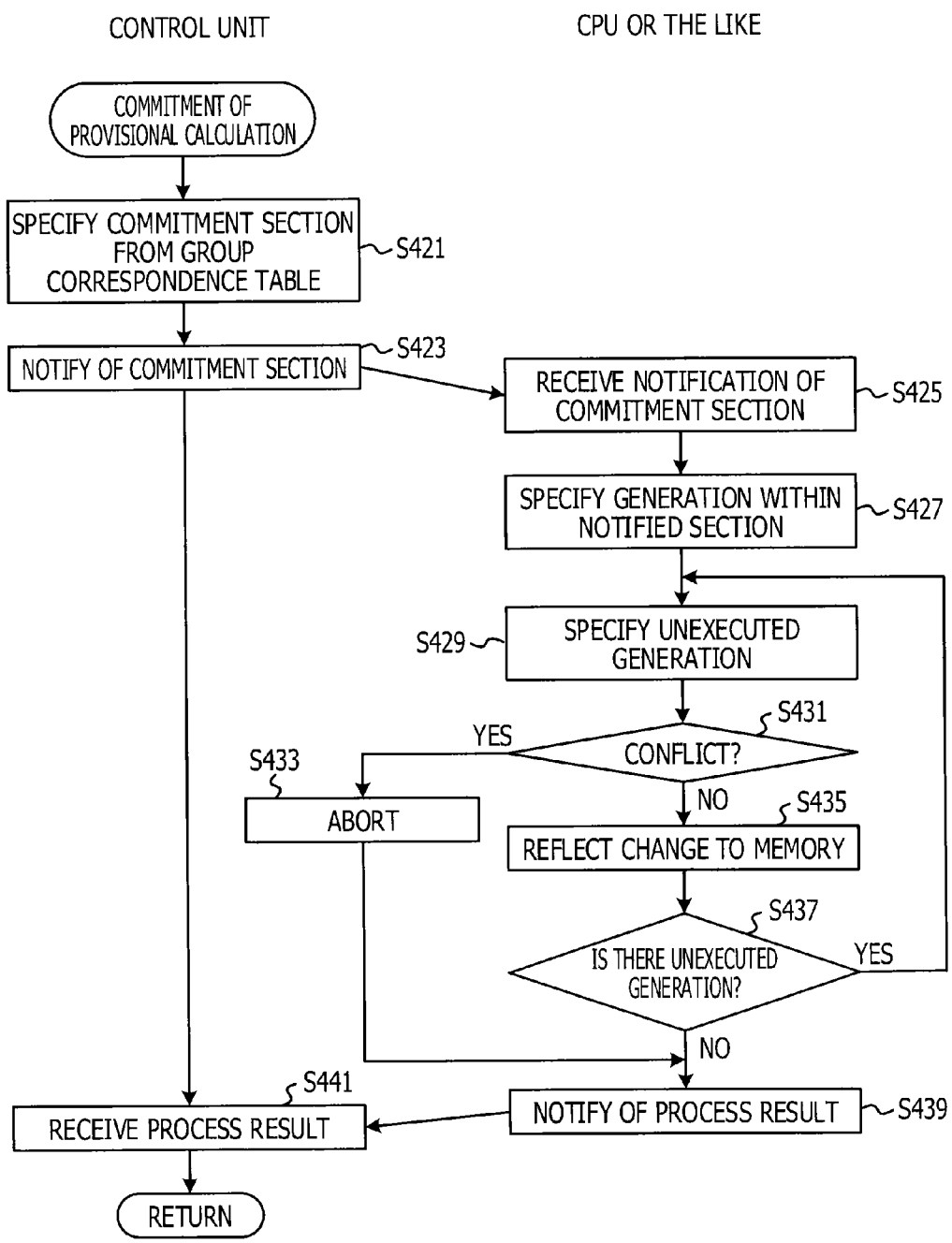
FIG. 41 is a flowchart illustrating a processing flow of commitment of provisional calculation.

The description returns to the description of the process of FIG. 40. The control unit 353 executes the generation updating process of the buffer (S413). This process is the same as the process of FIG. 38.

The control unit 353 transmits the commitment result to the delay system calculator 400 (S415). The commitment result includes the data of the execution sequence number in S408, the execution sequence number of the commitment section, and the register value and the memory state of each core.

The control unit 353 determines whether there is an unexecuted output command from the group correspondence table 3531 (S417). When there is the unexecuted output command, the output mode is maintained. Therefore, the process returns to S203 of FIG. 30 via the terminal D. Conversely, when there is no unexecuted output command, the control unit 353 executes the mode switching process to the normal mode (S419). This process is the same as the process of FIG. 37. Then, the process returns to S203 of FIG. 30 via the terminal D.

In this way, the memories 330 and 340 are updated with the data in the LL caches 313 and 323 used as the buffers according to the output process, and the generations are updated.

Figure 42A:
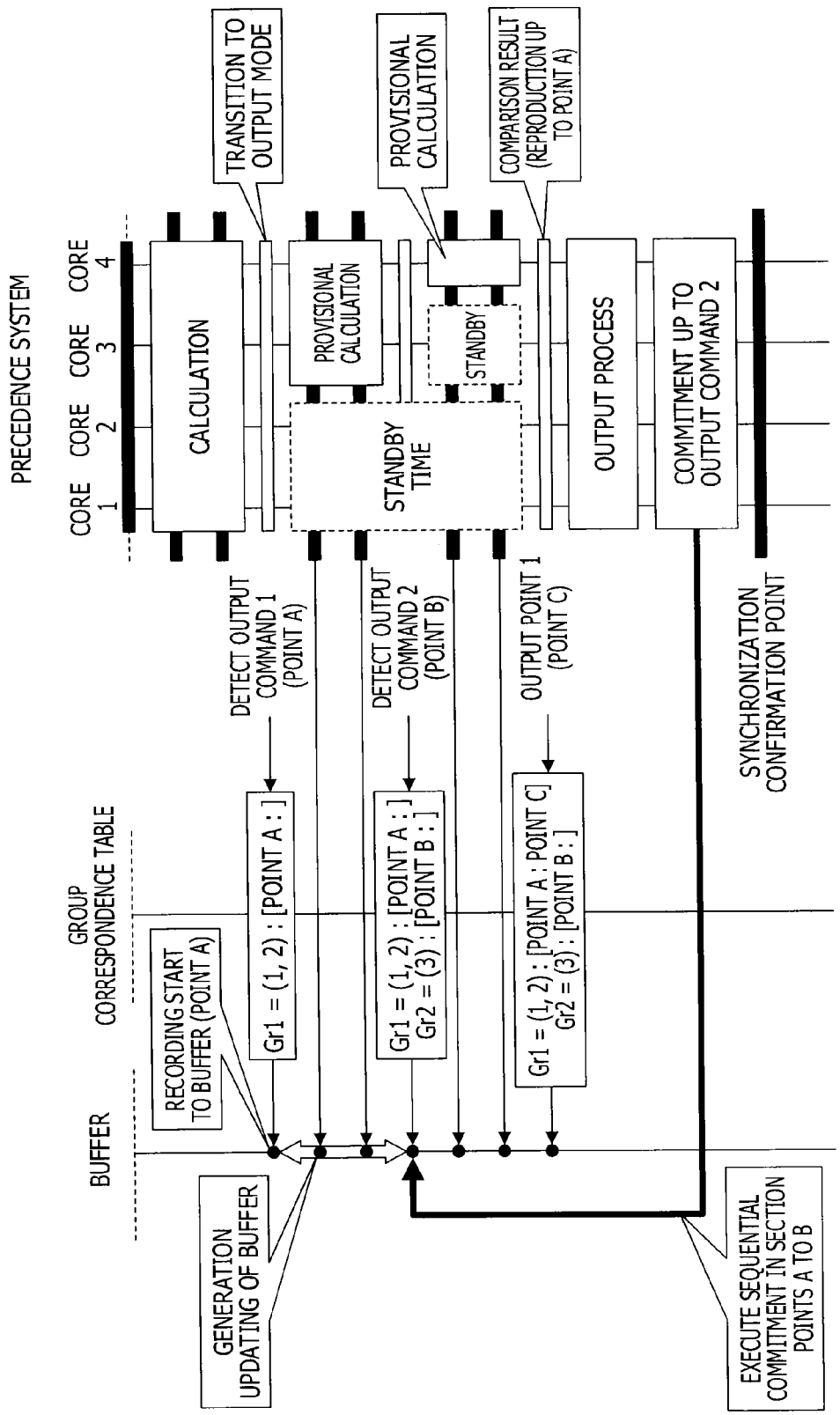
FIG. 42A is a diagram for describing the commitment of the provisional calculation.
Figure 42B:
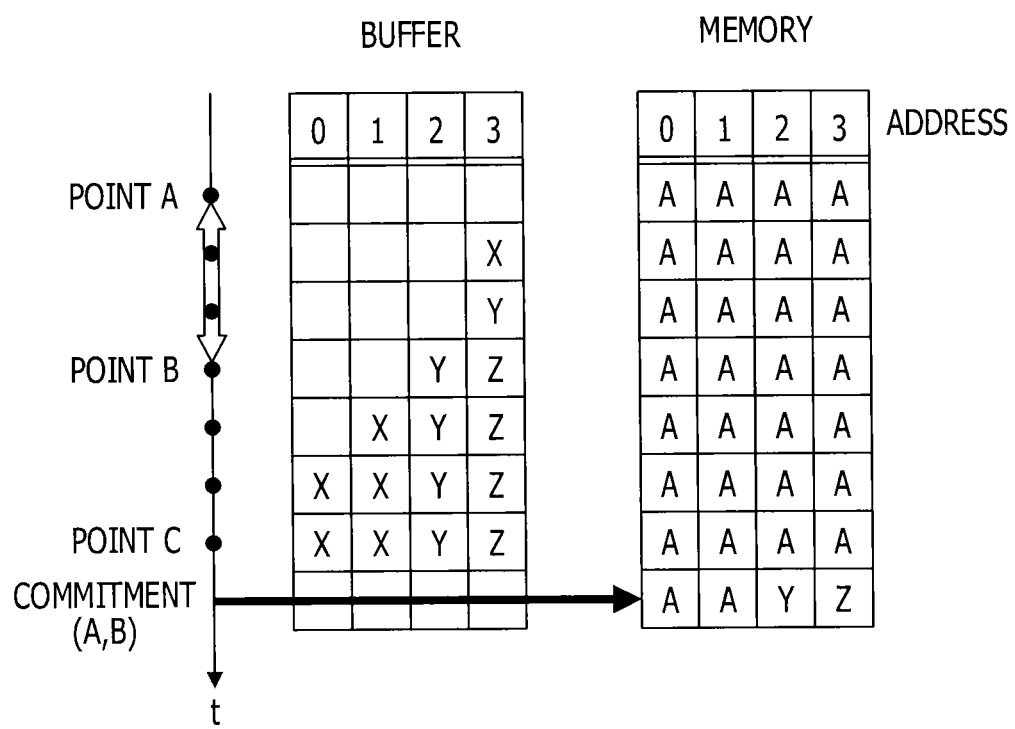
FIG. 42B is a diagram for describing the commitment of the provisional calculation.

Here, data transition related to the commitment of the provisional calculation will be described with reference to FIGS. 42A and 42B. As illustrated on the right side of FIG. 42A, when the cores 1 to 4 execute calculation in the normal mode, the cores 1 and 2 issue output command 1 (point A). Up to here, writing on the memories 330 and 340 is executed and the value output by the output command is also written on the memory 330 or 340.

The cores 3 and 4 execute the provisional calculation. Thereafter, the core 3 issues output command 2 (point B). The core 4 executes the provisional calculation. Thereafter, the comparison result (the result of the calculation reproduction up to the point A) may be obtained from the delay system calculator 400 (point C). Then, the output process by output command 1 is executed. Thereafter, the commitment up to output command 2 is executed in accordance with FIG. 41. Black horizontal lines in FIG. 42A are assumed to indicate synchronization confirmation points.

In this example, at the point A, a first output group (the cores 1 and 2) and the execution sequence number at the point A are registered in the group correspondence table 3531. At this time point, recording on the LL caches 313 and 323 used as the buffers starts. At a subsequent synchronization confirmation point, the generations are updated. At the point B, a second output group (the core 3) and the execution sequence number at the point B are additionally registered in the group correspondence table 3531.

At output point 1 (the point C) at which the output command is executed, the execution sequence number at the point C is registered as the execution sequence number at the time of the output process in the group correspondence table 3531 in regard to the first output group.

In the commitment up to output command 2, the commitment is executed in the section of the points A to B. This situation will be described with reference to FIG. 42B. In the drawing, time is assumed to flow from the upper side to the lower side. In the buffers (the LL cache 313 and 323) and the memories 330 and 340, addresses 0 to 3 are assumed to be present. Each line of the buffer indicates the generation.

The buffer is not used up to the point A and the writing on the memories 330 and 340 is executed. The memories 330 and 340 are not updated from the point A and recording on the buffer is executed. "X" is written on buffer "3" as the first generation, "Y" is written on buffer "3" as the second generation, "Y" is written on buffer "2" as the third generation, and "Z" is written on buffer "3." The first to third generations are included between the points A and B but the fourth to sixth generations are present up to the point C.

When the commitment is executed, the section from the point A to the point B is committed. Therefore, the generations up to the third generation are written on the corresponding addresses of the memories 330 and 340. In the example of FIG. 42B, "Y" is written on memory "2" and "Z is written on memory "3." Memories "0" and "1" are not changed.

In this way, only the committed data are reflected from the buffers to the memories.

Next, process content in the delay system calculator 400 of the side receiving the data in the above-described process will be described with reference to FIGS. 43 to 50.

First, the control unit 453 of the delay system calculator 400 is in reception standby of the data from the precedence system calculator 300 (S501). Thereafter, the control unit 453 receives the data from the precedence system calculator 300 (S503). The data is received when (A) the execution sequence number, the register value of each core, and the memory state are received, when (B) the execution sequence number, the register value of each core, the memory state, and the output content are received, when (C) the journal file including the execution sequence number is received, and when (D) the execution sequence number, the execution sequence number indicating the commitment section, the register value of each core, and the memory state are received. The output content is included when the output command is issued. The journal file is transmitted at each time. When (A) the execution sequence number, the register value of each core, and the memory state are received, the data is transmitted at the time of the updating of the generation.

Next, the control unit 453 determines, from the group correspondence table 4531, whether the section specified from the execution sequence number included in the received data is in the normal mode (S505). When the execution sequence number at the time of the output process is registered in a certain output group in the group correspondence table 4531, the mode is determined as the normal mode.

When the mode is the normal mode, the control unit 453 executes the mode switching process to the normal mode (S507). This process is the same as the process of FIG. 37.

The control unit 453 determines whether the condition of the calculation reproduction execution is satisfied (S509). Specifically, the condition is set in which the calculation reproduction in the section previous to the reproduced section is completed and the following data is provided:

1. the journal file in the section;
2. data of the register value of each core and the memory state at the time of start of the section;
3. data of the register value of each core and the memory state at the time of end of the section; and
4. output content when there is the output command.

The section is regulated from a specific execution sequence number to another specific execution sequence number and is regulated from the final execution sequence number of the section in which the synchronization is completed to the execution sequence number at a timing at which subsequent synchronization is executed due to non-completion of the synchronization. As described in the example according to the first embodiment, the understanding is easy when an interval at the time of the issuing of the output command, an interval at the time of the completion of the comparison, or an interval between the time of the issuing of the output command and the completion of the comparison is assumed.

When the condition of the calculation reproduction execution is satisfied, the control unit 453 and the like execute the calculation reproduction (S511). The calculation reproduction will be described with reference to FIG. 44. The process after S511 proceeds to a process of FIG. 49 via a terminal G.

Figure 44:
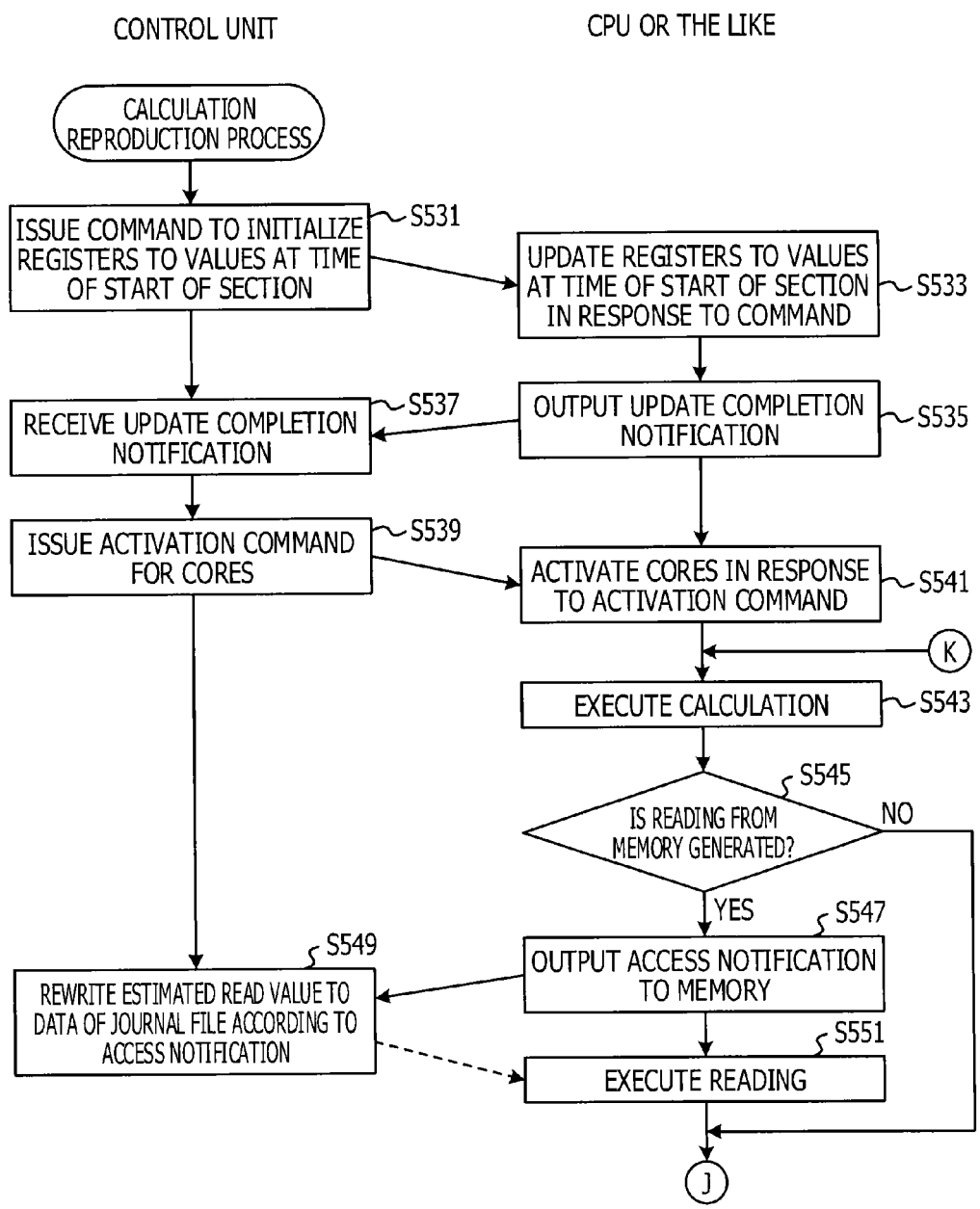
FIG. 44 is a flowchart illustrating a processing flow of a calculation reproduction.

The control unit 453 issues an initialization command to initialize registers to values at the time of start of the section to the CPUs 410 and 420 (S531 in FIG. 44). The CPUs 410 and 420 update the registers to the values at the time of the start of the section in response to the initialization command (S533). The CPUs 410 and 420 reply to the control unit 453 with update completion notification (S535). On the other hand, the control unit 453 receives the update completion notification (S537).

The core execution control unit 4532 of the control unit 453 issues an activation command for the cores (S539). Because of the normal mode, all of the cores are activated. The CPUs 410 and 420 activate the cores in response to the activation command (S541). Then, the CPUs 410 and 420 execute predetermined calculation by the cores (S543).

When reading from the memory 430 or 440 is generated in the calculation (Yes route in S545), the access extraction unit 451 detects access to the memory 430 or 440 and outputs access notification to the memory 430 to 440 to the control unit 453 (S547). On the other hand, the control unit 453 rewrites an estimated read value to data of the journal file specified based on the current execution sequence number and stored in the access history storage unit 452 according to the reception of the access notification (S549).

Then, the CPUs 410 and 420 actually execute the reading from the memory (S551). A subsequent process proceeds to a process of FIG. 45 via a terminal J. When the reading from the memory is not detected (No route in S545), the process also proceeds to the process of FIG. 45 via the terminal J.

Figure 45:
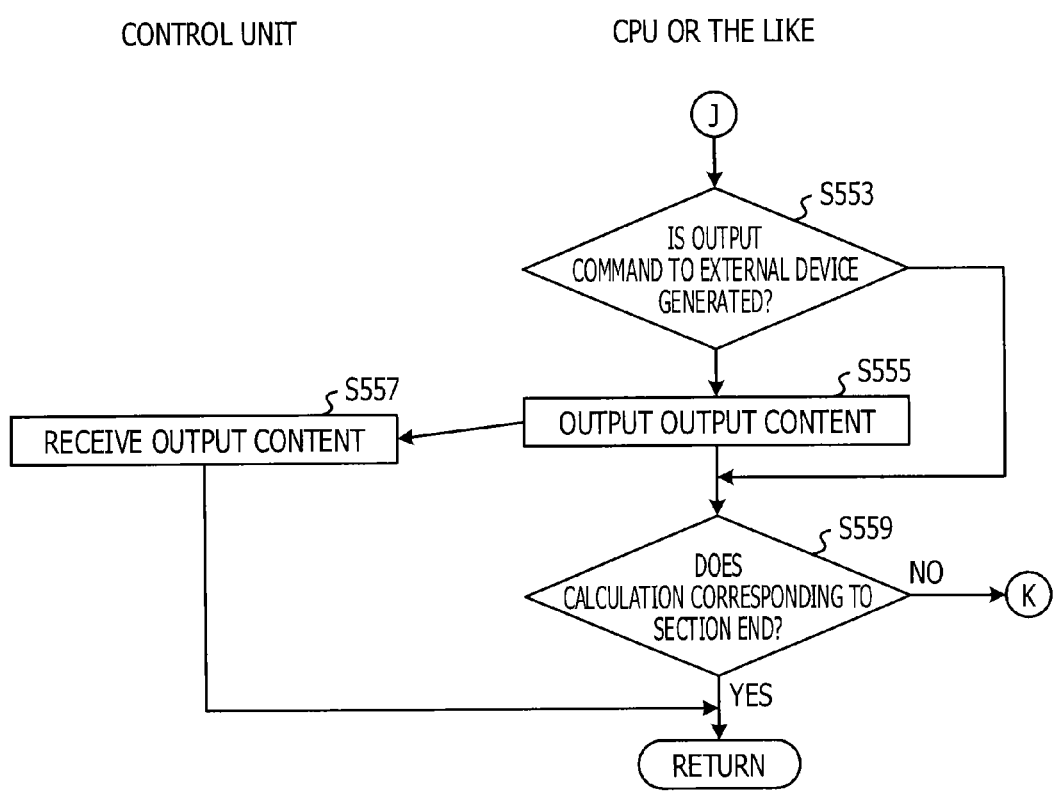
FIG. 45 is a flowchart illustrating a processing flow of the calculation reproduction.

The description will proceed to the description of the process of FIG. 45. When the output command to the external device 470 is generated (Yes route in S553), the output content is output to the control unit 453 via the QPI bus 480 (S555). The control unit 453 receives the output content from the CPUs 410 and 420 (S557). Then, the process returns to the calling original process.

When the output command to the external device 470 is not generated (No route in S553) and the calculation corresponding to the section does not end (No route in S559), the process returns to S543 of FIG. 44 via a terminal K. Conversely, when the calculation corresponding to the section ends (Yes route in S559), the process returns to the calling original process. In this way, the calculation reproduction is executed.

Figure 43:
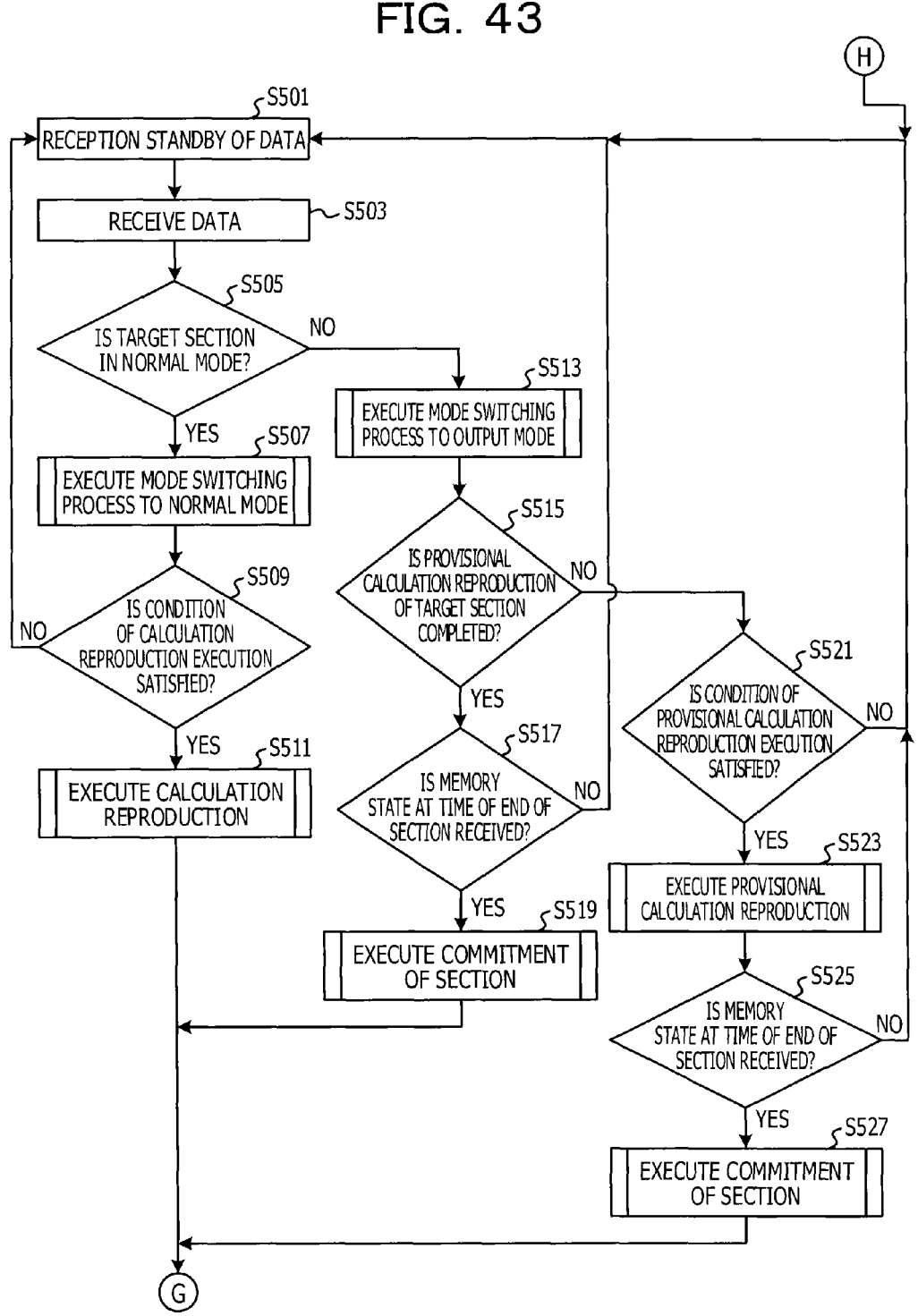
FIG. 43 is a flowchart illustrating a processing flow of a process executed by the delay system calculator according to the third embodiment.

The description returns to the description of the process of FIG. 43. When the current mode is determined to be output mode in S505 (No route in S505), the control unit 453 executes the mode switching process to the output mode (S513). This process is the same as the process of FIG. 37.

Thereafter, the control unit 453 determines whether the provisional calculation reproduction of the target section is completed (S515). When the provisional calculation reproduction of the target section is not completed, the process proceeds to S521. Conversely, when the provisional calculation reproduction of the target section is completed, the output mode processing unit 4534 of the control unit 453 determines whether the memory state at the time of the end of the section is received (S517). When the memory state at the time of the end of the section is not obtained, the process returns to S501. Conversely, when the memory state at the time of the end of the section is received, the control unit 453 and the like execute the commitment of the section (S519). This process will be described with reference to FIG. 48. Then, the process proceeds to the process of FIG. 49 via a terminal G.

When the provisional calculation reproduction of the target section is not completed, the control unit 453 determines whether the condition of the provisional calculation reproduction is satisfied (S521). Specifically, the condition is set in which the calculation reproduction or the provisional calculation reproduction in the section previous to the reproduced section and the commitment are completed and the following data is provided:

1. the journal file in the section;
2. the register value of each core affiliated to the calculation group at the time of start of the section;
3. the register value of each core affiliated to the calculation group at the time of end of the section; and
4. output content when there is the output command.

When the condition of the provisional calculation reproduction is not satisfied, the process returns to S501. Conversely, when the condition of the provisional calculation reproduction is satisfied, the control unit 453 and the like execute the provisional calculation reproduction (S523). The provisional calculation reproduction will be described with reference to FIGS. 46 and 47.

Figure 46:
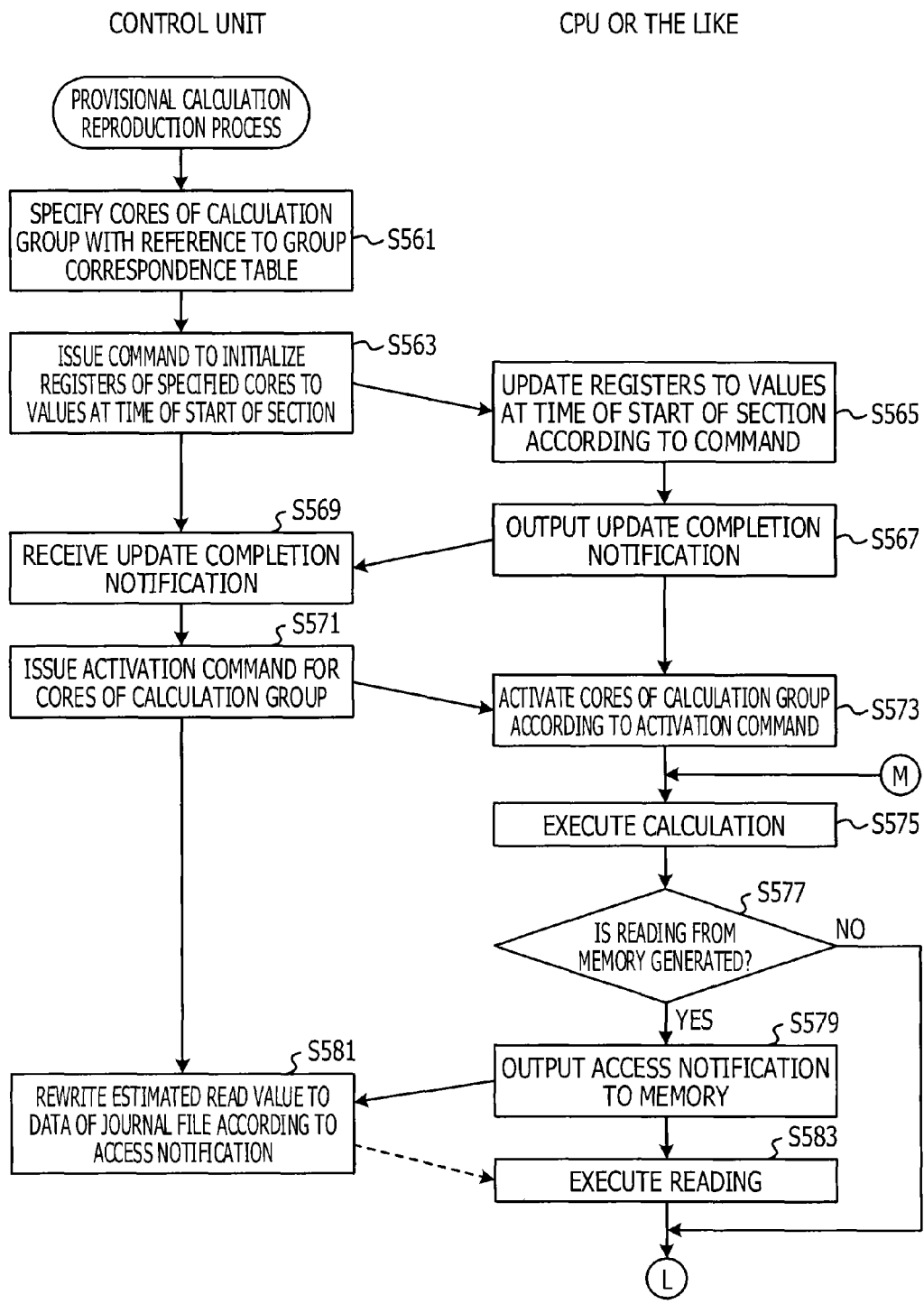
FIG. 46 is a flowchart illustrating a processing flow of provisional calculation reproduction.

The output mode processing unit 4534 of the control unit 453 specifies the cores affiliated to the calculation group in the target section with reference to the group correspondence table 4531 (S561 in FIG. 46). The cores not affiliated to the output group are the cores affiliated to the calculation group.

The output mode processing unit 4534 of the control unit 453 issues an initialization command to initialize the registers of the specified cores to the values at the time of start of the section to the CPUs 410 and 420 (S563). The CPUs 410 and 420 update the registers of the specified cores to the values at the time of start of the section in response to the initialization command (S565). The CPUs 410 and 420 reply to the control unit 453 with update completion notification (S567). On the other hand, the control unit 453 receives the update completion notification (S569).

The output mode processing unit 4534 of the control unit 453 issues an activation command for the cores affiliated to the calculation group (S571). Then, the CPUs 410 and 420 activate the cores affiliated to the calculation group in response to the activation command (S573). Then, the CPUs 410 and 420 execute predetermined calculation by the cores affiliated to the calculation group (S575).

When reading from the memory 430 or 440 is generated in the calculation (Yes route in S577), the access extraction unit 451 detects reading and outputs access notification to the memory 430 to 440 to the control unit 453 (S579). On the other hand, the control unit 453 rewrites an estimated read value to data of the journal file specified based on the current execution sequence number and stored in the access history storage unit 452 according to the reception of the access notification (S581).

Then, the CPUs 410 and 420 actually execute the reading from the memory (S583). A subsequent process proceeds to a process of FIG. 47 via a terminal L. When the reading from the memory is not detected (No route in S577), the process also proceeds to the process of FIG. 47 via the terminal L.

Figure 47:
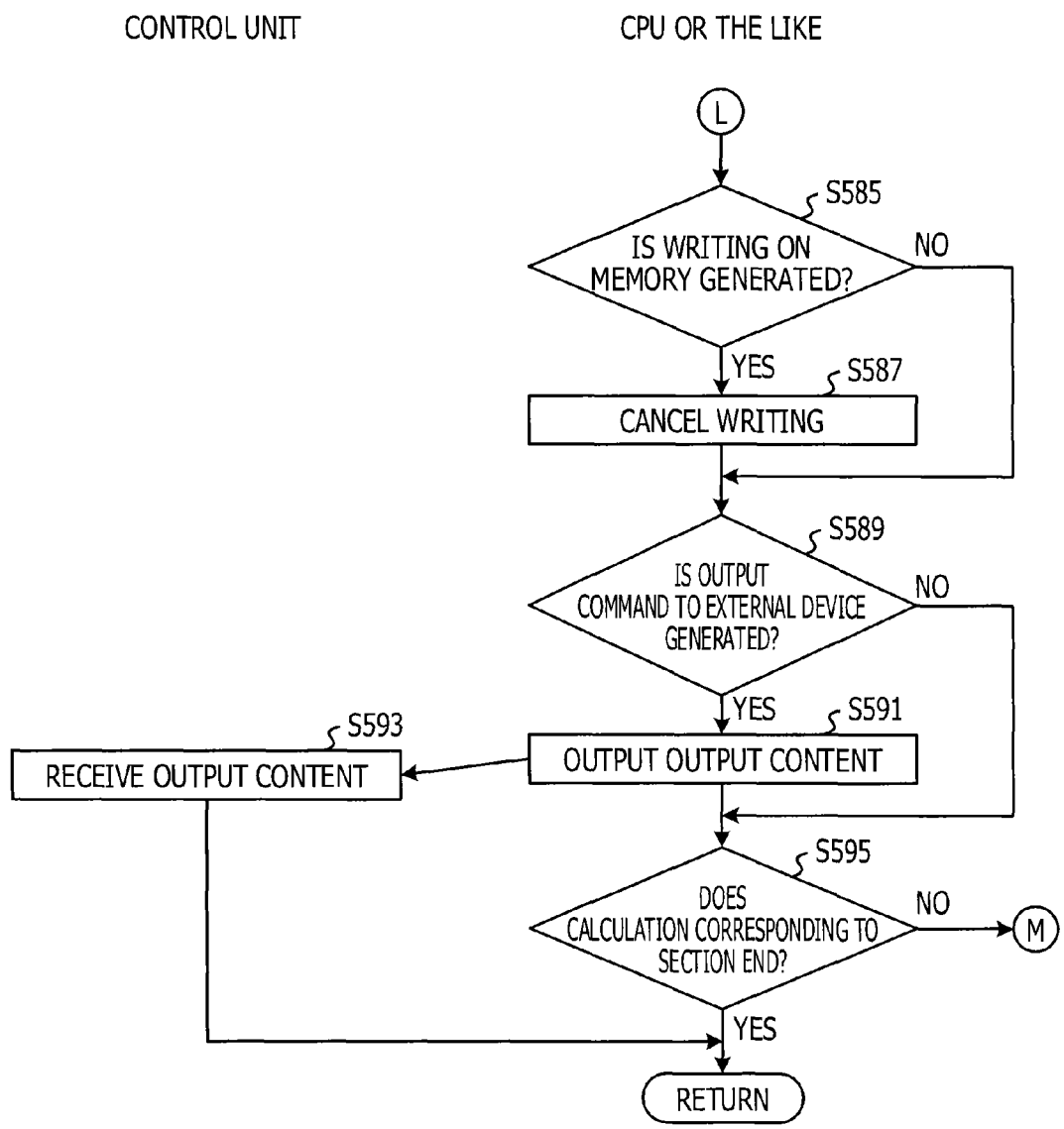
FIG. 47 is a flowchart illustrating a processing flow of the provisional calculation reproduction.
Figure 48:
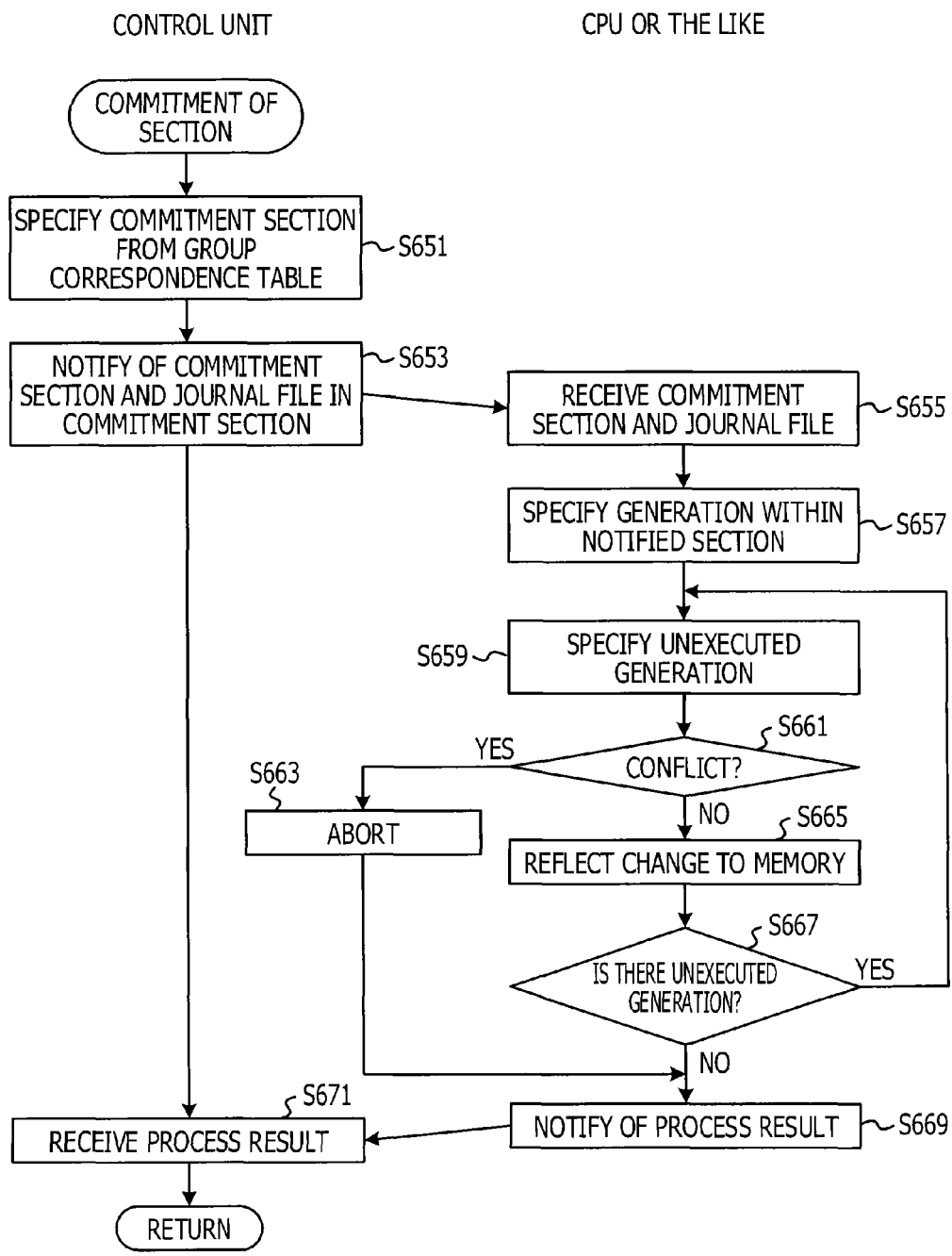
FIG. 48 is a flowchart illustrating a processing flow of section commitment.

The description of the process of FIG. 47 will proceed. When writing on the memory 430 or 440 is generated (Yes route in S585) and the access extraction unit 451 detects the writing, the access extraction unit 451 causes the CPUs 410 and 420 to cancel the writing (S587). Then, the process proceeds to S589. When the writing on the memory 430 or 440 is not generated (No route in S585), the process proceeds to S589.

When the output command to the external device 470 is generated (Yes route in S589), the output content is output to the control unit 453 via the QPI bus 480 (S591). The output mode processing unit 4534 of the control unit 453 receives the output content from the CPUs 410 and 420 (S593). Then, the process returns to the calling original process.

When the output command to the external device 470 is not generated (No route in S589) and the calculation corresponding to the section does not end (No route in S595), the process returns to S575 of FIG. 46 via a terminal M. Conversely, when the calculation corresponding to the section ends (Yes route in S595), the process returns to the calling original process.

In this way, the provisional calculation reproduction is executed. In the delay system calculator 400, unlike the precedence system calculator 300, another calculation reproduction or provisional calculation reproduction starts after the provisional calculation reproduction, the commitment, and the output process are continuously executed. Therefore, the writing on the memories 430 and 440 is not controlled using the LL caches 413 and 423 as the buffers.

The description returns to the description of the process of FIG. 43. The output mode processing unit 4534 of the control unit 453 determines whether the memory state at the time of the end of the section is received (S525). When the memory state at the time of the end of the section is not obtained, the process returns to S501.

Conversely, when the memory state at the time of the end of the section is received, the control unit 453 and the like execute the commitment of the section (S527). The commitment of the section will be described with reference to FIG. 48. Then, the process after S527 proceeds to the process of FIG. 49 via the terminal G.

First, the output mode processing unit 4534 of the control unit 453 specifies a commitment section from the group correspondence table 4531 (S651). The output mode processing unit 4534 specifies a section (the execution sequence numbers at the time of start and end) from the time of the issuing of the output command for the output process to the external device 470 executed immediately before S651 to the time of the issuing of a subsequent output command. Then, the output mode processing unit 4534 of the control unit 453 specifies the journal file included in the specified section and notifies the CPUs 410 and 420 of the commitment section and the journal file included in the section (S653). When the generation is updated, as described above, the data notified of by the precedence system calculator 300 is present and the generation is also specified. Therefore, information regarding the generation is added to the notified journal file.

On the other hand, the CPUs 410 and 420 receive the commitment section and the journal file of the section from the control unit 453 (S655). Then, the CPUs 410 and 420 specify the generation in the notified section from the received data (S657).

The CPUs 410 and 420 specify the unexecuted generation among the generations in the notified section (S659). The CPUs 410 and 420 determine whether conflict occurs in the specified generations (S661). At this time, the CPUs 410 and 420 determines there is the conflict using the latest journal file in the specified generation rather than the data of the LL caches 413 and 423. That is, when access including writing on the same memory address in a plurality of transactions occurs and there is a possibility of deadlock, it is determined that the conflict occurs.

When there is the conflict, the CPUs 410 and 420 aborts the provisional calculation reproduction in this section (S663). Therefore, the process proceeds to S669.

Conversely, when there is no conflict, the CPUs 410 and 420 reflect the content of the journal file to the memory 430 or 440 (S665).

The CPUs 410 and 420 determine whether there is an unexecuted generation among the generations in the notified section (S667). When there is the unexecuted generation, the process returns to S659.

Conversely, when there is no unexecuted generation, the CPUs 410 and 420 notify the control unit 453 of the process result (S669). The output mode processing unit 4534 of the control unit 453 receives the notification of the process result (S671). Then, the process returns to the calling original process.

Figure 49:
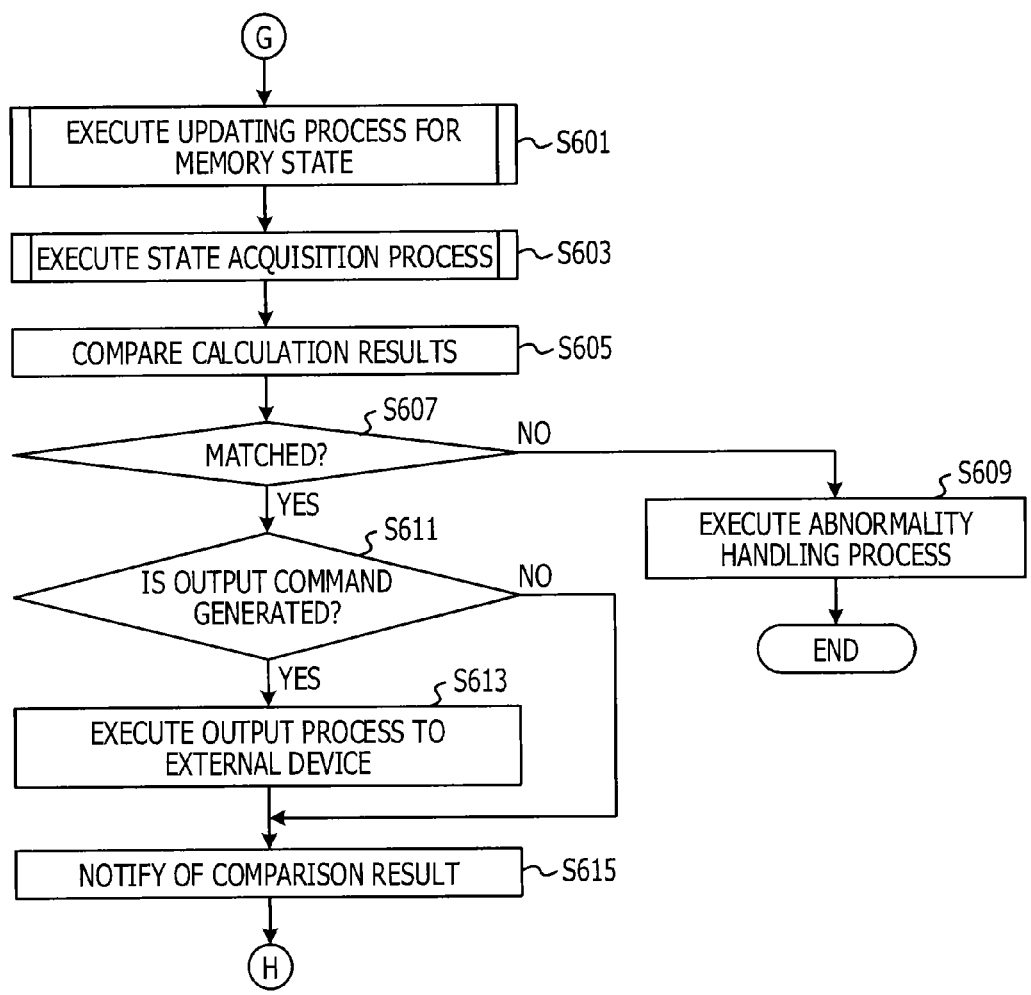
FIG. 49 is a flowchart illustrating a processing flow of a process executed by the delay system calculator according to the third embodiment.
Figure 50:
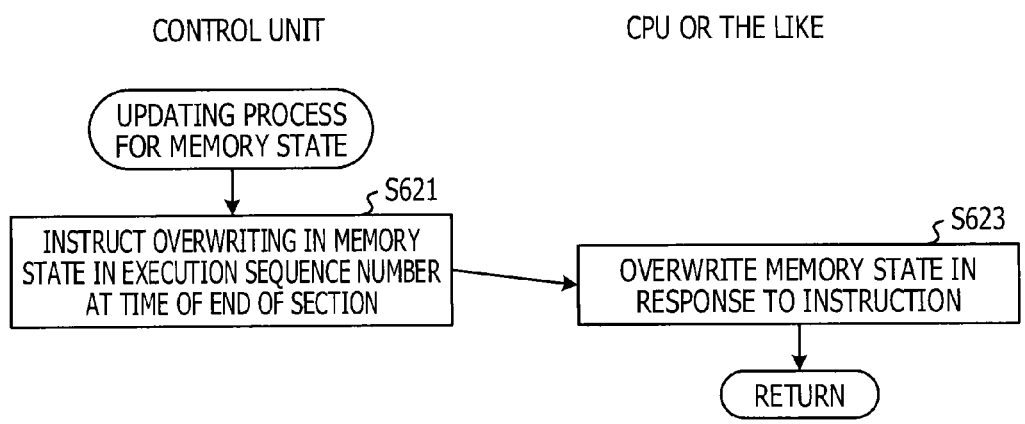
FIG. 50 is a flowchart illustrating a processing flow of an updating process for a memory state.

The description will proceed to the description of the process of FIG. 49. The control unit 453 and the like execute the updating process for the memory state (S601 in FIG. 49). This process will be described with reference to FIG. 50.

First, the control unit 453 instructs the CPUs 410 and 420 to execute overwriting on the memories 430 and 440 in the memory state in the execution sequence number at the time of the end of the section (S621). On the other hand, the CPUs 410 and 420 execute the overwriting of the memory state in response to the instruction (S623). It is beneficial to synchronize the precedence system calculator 300 and the memories. Then, the process returns to the calling original process.

The control unit 453 executes a state acquisition process (S603). The state acquisition process is the same as the process of FIG. 34.

The control unit 453 executes a comparison process on the calculation results (the register values and the output content when the output command is generated, but only the cores of the calculation group in the case of the output mode) (S605). The control unit 453 determines whether the register values match or the estimated output values match.

When it is indicated that the calculation results do not match each other (No route in S607), the control unit 453 executes a pre-decided abnormality handling process (S609). Then, the process ends.

When it is indicated that the calculation results match each other (Yes route in S607), the control unit 453 determines whether the output command is generated (S611). When the output command is generated, an output process to the external device 470 is executed (S613). Conversely, when the output command is not generated, the process proceeds to S615.

The control unit 453 transmits the comparison result of S605 to the precedence system calculator 300 (S615). Then, the process returns to S501 via a terminal H.

By executing such processes, it is possible to progress the calculation efficiently while verifying the comparison of the calculation results of the precedence system calculator 300 in the delay system calculator 400.

Figure 51:
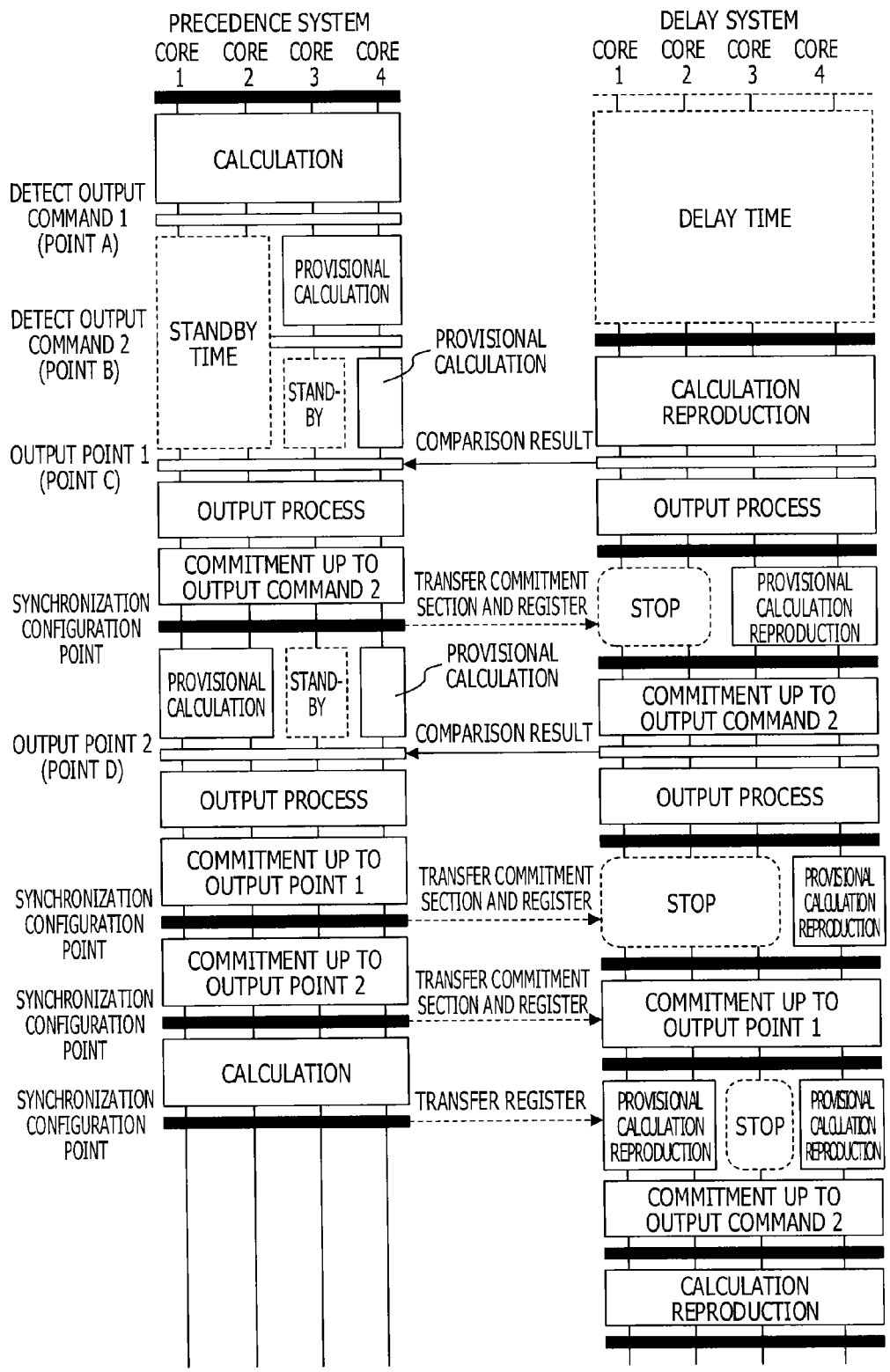
FIG. 51 is a diagram illustrating an example of a synchronization process according to the third embodiment.

An example of the synchronization process executed by the precedence system calculator 300 and the delay system calculator 400 is illustrated in FIG. 51. In FIG. 51, time flows from the upper side to the lower side.

In the example of FIG. 51, in the precedence system calculator 300, the data transition until "commitment up to output command 2" is the same as that described with reference to FIG. 42A. After "commitment up to output command 2," the commitment section and the register values are transmitted from the precedence system calculator 300 to the delay system calculator 400.

Even when "commitment up to output command 2" is executed in the precedence system calculator 300, the output process in response to output command 2 is not executed, and thus the mode remains to be the output mode. However, since the output of output command 1 is executed for the cores 1 and 2, the provisional calculation by the cores 1, 2, and 4 is executed.

On the other hand, in the delay system calculator 400, the calculation reproduction is executed, the register value and the estimated output value are compared, and the comparison result at the point A is transmitted to the precedence system calculator 300. When the comparison result indicates matching, an output process in response to output command 1 is subsequently executed. Then, the provisional calculation reproduction is executed for the provisional calculation executed by the cores 3 and 4 of the precedence system calculator 300. The provisional calculation reproduction is executed at a time point at which the data other than the memory state is provided, as described above.

In the delay system calculator 400, the commitment up to output command 2 is executed when the provisional calculation reproduction corresponding to the provisional calculation up to the point B is completed, the commitment is executed in the precedence system calculator 300, and the memory state is acquired. When the commitment is completed, the register value and the estimated output value are compared and the comparison result is transmitted from the delay system calculator 400 to the precedence system calculator 300. When the comparison result indicates that the resister value and the estimated output value match each other, the output process in response to output command 2 is executed.

In the precedence system calculator 300, the output process in response to output command 2 is executed when the comparison result is received and the comparison result indicates the matching. The group correspondence table 3531 is updated and the execution sequence number (point D) at the time of the output process of the second output group is registered. In the precedence system calculator 300, the commitment is executed up to output point 1. Then, the commitment section and the register value are transmitted from the precedence system calculator 300 to the delay system calculator 400. Thereafter, the commitment of the provisional calculation up to output point 2 is also executed. At each commitment, the commitment section and the register value are transmitted from the precedence system calculator 300 to the delay system calculator 400.

Thereafter, since the unexecuted output process is not present, the precedence system calculator 300 returns to the normal mode and executes the calculation by the cores 1 to 4.

When the previous provisional calculation reproduction is committed, the provisional calculation reproduction of the provisional calculation executed by only the core 4 is executed in the delay system calculator 400. When the provisional calculation reproduction is completed, the commitment (commitment up to output point 1) of the provisional calculation reproduction is executed. Then, in the delay system calculator 400, the provisional calculation reproduction is executed for the provisional calculation executed by the cores 1, 2, and 4. When the provisional calculation reproduction is completed, the commitment (commitment up to output point 2) of the provisional calculation reproduction is executed. When the commitment is completed, the mode returns to the normal mode and the calculation reproduction is executed.

In this way, various provisional calculations are executed so that a standby time is lost as less as possible in the precedence system calculator 300. The corresponding provisional calculation reproduction is also executed in sequence in the delay system calculator 400.

The embodiments of the disclosure have been described above, but the technology is not limited thereto. For example, the processing flows may be shifted in the order of the processes or may be executed in parallel a plurality of times as long as the processing results are not changed.

The functional block diagrams are merely examples and do not match program module configurations in some cases.

The above-described embodiments may be summarized as follows.

The information processing system according to the embodiments includes: a first system that includes a plurality of first arithmetic units, a first control unit, and a first external device; and a second system that includes a plurality of second arithmetic units, a second control unit, and a second external device and that executes calculation which is the same as calculation executed in the first system and compares calculation results to each other. The first control unit (A) stops, when the first control unit detects that a first output request to the first external device is output from one or plural first arithmetic units among the plurality of first arithmetic units, first arithmetic units including the one or plural first arithmetic units that were executing first calculation, (B) transmits first comparison target data including a value output with the first output request to the second control unit, and (C) causes the first arithmetic units other than the one or plural first arithmetic units among the first arithmetic units that were executing the first calculation to execute second calculation. The second control unit (D) causes second arithmetic units corresponding to the first arithmetic units that were executing the first calculation to execute third calculation corresponding to the first calculation when the second control unit receives the first comparison target data from the first control unit, and (E) compares the first comparison target data to second comparison target data including a value output with a second output request when the second control unit detects that the second output request to the second external device is output from one or plural second arithmetic units among the second arithmetic units corresponding to the first arithmetic units that were executing the first calculation.

In this way, the second calculation is executed rapidly and effective use of the arithmetic units in the system may be achieved.

The above described first control unit may transmit information for specifying the first arithmetic units that execute the first calculation in advance to the second control unit. In this case, the second control unit may specify the second arithmetic units corresponding to the first arithmetic units that were executing the first calculation based on the information. In this way, the same calculation as the first calculation is executed by the second arithmetic units.

More specifically, the above-described first control unit (F) may transmit information for specifying the first arithmetic units that execute the second calculation to the second control unit, (G) may stop the first arithmetic units that were executing the second calculation when the first control unit detects that a third output request to the first external device is output from a certain first arithmetic unit among the first arithmetic units that were executing the second calculation, (H) may transmit third comparison target data including a value output with the third output request to the second control unit, and (I) may cause the first arithmetic units other than the certain first arithmetic unit among the first arithmetic units that were executing the second calculation to execute the third calculation. The above-described second control unit (3) may receive the information from the first control unit, (K) may specify and cause the second arithmetic units that execute fourth calculation corresponding to the second calculation to execute the fourth calculation based on the information when the second control unit receives the third comparison target data from the first control unit, and (L) may compare the third comparison target data to fourth comparison target data including a value output with a fourth output request when the second control unit detects that the fourth output request to the second external device is output from a certain second arithmetic unit among the specified second arithmetic units.

In this way, the calculation reproduction is executed in the second system with the same configuration as the first system.

The information for specifying the first arithmetic units that execute the second calculation may include an identifier of the one first arithmetic unit or identifiers of plural first arithmetic units. In contrast, the information may include an identifier of the first arithmetic unit that output the output request.

The above-described first system may include a first virtual machine including the plurality of first arithmetic units, a second virtual machine including the first control unit, and a first management unit managing the first virtual machine and the second virtual machine. In this case, the above-described second system may include a third virtual machine including the plurality of second arithmetic units, a fourth virtual machine including the second control unit, and a second management unit managing the third virtual machine and the fourth virtual machine. The mounting manner may be modified in various ways.

The above-described first control unit may retain the value output with the first output request. In this case, the above-described second control unit may transmit a comparison result to the first control unit. Further, the first control unit may output the retained value to the first external device when the comparison result received from the second control unit indicates that the first comparison target data matches the second comparison target data. When the value to be output may be retained by the first control unit, such a process is executed.

On the other hand, the above-described first system includes a first memory shared by the plurality of first arithmetic units, a first buffer retaining data before reflected to the first memory in some cases. In this case, the one or plural first arithmetic units may write the value output with the first output request on the first memory. The first arithmetic units other than the one or plural first arithmetic units among the first arithmetic units that were executing the first calculation may write data in the second calculation on the first buffer. When the above-described second control unit transmits a comparison result to the first control unit, the first control unit may receive the comparison result from the second control unit, output the value written on the first memory to the first external device when the comparison result received from the second control unit indicates that the first comparison target data matches the second comparison target data, and cause the plurality of first arithmetic units to determine whether the writing on the first buffer conflicts and reflects a writing result on the first buffer to the first memory when it is determined that the writing on the first buffer does not conflict.

When a value to be output is not retained, this configuration is adopted in the first control unit, thereby obtaining the same operational effects.

The above-described first control unit may transmit information for specifying the first arithmetic units that execute the second calculation to the second control unit, transmit data written on the first buffer by the first arithmetic units that are executing the second calculation to the second control unit, stop the first arithmetic units that were executing the second calculation when the first control unit detects that a third output request to the first external device is output from a certain first arithmetic unit among the first arithmetic units that were executing the second calculation, and transmit third comparison target data including a value output with the third output request to the second control unit. In this case, the second control unit may receive the information and the data written on the first buffer from the first control unit, specify and cause the second arithmetic units that execute fourth calculation corresponding to the second calculation to execute the fourth calculation based on the information when the second control unit receives the third comparison target data from the first control unit, compare the third comparison target data to fourth comparison target data including a value output with a fourth output request when the second control unit detects that the fourth output request to the second external device is output from a certain second arithmetic unit among the specified second arithmetic units, cause the certain second arithmetic unit to output the value output with the fourth output request to the second external device when a result of the comparison indicates that the third comparison target data matches the fourth comparison target data, and cause the second arithmetic units to determine whether writing conflicts, using the data written on the first buffer.

A program causing a processor to execute the above-described processes may be generated. The program is stored in, for example, a computer-readable storage medium or storage device such as a flexible disk, an optical disc such as a CD-ROM, a magneto-optical disc, a semiconductor memory (for example, a ROM), or a hard disk. Data during a process is temporarily stored in a storage device such as a RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
   a first system that includes a first controller, a first external device, a first memory, and a first processor including a plurality of first processor cores configured to execute calculation with sharing the first memory; and
   a second system that includes a second memory, and a second controller including a plurality of second processor cores configured to execute calculation, which is the same as calculation executed by the plurality of first processor cores, with shared access to the second memory based on a history of accesses to the first memory from the plurality of first processor cores,
   wherein the first controller is configured to:
   control the first external device to output first output data of a given calculation executed by the plurality of first processor cores in response to a match of a first result of the given calculation executed by the plurality of first processor cores with a second result of the given calculation executed by the plurality of second processor cores, the first output data being outputted from each of one or more first output processor cores of the plurality of first processor cores that have issued an output request for the given calculation,
   determine whether the plurality of first processor cores include one or more first non-output processor cores that have not issued the output request for the given calculation,
   control the one or more first output processor cores to be in a stopped state in response to obtaining the first output data, the one or more first output processor cores being controlled to restart in response to determining the first result and the second result match, and
   control the one or more first non-output processor cores to calculate another given calculation in response to obtaining the first output data while the first output processors are in the stopped state.

2. The information processing system according to claim 1, wherein
   the second controller is configured to:
   instruct a plurality of third processor cores in the plurality of second processor cores to execute processing with regard to a third calculation corresponding to the given calculation when the first comparison target data is received, and
   provide a result of the third calculation to the given calculation including a value to be output in response to a second output request to a second external device when it is detected that second output data is output from one or more fourth processor cores among the plurality of third processor cores.

3. The information processing system according to claim 2, wherein
   the first processor is configured to transmit first information for specifying the plurality of first processor cores in advance to the second system, and
   the second processor is configured to specify the plurality of third processor cores corresponding to the plurality of first processor cores based on the first information.

4. The information processing system according to claim 1, wherein
   the first controller is configured to:
   transmit second information for specifying the one or more first output processor cores to the second system,
   control to stop the one or more first output processor cores when it is detected that a third output request to the first external device is output from second output processor cores among the one or more first output processor cores,
   transmit a value in response to another output request to the second system, and
   instruct a second non-output processor core to execute processing with regard to the another given calculation.

5. The information processing system according to claim 4, wherein the second controller is configured to:
   specify third output processor cores based on second information when the value transmitted in response to the another output request to the second system is received,
   instruct the third output processor cores to execute processing with regard to a fourth calculation corresponding to the given calculation executed by the second processing cores, and
   control one or more second non-output processor cores to calculate another given calculation in response to obtaining second output data while second output processors are in a stopped state.

6. The information processing system according to claim 4, wherein the second information includes an identifier or identifiers of the plurality of second processing cores.

7. The information processing system according to claim 2, wherein
   the second controller is configured to transmit a comparison result to the first system of the match of the first result with the second result, and
   the first controller is further configured to:
   hold the value to be output in response to the first output request, and
   output the held value to the first external device when the comparison result indicates that the match of the first result with the second result.

8. The information processing system according to claim 2, wherein
   the first memory is shared by the plurality of first processing cores, and a first buffer,
   the plurality of first processing cores is configured to write the first output data to the first memory,
   the plurality of second processing cores is configured to write data in the given calculation on the first buffer, and the first controller is configured to:
   instruct the plurality of first processor cores to determine whether the data written on the first buffer conflicts, and reflect a writing result on the first buffer to the first memory when it is determined that the data written on the first buffer does not conflict.

9. The information processing system according to claim 8, wherein
the first controller processor is configured to:
control to stop the one or more first output processor cores when it is detected that an output request to the first external device is output from a subset of the one or more first output processor cores, and
transmit comparison target data to the second system, and
the second controller is configured to:
compare the comparison target data with comparison target data calculated by the second controller, and send an output to the second external device when the result of the comparison indicates a match.

10. An information processing system comprising:
a first system including a first memory, and a plurality of first processing cores that share the first memory and, execute a first virtual machine that operates as a plurality of first processing cores and a second virtual machine that operates as a first controller; and
a second system configured to execute a given calculation which is the same as calculation executed in the first system and compare calculation results to each other,
wherein the first controller is configured to:
control the first external device to output first output data of a given calculation executed by the plurality of first processor cores in response to a match of a first result of the given calculation executed by the plurality of first processor cores with a second result of the given calculation executed by the plurality of second processor cores, the first output data being outputted from each of one or more first output processor cores of the plurality of first processor cores that have issued an output request for the given calculation,
determine whether the plurality of first processor cores include one or more first non-output processor cores that have not issued the output request for the given calculation,
control the one or more first output processor cores to be in a stopped state in response to obtaining the first output data, the one or more first output processor cores being controlled to restart in response to determining the first result and the second result match, and
control the one or more first non-output processor cores to calculate another given calculation in response to obtaining the first output data while the first output processors are in the stopped state.

11. The information processing system according to claim 10, wherein
the second system includes one or more second processing cores,
the one or more second processing cores configured to:
execute a third virtual machine and a fourth virtual machine that operates as a second controller, and
the second controller is configured to:
instruct the third virtual machine to execute processing with regard to another calculation corresponding to the given calculation when the first result is received, and
compare the first result with the second result in response to a second output request to a second external device when it is detected that the second result is output from one or more non-output processing cores that have not issued the output request.

12. An information processing method in a system including a first system that includes, a first controller, a first external device, a first memory and a first processor including a plurality of first processor cores configured to execute calculation with sharing the first memory; and a second system that, includes a second memory, and a second controller including a plurality of second processor cores configured to execute calculation, which is the same as calculation executed by the plurality of first processor cores, with shared access to the second memory based on a history of accesses to the first memory from the plurality of first processor cores, and a second external device the information processing method comprising:
controlling with the first controller the first external device to output first output data of a given calculation executed by the plurality of first processor cores in response to a match of a first result of the given calculation executed by the plurality of first processor cores with a second result of the given calculation executed by the plurality of second processor cores, the first output data being outputted from each of one or more first output processor cores of the plurality of first processor cores that have issued an output request for the given calculation,
determining whether the plurality of first processor cores include one or more first non-output processor cores that have not issued the output request for the given calculation,
controlling the one or more first output processor cores to be in a stopped state in response to obtaining the first output data, the one or more first output processor cores being controlled to restart in response to determining the first result and the second result match, and
controlling the one or more first non-output processor cores to calculate another given calculation in response to obtaining the first output data while the first output processors are in the stopped state.

13. The information processing method according to claim 12, further comprising:
instructing with the second controller a plurality third processor cores in the plurality of second processor cores to execute processing with regard to a third calculation corresponding to the given calculation when the first comparison target data is received, and
providing a result of the third calculation including a value to be output in response to a second output request to a second external device when it is detected that second output data is output from one or more fourth processor cores among the plurality of third processor cores.

14. The information processing method according to claim 13, further comprising:
transmitting, by the first controller, first information for specifying the plurality of first processor cores in advance to the second system; and
specifying, by the second controller, the plurality of third processor cores corresponding to the plurality of first processor cores based on the first information.

15. The information processing method according to claim 12, further comprising:
transmitting, by the first controller, second information for specifying the one or more first output processor cores to the second system;
controlling to stop, by the first controller, the one or more first output processor cores when it is detected that a third output request to the first external device is output from a second output processor core among the one or more first output processor cores;

transmitting a value output in response to another output request to the second system; and instructing, by the first controller, a second non-output processor core to execute processing with regard to the another given calculation.

16. The information processing method according to claim 15, further comprising:

specifying, by the second processor, a third output processor core based on second information when the value output in response to the another output request to the second system is received;

instructing, by the second processor, the third output processor core to execute processing with regard to a fourth calculation corresponding to the given calculation executed by the second processing cores; and controlling one or more second non-output processor cores to calculate a third given calculation in response to obtaining second output data while second output processors are in a stopped state.

17. The information processing method according to claim 14, wherein the second information includes an identifier or identifiers of the plurality of second processing cores.

18. The information processing method according to claim 13, further comprising:

transmitting, by the second controller, a comparison result to the first system of the match of the first result with the second result;

holding, by the first controller, the value to be output in response to the first output request; and outputting, by the first controller, the held value to the first external device when the comparison result indicates a match of the first result with the second result.

19. The information processing method according to claim 13, wherein the first memory is shared by the plurality of first processing cores, and a first buffer, the method further comprising:

writing, by the plurality of first processing cores, the first output data to the first memory;

writing, by the plurality of second processing cores, data in the given calculation on the first buffer;

instructing, by the first controller, the plurality of first processor cores to determine whether the data written on the first buffer conflicts; and reflecting, by the first controller, a writing result on the first buffer to the first memory when it is determined that the data written on the first buffer does not conflict.

20. The information processing method according to claim 19, further comprising:

controlling, by the first controller, to stop the one or more first output processor cores when it is detected that an output request to the first external device is output from a subset of the one or more first output processor cores:

transmitting, by the first controller, comparison target data to the second system;

comparing, by the second controller, the comparison target data with comparison target data calculated by the second processor and sending an output to the second external device when a result of the comparison indicates a match.

* * * * *